(12) United States Patent
Kim et al.

(10) Patent No.: US 9,226,020 B2
(45) Date of Patent: Dec. 29, 2015

(54) ELECTRONIC DEVICE AND METHOD FOR OPERATING THE SAME

(75) Inventors: Jongcheol Kim, Seoul (KR); Kyungjin Kim, Seoul (KR); Jinyung Park, Seoul (KR); Sungjong Park, Seoul (KR); Eunji Lee, Seoul (KR); Sungeun Kim, Seoul (KR); Ashesh Chagana Boyana, Bangalore (IN); Srikanta Satapathy, Bangalore (IN); Ramesh Venkatachalapathy, Bangalore (IN)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 13/460,449

(22) Filed: Apr. 30, 2012

(65) Prior Publication Data

US 2013/0005250 A1   Jan. 3, 2013

Related U.S. Application Data

(60) Provisional application No. 61/481,920, filed on May 3, 2011.

(30) Foreign Application Priority Data

Jul. 19, 2011   (KR) ........................ 10-2011-0071473
Jul. 25, 2011   (KR) ........................ 10-2011-0073572
Aug. 16, 2011   (KR) ........................ 10-2011-0081324

(51) Int. Cl.
*H04N 21/436*   (2011.01)
*H04N 21/41*   (2011.01)
(Continued)

(52) U.S. Cl.
CPC .......... *H04N 21/43615* (2013.01); *G08C 17/02* (2013.01); *G08C 23/04* (2013.01); *H04N 21/4126* (2013.01); *H04N 21/4131* (2013.01); *H04N 21/42225* (2013.01); *H04N 21/441* (2013.01); *H04N 21/4508* (2013.01);
(Continued)

(58) Field of Classification Search
USPC ............... 455/41.1; 340/10.5, 13.26; 380/200
See application file for complete search history.

(56) References Cited

U.S. PATENT DOCUMENTS

| 2007/0296552 | A1 | 12/2007 | Huang et al. | |
| 2008/0088474 | A1 | 4/2008 | Hardacker et al. | |
| 2008/0301737 | A1 | 12/2008 | Hjelmeland Almas et al. | |
| 2009/0009495 | A1* | 1/2009 | Jeon et al. | 345/204 |
| 2009/0052667 | A1* | 2/2009 | Iwamura | 380/200 |

(Continued)

FOREIGN PATENT DOCUMENTS

| CN | 1112822 C | 6/2003 |
| CN | 101682733 A | 3/2010 |

(Continued)

OTHER PUBLICATIONS

Ailisto et al., "Physical Browsing with NFC Technology," Internet Citation, XP002586911, Aug. 1, 2007, pp. 1-72.

*Primary Examiner* — Junpeng Chen
(74) *Attorney, Agent, or Firm* — Birch, Stewart, Kolasch & Birch, LLP

(57) ABSTRACT

An NFC-enabled electronic device and a method for operating the same are discussed. The method according to an embodiment includes performing, by the electronic device, tagging with a first external device to establish communication with the first external device; receiving, by the electronic device, at least one of device information and user information from the first external device through the communication; and transmitting, by the electronic device, a remote control signal to at least one second external device, based on the at least one of the device information and the user information.

26 Claims, 51 Drawing Sheets

(51) Int. Cl.
 *H04N 21/422* (2011.01)
 *H04N 21/441* (2011.01)
 *H04N 21/45* (2011.01)
 *G08C 17/02* (2006.01)
 *G08C 23/04* (2006.01)
 *H04N 5/44* (2011.01)

(52) U.S. Cl.
 CPC ........ *G08C2201/12* (2013.01); *G08C 2201/32* (2013.01); *G08C 2201/40* (2013.01); *G08C 2201/61* (2013.01); *G08C 2201/91* (2013.01); *G08C 2201/93* (2013.01); *H04N 2005/4442* (2013.01); *H04N 2005/4444* (2013.01)

(56) References Cited

U.S. PATENT DOCUMENTS

| | | | |
|---|---|---|---|
| 2010/0081375 A1 | 4/2010 | Rosenblatt et al. | |
| 2011/0106917 A1* | 5/2011 | Park et al. | 709/219 |
| 2011/0163949 A1* | 7/2011 | Chen et al. | 345/157 |
| 2012/0178431 A1* | 7/2012 | Gold | 455/420 |

FOREIGN PATENT DOCUMENTS

| | | |
|---|---|---|
| EP | 2 226 721 A1 | 9/2010 |
| WO | WO 2009/026000 A1 | 2/2009 |

* cited by examiner (a)            (b)            (c)

FIG. 10
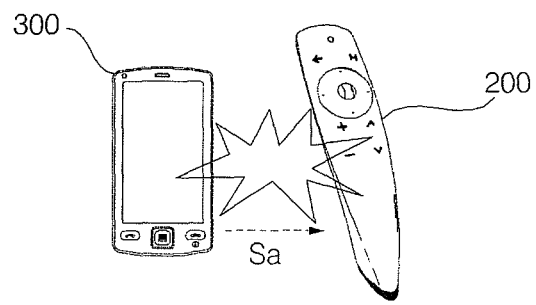
(a)
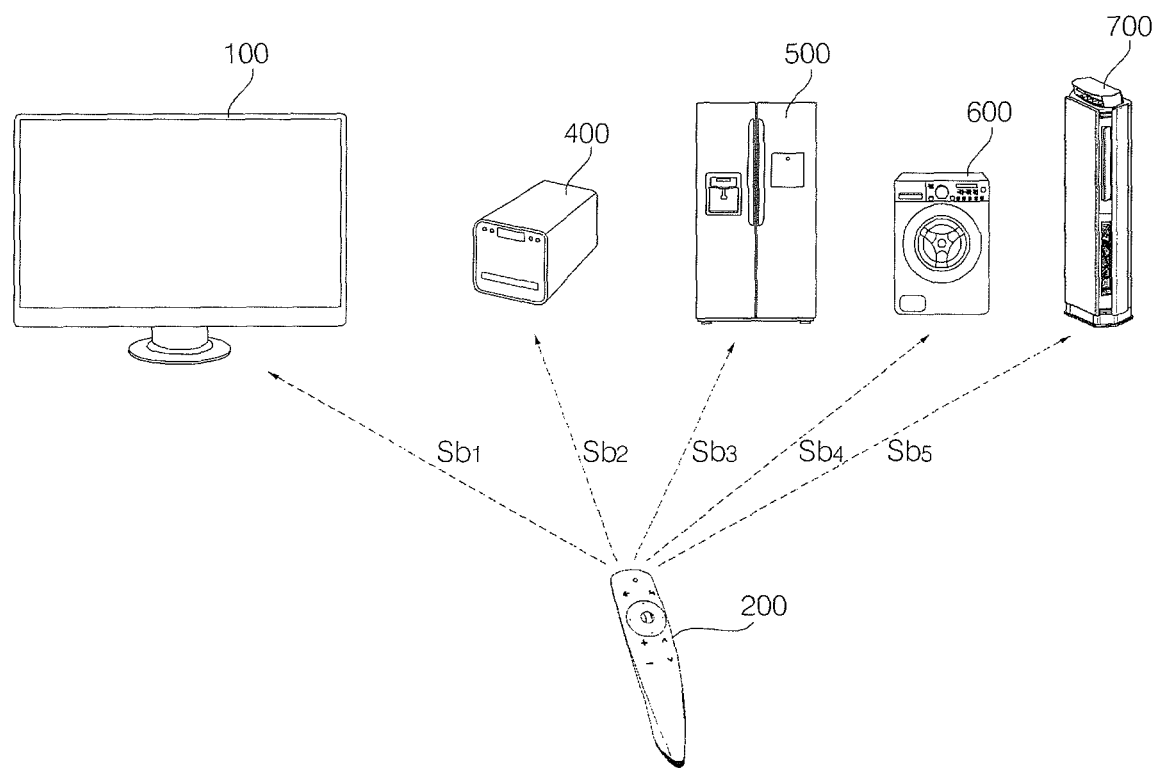
(b)

FIG. 11B
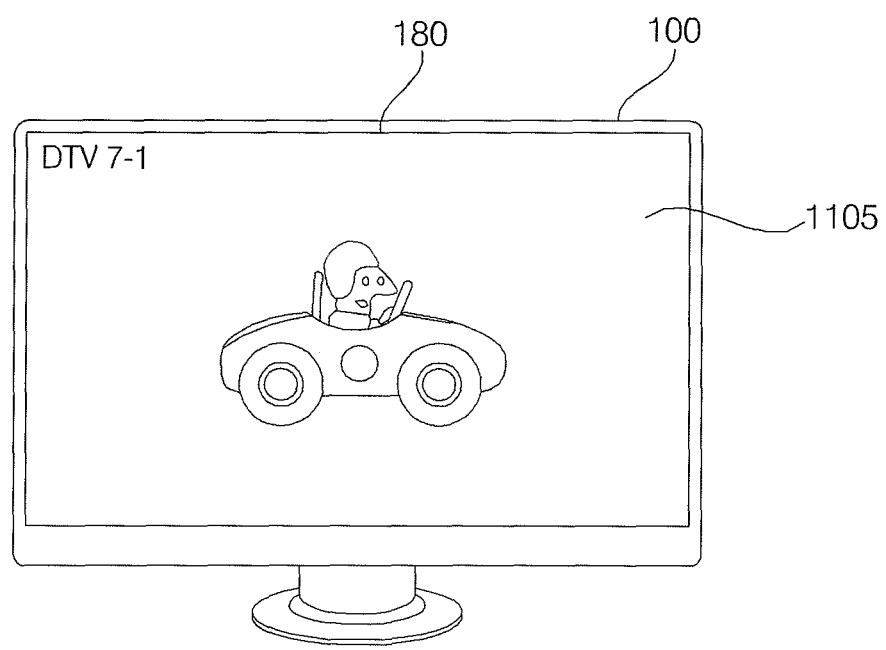
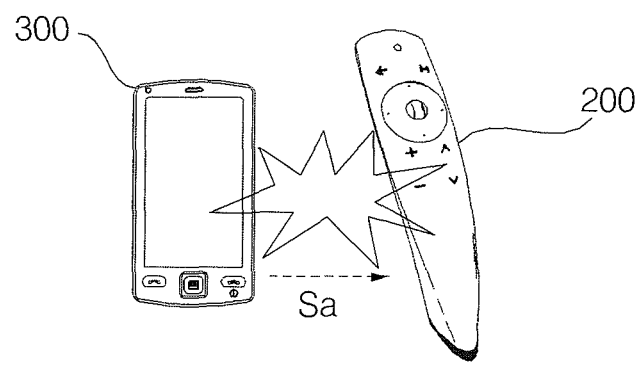

FIG. 13A
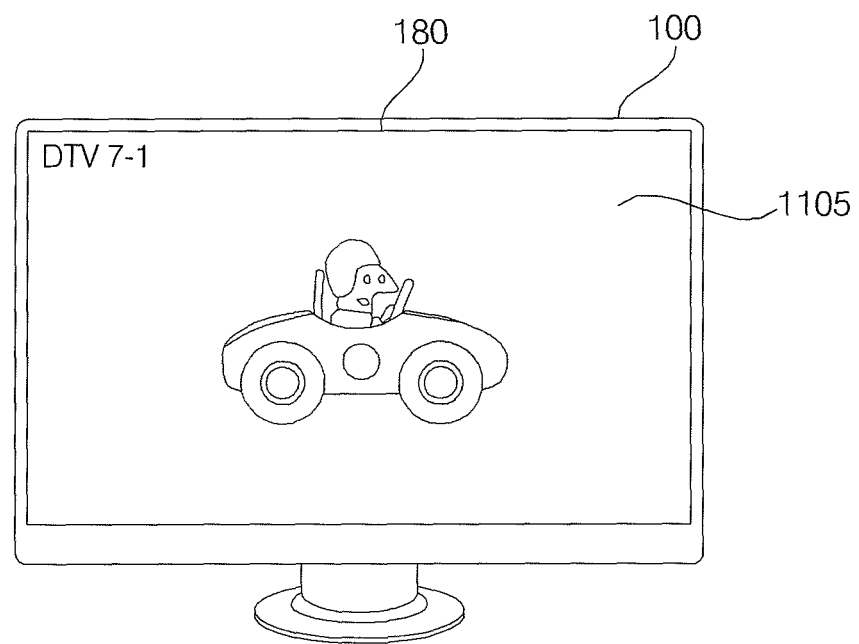
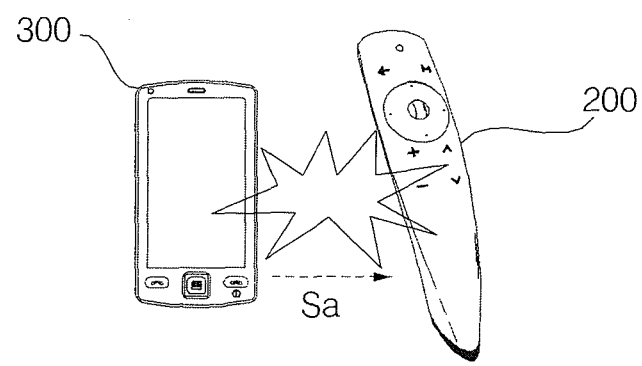

FIG. 15
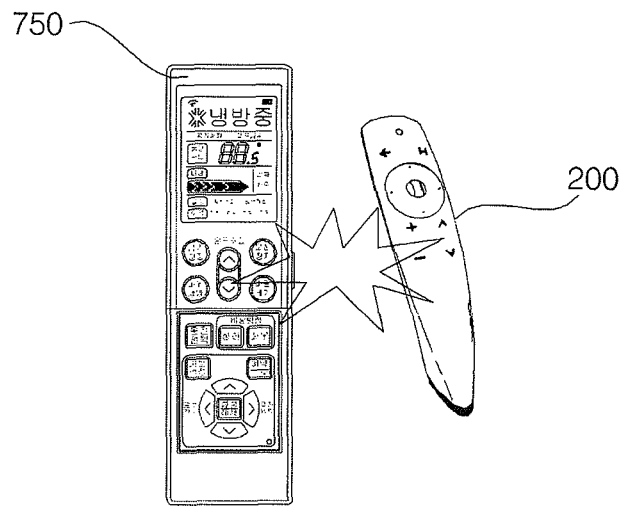
(a)
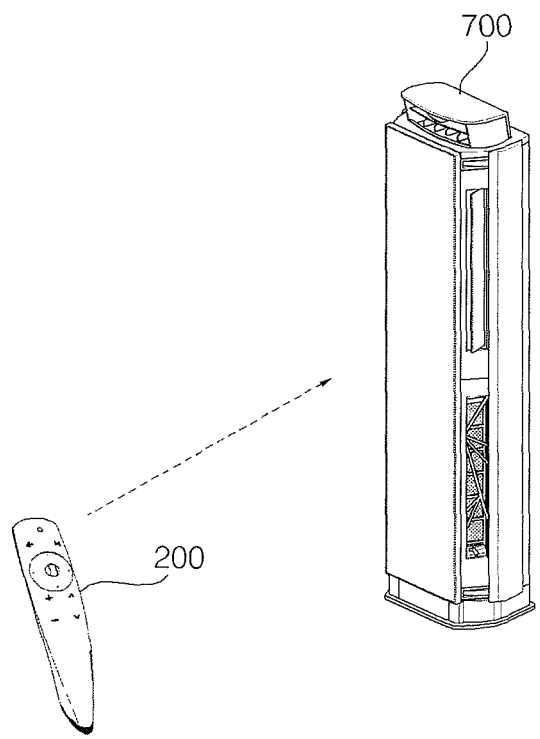
(b)

FIG. 16
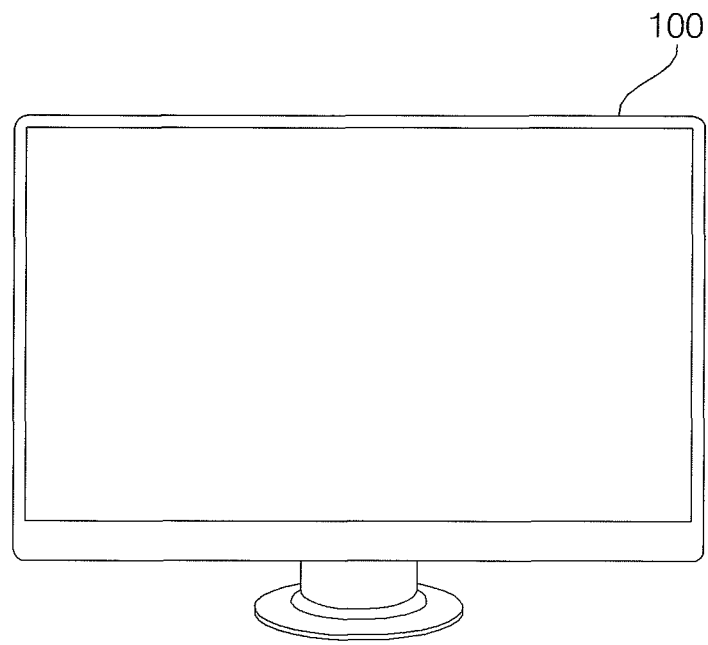
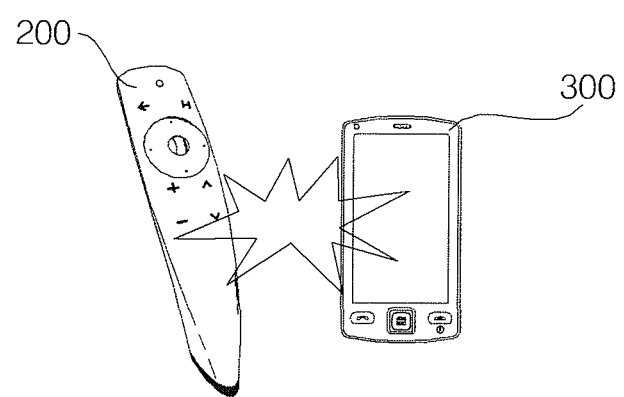

FIG. 20A
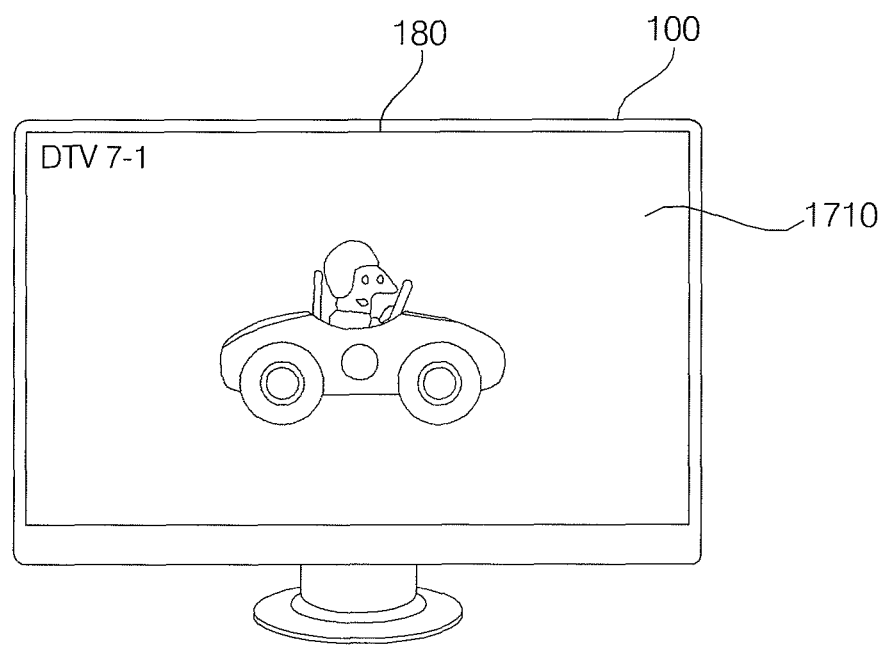
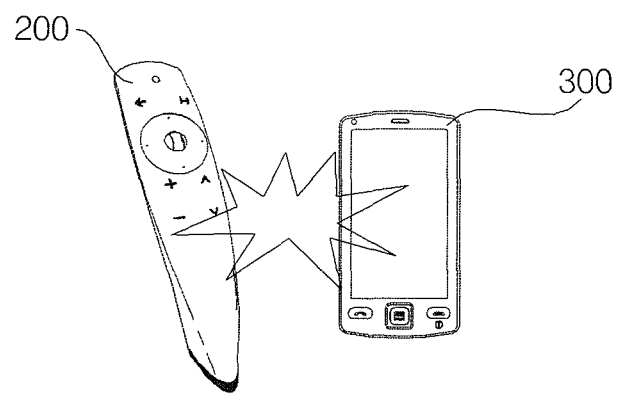

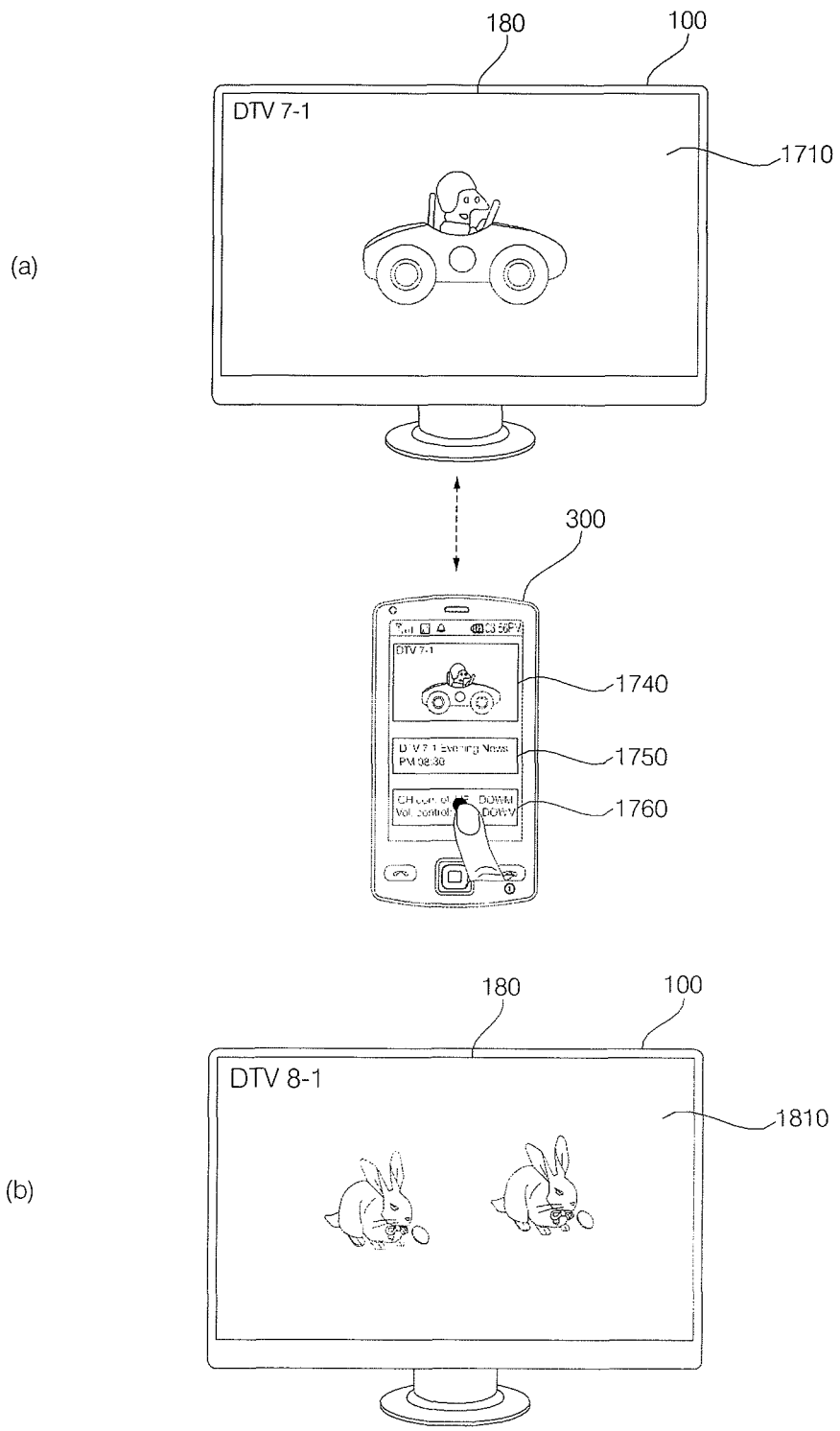

FIG. 22A
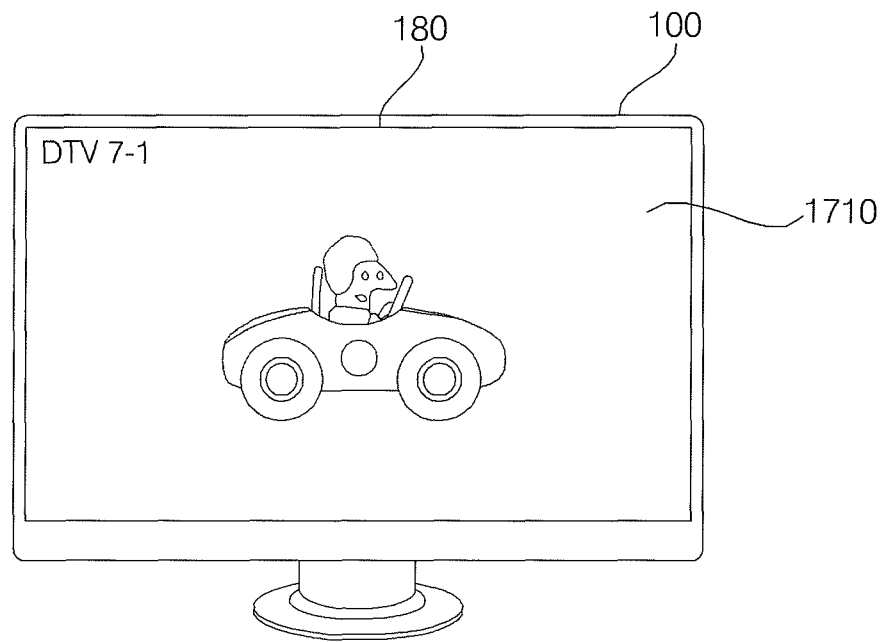
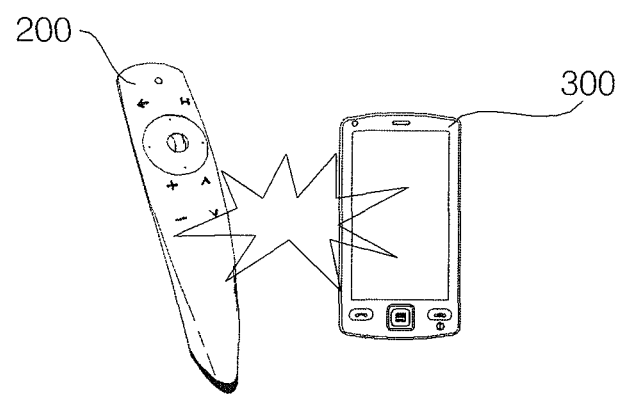

FIG. 24A
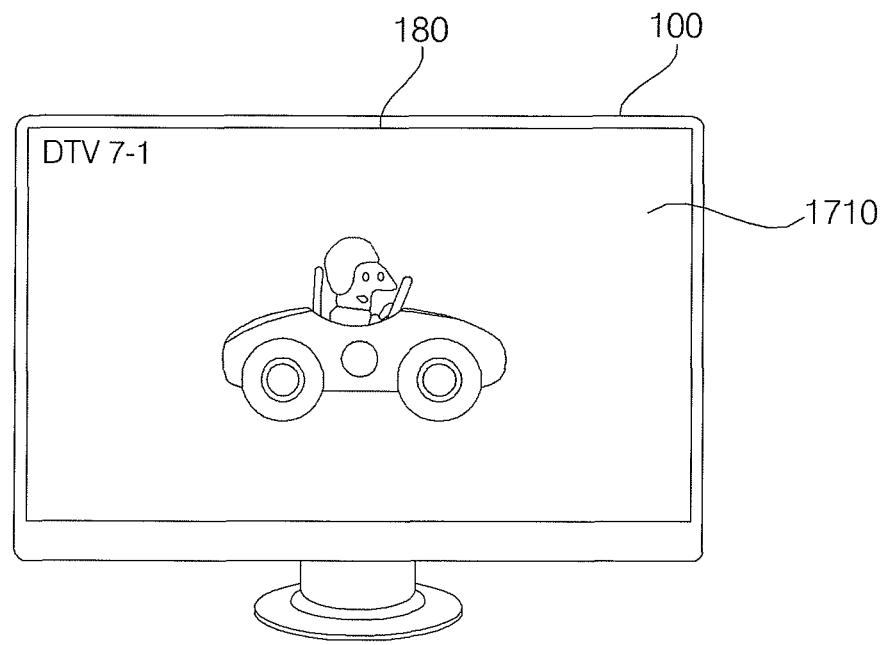
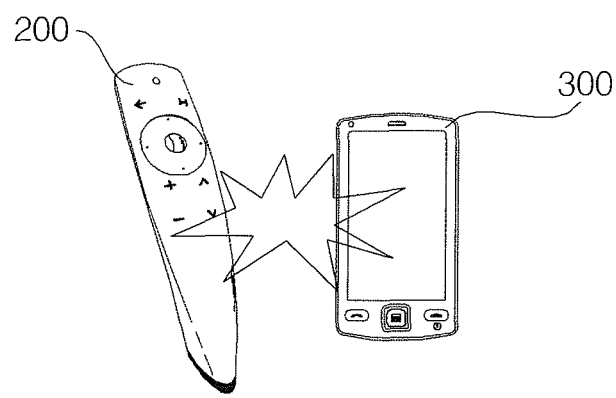

FIG. 25A
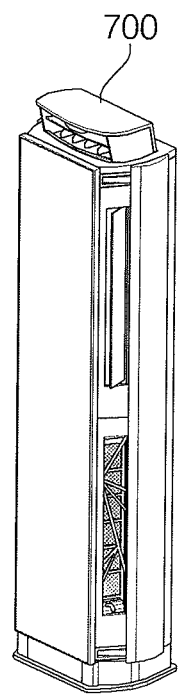
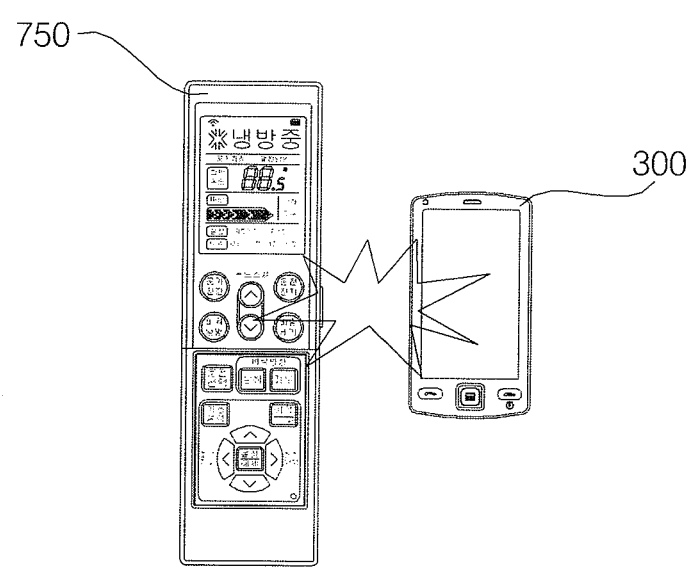

ELECTRONIC DEVICE AND METHOD FOR OPERATING THE SAME

CROSS-REFERENCE TO RELATED APPLICATION

This application claims the priority benefit of U.S. Provisional Application No. 61/481,920 filed on May 3, 2011 in the USPTO, and the priority benefit of Korean Patent Application Nos. 10-2011-0071473 filed on Jul. 19, 2011, 10-2011-0073572 filed on Jul. 25, 2011, and 10-2011-0081324 filed on Aug. 16, 2011 in the Korean Intellectual Property Office. The entire contents of each of these applications are incorporated herein by reference.

BACKGROUND OF THE INVENTION

1. Field of the Invention

The present invention relates to an electronic device and a method for operating the same, and more particularly, to an electronic apparatus and a method for operating the same, which can increase user convenience.

2. Description of the Related Art

An electronic device processes an electrical signal and operates based on the processed electrical signal, according to a user's manipulation. Among electronic devices, an image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems and other limitations associated with the related art.

It is an object of the present invention to provide an electronic device and a method for operating the same, which can increase user convenience.

It is another object of the present invention to provide an electronic device for receiving user information from an external device and performing a login operation using the received user information, and to provide a method for operating the electronic device.

It is a further object of the present invention to provide a Near Field Communication (NFC)-enabled electronic device for facilitating remote control of an external device and a method for operating the same.

In accordance with an aspect of the present invention, the above and other objects can be accomplished by the provision of a method for operating a Near Field Communication (NFC)-enabled electronic device, including performing tagging to a first external device, receiving device information or user information from the first external device, and transmitting a remote control signal to a second external device based on the device information or the user information.

In accordance with another aspect of the present invention, there is provided a method for operating an electronic device, including displaying an image, receiving a remote control signal including at least one of device information or user information about the first external device from a second external device, and displaying a screen related to the first external device based on the remote control signal.

In accordance with another aspect of the present invention, there is provided an electronic device including a first communication module to conduct communication by NFC and receiving device information or user information from a first external device through tagging to the first external device, a second communication module to communicate with a second external device, and a controller to control transmission of a remote control signal to the second external device based on the device information or the user information.

In accordance with a further aspect of the present invention, there is provided an electronic device including a display, an interface to receive from a second external device a remote control signal including at least one of device information or user information about a first external device from a second external device, and a controller to control display of a screen related to the first external device based on the remote control signal on the display.

In accordance with another aspect of the present invention, there is provided a method for operating a Near Field Communication (NFC)-enabled electronic device, the method including: performing, by the electronic device, tagging with a first external device to establish communication with the first external device; receiving, by the electronic device, at least one of device information and user information from the first external device through the communication; and transmitting, by the electronic device, a remote control signal to at least one second external device, based on the at least one of the device information and the user information.

In accordance with another aspect of the present invention, there is provided a method for operating an image display apparatus, including: displaying, on a display unit of the image display apparatus, an image; receiving, by the image display apparatus, a remote control signal including at least one of device information and user information related to a first external device from a second external device; and displaying, on the display unit, a screen related to the first external device based on the remote control signal.

In accordance with another aspect of the present invention, there is provided a Near Field Communication (NFC)-enabled electronic device, including: a communication module; and a controller configured to control the communication module and to: perform tagging with a first external device to establish communication with the first external device using the communication module, receive at least one of device information and user information from the first external device through the communication, and transmit a remote control signal to at least one second external device, based on the at least one of the device information and the user information.

In accordance with another aspect of the present invention, there is provided an image display apparatus, including: a display unit configured to display an image; and a controller configured to control the display unit, and to: receive a remote control signal including at least one of device information and user information related to a first external device from a second external device, and display, on the display unit, a screen related to the first external device based on the remote control signal.

BRIEF DESCRIPTION OF THE DRAWINGS

The above and other objects, features and other advantages of the present invention will be more clearly understood from the following detailed description taken in conjunction with the accompanying drawings, in which:

FIGS. 9 to 15 are views referred to for describing examples of the method for operating the remote controller illustrated in FIG. 7 and the method for operating the image display apparatus illustrated in FIG. 8 according to an embodiment of the present invention;

FIG. 16 illustrates an electronic device according to another embodiment of the present invention and an exemplary external device capable of short-range communication with the electronic device;

FIGS. 20A to 31B are views referred to for describing examples of the method for operating the mobile terminal illustrated in FIG. 19 according to an embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

In the specification, the term "electronic device" or "external device" may cover a broad range of devices such as an image display apparatus, a television, a set-top box, a remote controller, a mobile terminal, a smart phone, a computer, a laptop, a tablet, a navigation device, a multimedia player, a Network Access Storage (NAS), a server, an appliance, a refrigerator, a washing machine, an oven, an air conditioner, a cooker, a home theater, a camera, a game console, etc. which will be described later.

Especially, a remote controller described herein is a component separately configured from an image display apparatus. The remote controller can remotely or wireless control the operation of the image display apparatus. Under circumstances, the remote controller will be described as an electronic device or an external device. The image display apparatus can be any device that displays images such as a TV, a computer, a laptop, a multimedia player, etc. A mobile terminal can be a smart phone, a PDF, a computer laptop or tablet, a GPS, or any other portable electronic device.

Further, any method or operation discussed below in accordance with the embodiments of the present invention can be implemented using one or more of any of the devices/units/modules discussed below according to the present invention.

Figure 1:
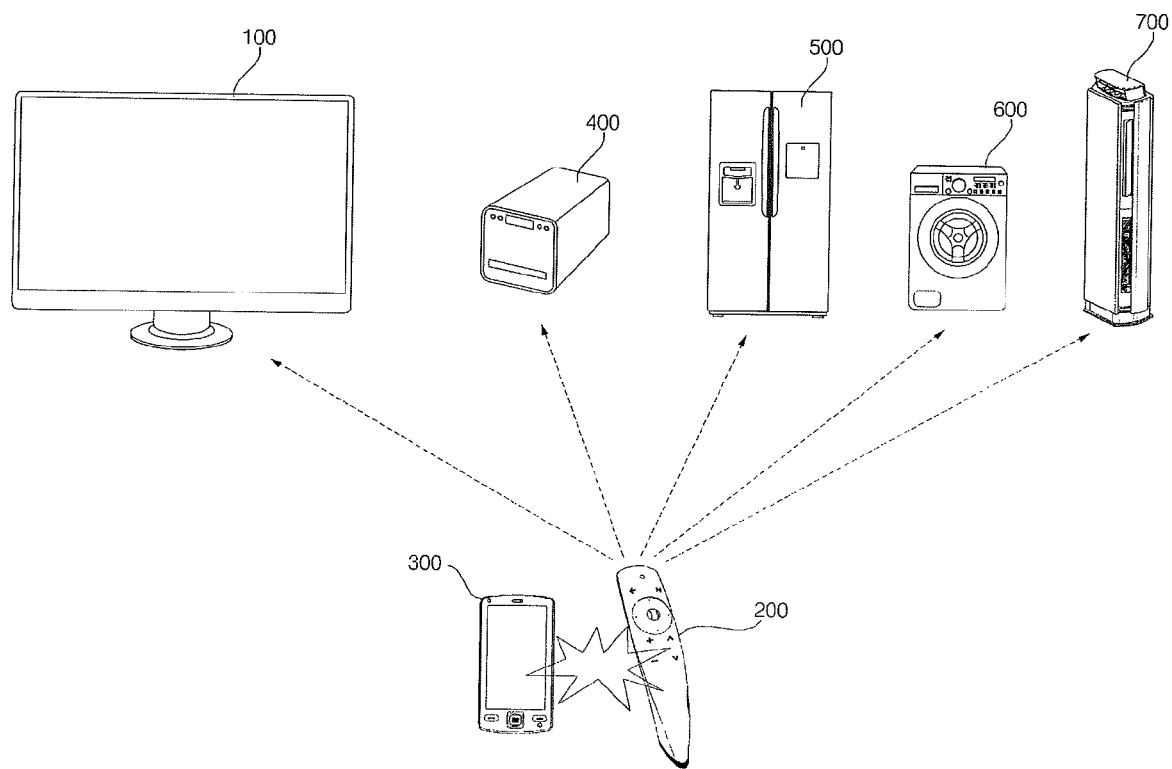
FIG. 1 illustrates an electronic device according to an embodiment of the present invention and exemplary external devices capable of short-range communication with the electronic device.

FIG. 1 illustrates an electronic device according to an embodiment of the present invention and exemplary external devices capable of short-range communication with the electronic device. Each of the devices shown is operatively configured.

Referring to FIG. 1, the electronic device according to an embodiment of the present invention may be a remote controller 200. The remote controller 200 may transmit data to or receive data from an external device by short-range communication, preferably Near Field Communication (NFC). However, other types of short-range wireless communication can be used such as RF communication, IR communication, Bluetooth, etc.

NFC is a contactless short-range wireless communication technology that provides wireless connectivity at a frequency of 13.56 MHz. NFC is mutually compatible with existing contactless smart cards and Radio Frequency Identification (RFID).

To conduct NFC communication, the remote controller 200 includes an NFC module according to the embodiment of the present invention. The NFC module will be described later with reference to FIG. 6.

In FIG. 1, a mobile terminal 300 is a first external device whereas an image display apparatus 100, a NAS (Network Access Storage) 400, a refrigerator 500, a washing machine 600, and an air conditioner 700 are second external devices, by way of example. Besides, a cooker, a home theater, a camera, a game console, etc. may also serve as the second external devices.

To enable NFC communication with the remote controller 200, the mobile terminal 300 includes an NFC module. For example, if the mobile terminal 300 is brought within a predetermined distance of the remote controller 200, the mobile terminal 300 or the remote controller 200 may create a magnetic field towards the remote controller 200 or the mobile terminal 300 and thus the remote controller 200 may receive user information from the mobile terminal 300 according to a variation in the magnetic field. That is, when the remote controller 200 and the mobile terminal are placed near each other, these devices can exchange data and other information via the short-range communication such as NFC.

The remote controller 200 may transmit the received user information to a second external device in a transmission scheme other than NFC, for example, InfraRed (IR) communication, Radio Frequency (RF) communication, Bluetooth, etc.

The following description will be given in the context of the image display apparatus 100 being used as a second external device. The image display apparatus 100 may be any of a TV capable of displaying a broadcast program, a monitor, a laptop computer, a tablet PC, etc.

Figure 2:
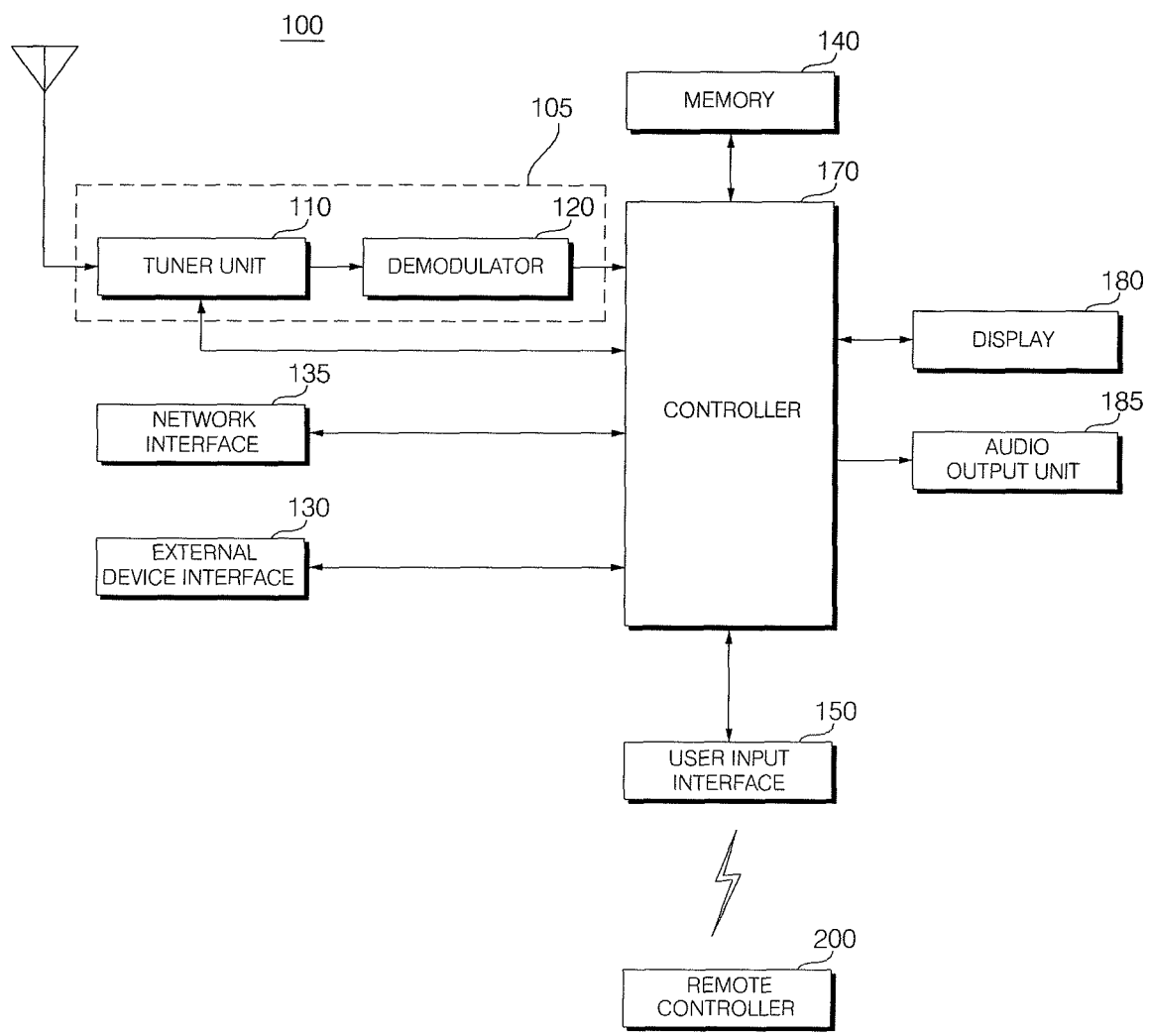
FIG. 2 is a block diagram of an image display apparatus illustrated in FIG. 1.

FIG. 2 is a block diagram of the image display apparatus 100 illustrated in FIG. 1 according to an embodiment of the present invention.

Referring to FIG. 2, the image display apparatus 100 includes a broadcasting receiver 105, an external device interface 130, a network interface 135, a memory 140, a user input interface 150, a sensor unit (not shown), a controller 170, at least one display 180, and an audio output unit 185. All components of the image display apparatus 100 are operatively coupled and configured.

The broadcasting receiver 105 may include a tuner unit 110 having one or more tuners, and a demodulator 120. As needed, the broadcasting receiver 105 may be configured so as to include only the tuner unit 110 and the demodulator 120, or only the network interface 130, or all three components.

The tuner unit 110 selects an RF broadcast signal corresponding to a channel selected by a user or an RF broadcast signal corresponding to each of pre-stored channels from among a plurality of RF broadcast signals received through an antenna and converts the selected RF broadcast signal into a digital Intermediate Frequency (IF) signal or an analog baseband Audio/Video (A/V) signal.

More specifically, if the selected RF broadcast signal is a digital broadcast signal, the tuner unit 110 converts the selected RF broadcast signal into a digital IF signal, DIF. On the other hand, if the selected RF broadcast signal is an analog broadcast signal, the tuner unit 110 converts the selected RF broadcast signal into an analog baseband A/V signal, CVBS/SIF. That is, the tuner unit 110 may be a hybrid tuner capable of processing not only digital broadcast signals but also analog broadcast signals. The analog baseband A/V signal CVBS/SIF may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus 100 by a channel add function from a plurality of RF signals received through the antenna and may convert the selected RF broadcast signals into IF signals or baseband A/V signals.

The tuner unit 110 may include a plurality of tuners for receiving broadcast signals on a plurality of channels. Alternatively, the tuner unit 110 may be implemented into a single tuner for simultaneously receiving broadcast signals on a plurality of channels.

The demodulator 120 receives the digital IF signal DIF from the tuner unit 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 130 may serve as an interface between a connected external device and the image display apparatus 100. For interfacing, the external device interface 130 may include an A/V Input/Output (I/O) unit and/or a wireless communication module.

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 transmits and receives signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet. The network interface 135 may receive content or data from the Internet, a Content Provider (CP), or a Network Provider (NP), etc.

The network interface 135 may conduct data communication with one or more electronic devices near to the image display apparatus 100. The network interface 135 may receive device information and remote controllable channel, frequency, or code information about other electronic devices through data communication.

The memory 140 may store various programs for the controller 170 to process and control signals, and may also store processed video, audio and data signals.

The memory 140 may temporarily store a video, audio and/or data signal received from the external device interface 130. The memory 140 may store information about broadcast channels by the channel add function such as a channel map.

While the memory 140 is shown in FIG. 2 as configured separately from the controller 170, to which the present invention is not limited. As such, the memory 140 may be incorporated into the controller 170, for example.

The user input interface 150 transmits a signal received from a user (e.g., via the remote controller 200 or other input unit) to the controller 170 or transmits a signal received from the controller 170 to the user. For example, the user input interface 150 may receive various user input signals such as a power-on/off signal, a channel selection signal, and a screen setting signal from the remote controller 200, provide the controller 170 with user input signals received from local keys such as inputs of a power key, a channel key, and a volume key, and a setting value, transmit a control signal received from the sensor unit for sensing a user gesture to the controller 170, or transmit a signal received from the controller 170 to the sensor unit. The user input interface 150 also receives user inputs received through other user units such as a touch-sensitive display, a keyboard, a mouse, a pointer, etc.

In accordance with an embodiment of the present invention, the user input interface 150 may receive a remote control signal including user information from the remote controller 200. Besides the user information, the user input interface 150 may receive information about a Web server connected to the first external device (e.g., the mobile terminal 300) based on the user information.

For example, if the mobile terminal 300 and the remote controller 200 are brought to be positioned within a predetermined distance (i.e. tagging), NFC or other short-range communication is established between the mobile terminal 300 and the remote controller 200. Then the remote controller 200 may receive user information from the mobile terminal 300 via the short-range communication such as NFC. Then the remote controller 200 can transmit the user information received from the mobile terminal 300 to the image display apparatus 100 in a short-range transmission scheme, which can include a NFC communication, IR or RF communication, etc. The user input interface 150 transmits the received user information to the controller 170.

The user information may include one or more of information about a user IDentifier (ID), password, and e-mail address to use the mobile terminal 300, information about at least one user ID, password, and e-mail address to use the image display apparatus 100 and/or other electronic devices (e.g., devices 400, 500, 600, 700, etc.), information about a common user ID and/or password for a plurality of electronic devices including the mobile terminal 300, information about a user ID and a password that are pre-stored in the mobile terminal 300 to access a specific Web server, information about a user ID and a password to access a specific Web server in the mobile terminal 300 and the image display apparatus 100, or information about a user ID and a password to access a server connected to the image display apparatus 100.

Meanwhile, the user input interface 150 may receive device information and remote controllable channel, frequency information, or code information about external devices near the image display apparatus 100, from the remote controller 200.

The controller 170 may demultiplex the stream signal TS received from the tuner unit 110, the demodulator 120, or the external device interface 130 into a number of signals and process the demultiplexed signals into audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

The controller 170 may include a demultiplexer (DEMUX) and a video processor, which will be described later with reference to FIG. 3.

In addition, the controller 170 may provide overall control of the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may also control the display 180 to display images. The image displayed on the display 180 may be a two-dimensional (2D) or three-dimensional (3D) still image or video.

The controller 170 may control 3D rendering of a particular object in the image displayed on the display 180. For example, the particular object may be at least one of a linked Web page (e.g., from a newspaper, a magazine, etc.), an Electronic Program Guide (EPG), a menu, a widget, an icon, a still image, a video, or text.

The controller 170 may locate the user based on an image captured by a camera unit. The user may be positioned near or in front of the image display apparatus 100. Specifically, the controller 170 may measure the distance (e.g., a z-axis coordinate) between the user and the image display apparatus 100. In addition, the controller 170 may calculate x-axis and y-axis coordinates corresponding to the position of the user on the display 180. The camera unit can be part of the image display apparatus or can be a separate unit.

In accordance with an embodiment of the present invention, the controller 170 may control a login process based on the user information received from the remote controller 200 which may receive this user information from the mobile terminal 300 via the short range communication as discussed above. The login may be a login to the image display apparatus 100, a login to a server connected to the image display apparatus 100, or a login to a specific Web server to which the user subscribed using the user information. The same login information may be used to login to multiple devices simultaneously.

In case that a login is to the image display apparatus 100 using a user ID and a password (user information) received from the remote controller 200, the controller 170 may control display of a personalized page on the display 180. If an image is being played, the controller 170 may control display of the personalized page along with the on-going image, or the on-going image may be switched to the personalized page.

In case that a login is to a server connected to the image display apparatus 100, the controller 170 may control display of a server connection page received from the server on the display 180. For example, the server connection page may be an application server page. If an image is being played, the controller 170 may control display of the server connection page along with the on-going image, or the on-going image may be switched to the server connection page.

In the case where the received user information is associated with a Web server connected to another electronic device, particularly the mobile terminal 300, the controller 170 may control the image display apparatus 100 to access the Web server and may control display of a Web page from the accessed Web server on the display 180. Alternatively or additionally, the controller 170 may control display of an object indicating the accessed Web server on the display 180. The Web server may be a Social Networking Service (SNS) Web server. If an image is being played, the controller 170 may control display of the Web page along with the on-going image, or the on-going image may be switched to the Web page.

Upon receipt of the user information in an idle mode, e.g., in a power-off state of the image display apparatus 100, the controller 170 may control a power supply to supply power to the image display apparatus 100. For instance, if the user information is received through the user input interface 150 in the idle mode, the controller 170 may transition to a wake-up mode and may control the power supply to supply power to each module or unit of the image display apparatus 100.

Meanwhile, the controller 170 may determine whether each of the electronic devices near the image display apparatus 100 has been connected, based on device information, and/or based on remote controllable channel, frequency or code information about the nearby electronic devices, which is received through the network interface 135 or the user input interface 150. In the presence of any connected nearby electronic device, the controller 170 may control display of an object indicating the logged-in electronic device on the display 180.

Additionally, the controller 170 may control transmission of the device information, or remote controllable channel, frequency or code information about an electronic device near the image display apparatus 100 based on the device information, or remote controllable channel, frequency or code information about the nearby electronic devices around the image display apparatus 100. The device information can be any information related to a corresponding device. For instance, the device information of the mobile terminal 300 may be information pertaining to the mobile terminal 300, such as its capability information of the mobile terminal 300, a device type of the mobile terminal 300, a product name for the mobile terminal 300, its wireless connection information, etc. The device information of the electronic devices 100,

400, 500, 600, 700, etc. may be information needed to access the corresponding electronic device.

The image display apparatus 100 may further include a channel browsing processor for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded together with a decoded image. The controller 170 may display a thumbnail list including a plurality of received thumbnail images on the display 180.

The thumbnail list may be displayed on a part of the display 180 with an image displayed on the display 180, that is, as a compact view, or the thumbnail list may be displayed in full screen on the display 180. The thumbnail images of the thumbnail list may be updated sequentially or as needed.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light Emitting Diode (OLED) display, and a flexible display. The display 180 may also be capable of displaying 3D images. The display 180 may also be a touch screen that can be used not only as an output device but also as an input device, and can include one or more display screens.

The audio output unit 185 may receive a processed audio signal from the controller 170 and output the received audio signal as voice or sounds.

The camera module captures an image of a user positioned near the camera module. The camera module may include, but not limited to, a single camera. When needed, the camera module may include a plurality of cameras. The camera module may be embedded or positioned above the display 180 in the image display apparatus 100, or may be separately configured. Image information captured by the camera module may be provided to the controller 170 for processing.

The controller 170 may sense a user's gesture from a captured image received from the camera module or from signals received from the sensor unit, alone or in combination. The user's gestures can be used as specific user commands.

The remote controller 200 transmits a user input to the user input interface 150. For transmission of a user input, the remote controller 200 may operate based on various communication standards such as Bluetooth, RF, IR, Ultra WideBand (UWB), ZigBee, NFC, etc. In addition, the remote controller 200 may receive a video signal, audio signal and/or data signal from the user input interface 150 and output the received signal as an image and/or sound.

In accordance with an embodiment of the present invention, the remote controller 200 may receive user information and/or device information from the first external device by NFC. As described before, the user information may include a user ID and a password for using or accessing the mobile terminal 300, the image display apparatus 100, or other electronic devices. Although the user information may be different for each device, the following description is given on the assumption that one universal user ID and password may be used to access these devices. The device information may be device-specific or device-identifying information used to access the mobile terminal 300, the image display apparatus 100, or other electronic devices. A plurality of different device information may be stored in the mobile terminal 300 for the different electronic devices 100, 300, 400, 500, 600, 700, etc. The remote controller 200 may transmit the received user information to the image display apparatus 100 by IR or RF communication.

A description is given of embodiments of the present invention with the appreciation that the remote controller 200 may be preferably a 3D pointing device capable of displaying a pointer in correspondence with a user's motion. For instance, the remote controller 200 may transmit the user information to the image display apparatus 100 by RF communication.

Besides the user information, the remote controller 100 may receive information about a Web server connected based on the user information. For instance, the remote controller 200 may receive information about an SNS Web server to which the mobile terminal 300 is logging in. The Web server information is also transmitted to the image display apparatus 100.

Meanwhile, the remote controller 200 may receive device information, or remote controllable channel, frequency information or code information about other electronic devices near the image display apparatus 100, from the other electronic devices. Thus, the remote controller 200 may assign a channel, frequency or code to an electronic device based on the information about the electronic device, for remotely controlling the electronic devices.

The above-described image display apparatus 100 may be a fixed or mobile digital broadcast receiver.

The block diagram of the image display apparatus 100 illustrated in FIG. 2 is an exemplary embodiment of the present invention. The image display apparatus 100 is shown in FIG. 2 as having a number of components in a given configuration. However, the image display apparatus 100 may include fewer components or more components than those shown in FIG. 2 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and playback video contents through the network interface 130 or the external device interface 135, without the tuner unit 100 and the demodulator 120.

Figure 3:
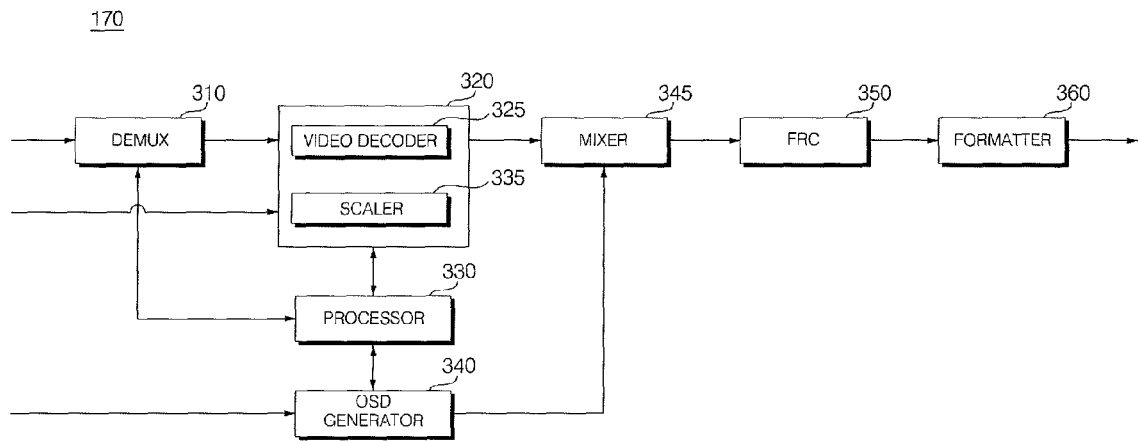
FIG. 3 is a block diagram of a controller illustrated in FIG. 2.

FIG. 3 is a block diagram of the controller illustrated in FIG. 2 according to an embodiment of the present invention.

Referring to FIG. 3, the controller 170 may include a DEMUX 310, a video processor 320, a processor 330, an OSD generator 340, a mixer 345, a Frame Rate Converter (FRC) 350, and a formatter 360 according to an embodiment of the present invention. The controller 170 may further include an audio processor and a data processor.

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180. The video decoder 325 may be provided with decoders that operate based on various standards.

The processor 330 may provide overall control of the image display apparatus 100 or the controller 170. For example, the processor 330 may control the tuner unit 110 to tune to RF broadcasting corresponding to a user-selected channel or a pre-stored channel. The processor 330 may also control the image display apparatus 100 according to a user command received through the user input interface 150 or an internal program. The processor 330 may control data transmission through the network interface 135 or the external device interface 130. The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which information is displayed as graphics or text on the display 180, according to user input signals. The OSD signal may include various data such as a User Interface (UI), a variety of menus, widgets, icons, etc. Also, the OSD signal may include a 2D object and/or a 3D object.

Further, the OSD generator 340 may generate a pointer to be displayed on the display 180 based on a pointing signal received from the remote controller 200. Especially, the pointer may be generated from a pointing signal processor, which may reside in the OSD generator 340. Obviously, the pointing signal processor may be configured separately from the OSD generator 240.

In case that a login based on the information received from the remote controller or other electronic device is to the image display apparatus 100, the OSD generator 340 may generate or configure a personalized page which has been set. In case that a login is to a connected server, the OSD generator 340 may generate or configure at least a part of a server connection page received from the server on the display 180. As a variation, the OSD generator 340 may generate or configure at least a part of the server connection page based on information about a Web server that has been connected based on the user information.

The mixer 345 may mix the decoded video signal processed by the video processor 320 with the OSD signal generated from the OSD generator 340. The OSD signal and the decoded video signal each may include at least one of a 2D signal or a 3D signal. The mixed video signal is provided to the FRC 350.

The FRC 350 may change the frame rate of the mixed video signal or may simply output the mixed video signal without a frame rate conversion.

The formatter 360 may receive the mixed signal, namely the OSD signal and the decoded video signal in combination from the mixer 345, change the format of the mixed signal suitably for the display 180, and output the format-changed signal. For example, the formatter 360 may output a Red, Green and Blue (R.G.B) data signal. The R.G.B data signal may take the form of a Low Voltage Differential Signal (LVDS) or mini-LVDS.

For 3D visualization, the formatter 360 may separate a 2D video signal and a 3D video signal from the mixed video signal received from the mixer 345. In addition, the formatter 360 may change the format of a 3D video signal or convert a 2D video signal to a 3D video signal.

The audio processor of the controller 170 may process the demultiplexed audio signal. For audio signal processing, the audio processor may have a plurality of decoders. The audio processor of the controller 170 may also adjust the bass, treble, and volume of the audio signal.

The data processor of the controller 170 may process the data signal obtained by demultiplexing the input stream signal. For example, if the demultiplexed data signal is a coded data signal, the data processor may decode the coded data signal. The coded data signal may be an EPG which includes broadcast information specifying the start time, end time, etc. of scheduled broadcast TV or radio programs.

While it is shown in FIG. 3 that the mixer 345 mixes signals received from the OSD generator 340 and the video processor 320 and then the formatter 360 performs 3D processing on the mixed signal. The present invention is not limited thereto, and the mixer 345 may be positioned after the formatter 360.

The block diagram of the image display apparatus 100 illustrated in FIG. 3 is purely exemplary. Depending upon the specifications of the image display apparatus 100 in actual implementation, the components of the image display apparatus 100 may be combined or omitted or new components may be added. That is, two or more components can be incorporated into one component or one component may be configured as separate components, as needed. For instance, the FRC 350 and the formatter 360 may be configured separately outside the controller 170.

Figure 4:
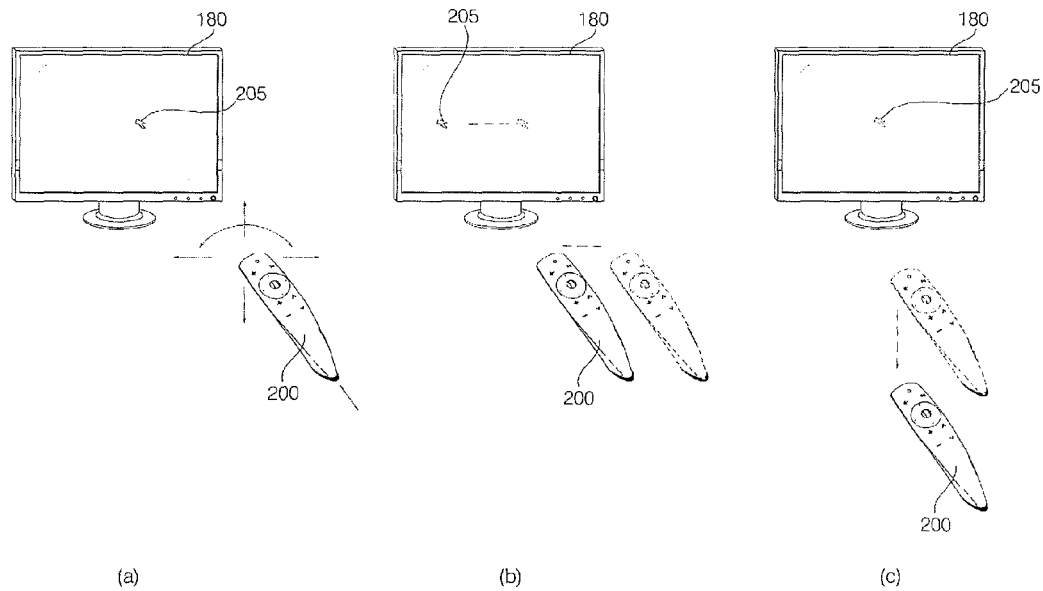
FIG. 4 illustrates a method for controlling a remote controller illustrated in FIG. 1.

FIG. 4 illustrates a method for controlling the remote controller 200 illustrated in FIG. 1 according to an embodiment of the present invention.

FIG. 4(a) illustrates a pointer 205 representing a movement of the remote controller 200, which is displayed on the display 180 of the image display apparatus 100.

The user may move or rotate the remote controller 200 up and down, side to side (FIG. 4(b)), and back and forth (FIG. 4(c)). Since the pointer 205 moves in accordance with the movement of the remote controller 200 in 3D space, the remote controller 200 may be referred to as a pointing device.

Referring to FIG. 4(b), if the user moves the remote controller 200 to the left, the pointer 205 also moves to the left on the display 180.

A sensor of the remote controller 200 detects the movement of the remote controller 200 and transmits motion information corresponding to the result of the detection to the image display apparatus 100. Then, the image display apparatus 100 determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus 100 then displays the pointer 205 at the calculated coordinates on the display unit 180.

Referring to FIG. 4(c), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is also possible. That is, when the remote controller 200 recedes from the display 180, the selection area may be zoomed out and when the remote controller 200 approaches the display 180, the selection area may be zoomed in.

With the predetermined button pressed on the remote controller 200, the up, down, left and right movements of the remote controller 200 may be ignored. That is, when the remote controller 200 recedes from or advances toward the display 180, only the back and forth movements of the remote controller 200 may be sensed, while the up, down, left and right movements of the remote controller 200 may be ignored. Unless the predetermined button is pressed in the remote controller 200, the pointer 205 may move in accordance with the up, down, left or right movement of the remote controller 200.

The speed and direction of the pointer 205 may correspond to the speed and direction of the remote controller 200.

Figure 5:
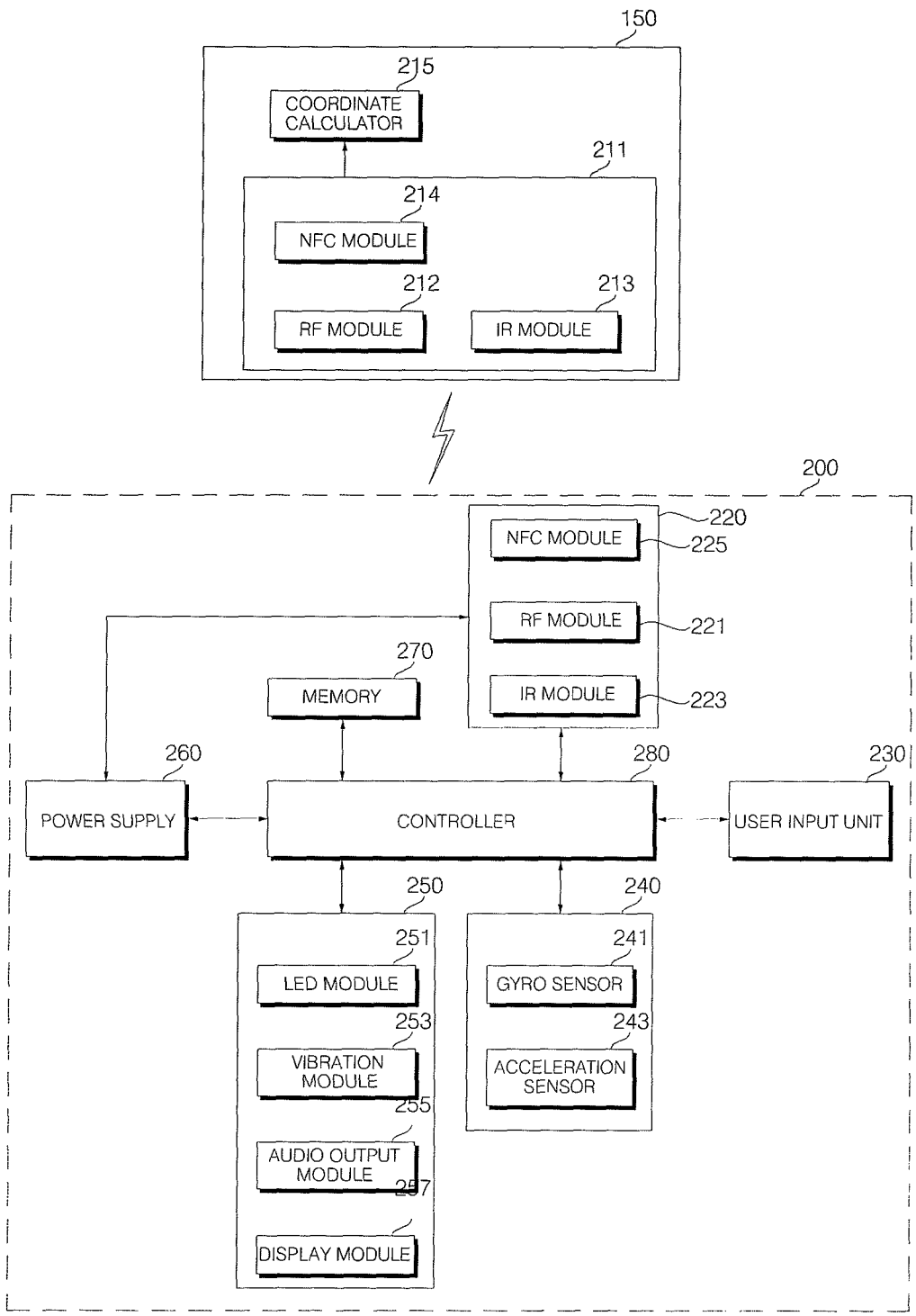
FIG. 5 is a block diagram of the remote controller illustrated in FIG. 1.

FIG. 5 is a block diagram of the remote controller illustrated in FIG. 1.

Referring to FIG. 5, the remote controller 200 may include a wireless communication module 220, a user input unit 230, a sensor unit 240, an output unit 250, a power supply 260, a memory 270, and a controller 280.

The wireless communication module 220 may transmit signals to and/or receive signals from the image display apparatus 100 and/or other electronic devices such as the mobile terminal 300. For instance, the wireless communication module 220 can communicate with the user input interface 150 of the image display apparatus 100. The user input interface 150 can include a coordinate calculator 215 and a communication module 211 which includes an RF module 212 and an IR module 213.

In the embodiment of the present invention, the wireless communication module 220 may include an RF module 221 for transmitting RF signals to and/or receiving RF signals from the RF module 212 of the image display apparatus 100 according to an RF communication standard. The wireless communication module 220 may also include an IR module 223 for transmitting IR signals to and/or receiving IR signals from the IR module 213 of the image display apparatus 100 according to an IR communication standard.

The remote controller 200 may further include an NFC module 225 for communicating with the first external device by NFC.

The remote controller 200 transmits motion information regarding its movement with respect to the image display apparatus 100 through the RF module 221 in the embodiment of the present invention. The coordinate calculator 215 may calculate the position of the pointer on the display 180 based on the motion information.

The remote controller 200 may also receive signals from the image display apparatus 100 through the RF module 221. The remote controller 200 may transmit commands, such as a power on/off command, a channel switching command, or a sound volume change command, to the image display apparatus 100 through the IR module 223, as needed.

In accordance with the embodiment of the present invention, the remote controller 200 may receive the user information and/or the device information from the first external device (e.g., the mobile terminal 300) by NFC communication.

The remote controller 200 may transmit the received user information and/or the device information to the image display apparatus 100 by IR or RF communication. As a variation, the remote controller 200 may communicate the received information to the image display apparatus 100 via other short-range communication techniques.

In addition to the user information, the remote controller 200 may receive information about a Web server connected based on the user information. For example, the remote controller 200 may receive information about an SNS Web server to which the mobile terminal 300 is logging in. The Web server information may also be transmitted from the remote controller 200 to the image display apparatus 100.

Meanwhile, the remote controller 200 may receive, from the first external device, remote controllable channel, frequency or code information about nearby second external device(s) and assign a channel, frequency, or code to a specific second external device based on the information about the second external devices, for remotely controlling the specific second external device.

The user input unit 230 may include a keypad, a plurality of buttons, a touch pad, and/or a touch screen. The user may enter commands to the image display apparatus 100 by manipulating the user input unit 230. If the user input unit 230 includes a plurality of hard-key buttons, the user may input various commands to the image display apparatus 100 by pressing the hard-key buttons. Alternatively or additionally, if the user input unit 230 includes a touch screen displaying a plurality of soft keys, the user may input various commands to the image display apparatus 100 by touching the soft keys. The user input unit 230 may also include various input tools other than those set forth herein, such as a scroll key and/or a jog key, which should not be construed as limiting the present invention.

The sensor unit 240 may include a gyro sensor 241 and/or an acceleration sensor 243. For example, the gyro sensor 241 may sense the movement of the remote controller 200, for example, in X-, Y-, and Z-axis directions, and the acceleration sensor 243 may sense the moving speed of the remote controller 200. The sensor unit 240 may further include a distance sensor for sensing the distance between the remote controller 200 and the display 180.

The output unit 250 may output a video and/or audio signal corresponding to a manipulation of the user input unit 230 or a signal transmitted by the image display apparatus 100. The user may easily identify whether the user input unit 230 has been manipulated or whether the image display apparatus 100 has been controlled based on the video and/or audio signal output from the output unit 250.

The output unit 250 may include a Light Emitting Diode (LED) module 251 which is turned on or off whenever the user input unit 230 is manipulated or whenever a signal is received from or transmitted to the image display apparatus 100 through the wireless communication module 220, a vibration module 253 which generates vibrations, an audio output module 255 which outputs audio data, and a display module 257 which outputs an image.

The power supply 260 supplies power to the remote controller 200. If the remote controller 200 is kept stationary for a predetermined time or longer, the power supply 260 may, for example, reduce or cut off the supply of power to the remote controller 801 in order to save power. The power supply 260 may resume the supply of power if a specific key on the remote controller 200 is manipulated.

The memory 270 may store various application data for controlling or operating the remote controller 200. The remote controller 200 may wirelessly transmit signals to and/or receive signals from the image display apparatus 100 in a predetermined frequency band through the RF module 221. The controller 280 of the remote controller 200 may store information regarding the frequency band used for the remote controller 200 to wirelessly transmit signals to and/or wirelessly receive signals from the paired image display apparatus 100 in the memory 270 and may then refer to this information for use at a later time.

The controller 280 provides overall control of the remote controller 200. For example, the controller 280 may transmit a signal corresponding to a key manipulation detected from the user input unit 230 or a signal corresponding to motion of the remote controller 200, as sensed by the sensor unit 240, to the image display apparatus 100 through the wireless communication module 220.

The controller 280 may control transmission of the user information received from the first external device by NFC, to a second external device, for example, the image display apparatus 100 through the wireless communication module 220. Especially, upon receipt of a specific key input from the user input unit 230, the controller 280 may control transmission of the received user information to the image display apparatus 100 through the wireless communication module 220.

Besides, the controller 280 may control transmission of the received user information to second external devices other than the image display apparatus 100 through the wireless communication module 220. Herein, the controller 280 may use a different channel, frequency or code for each of the second external devices. Information about the channels, frequencies, or codes may be received from the first external device or the respective second external devices.

In the embodiment of the present invention, the and/or other electronic devices such as the mobile terminal 300. For instance, the wireless communication module 220 can communicate with the user input interface 150 of the image display apparatus 100 may include a wireless communication module 211 for wirelessly transmitting and receiving signals to and from the remote controller 200, and a. The user input interface 150 can include a coordinate calculator 215 for calculating the coordinates of the pointer corresponding to an operation of the remote controller 200. Further, the interface 150 may transmit and receive signals wirelessly to and from the remote controller 200 through the and a communication module 211 which includes an RF module 212. The interface 150 may also receive a signal from the remote controller 200 through the and an IR module 213 based on the IR communication standard.

The wireless communication module 211 may further include an NFC module 214 for communicating with an electronic device by NFC.

The coordinate calculator 215 may calculate the coordinates (x, y) of the pointer to be displayed on the display 180 by correcting a handshaking or errors from a signal corresponding to an operation of the remote controller 200 received through the wireless communication module 211.

Thereafter, a signal received from the remote controller 200 through the interface 150 is provided to the controller 170 of the image display apparatus 100. The controller 170 may identify information about an operation of the remote controller 200 or a key manipulation on the remote controller 200 from the signal received from the remote controller 200 and control the image display apparatus 100 according to the identical information.

In another example, the remote controller 200 may calculate the coordinates of the pointer corresponding to the operation of the pointing device and output the coordinates to the interface 150 of the image display apparatus 100. The interface 150 of the image display apparatus 100 may then transmit the received coordinate information to the controller 170 without correcting a handshaking or errors.

Figure 6:
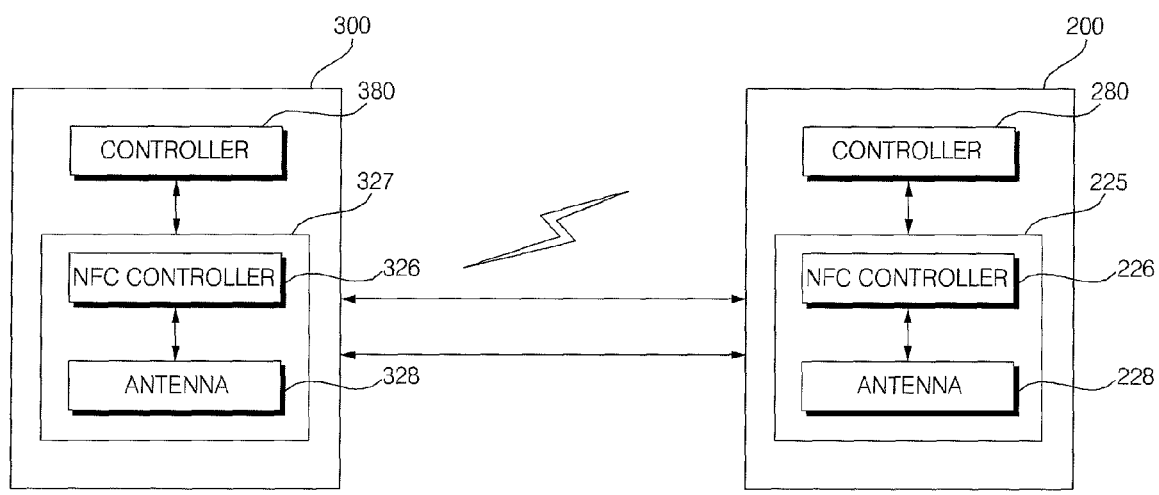
FIG. 6 is a block diagram of a mobile terminal and the remote controller, referred to for describing Near Field Communication (NFC) communication between the mobile terminal and the remote controller according to an embodiment of the present invention.

FIG. 6 is a block diagram of the mobile terminal and the remote controller, referred to for describing NFC communication between the mobile terminal and the remote controller according to an embodiment of the present invention.

Referring to FIG. 6, the mobile terminal 300 and the remote controller 200 may exchange data by NFC. For NFC communication, the mobile terminal 300 may be equipped with an NFC module 327 including an NFC controller 326 and an antenna 328 and the remote controller 200 may also be equipped with the NFC module 225 including an NFC controller 226 and an antenna 228.

For example, when the user brings the mobile terminal 300 or the remote controller 200 within a predetermined distance of the remote controller 200 or the mobile terminal 300 (i.e. tagging), a magnetic field is created and the remote controller 200 may receive user information from the mobile terminal 300 according to a variation in the magnetic field.

Preferably there can be three NFC modes: Card Emulation (CE) mode, Reader/Writer mode, and peer to peer mode. Herein, the user information may be transmitted between the mobile terminal 300 and the remote controller 200 in the Reader/Writer mode or the peer to peer mode.

While each of the NFC modules 325 and 225 is shown in FIG. 6 as an active type including an NFC controller and an antenna, by way of example, the NFC modules 325 and 225 may be a passive type including a tag-type NFC memory and antenna. For example, the mobile terminal 300 may include an NFC module with an antenna and an NFC memory that stores the device information and/or user information. If NFC tagging is performed between the mobile terminal 300 and the remote controller 200, the mobile terminal 300 may transmit the user information to the remote controller 200.

The following description will be given, centering on an active NFC module.

To transmit the user information, a controller 480 of the mobile terminal 300 outputs the user information to the NFC module 327. In the NFC module 327, the NFC controller 326 converts the user information and controls transmission of the converted user information through the antenna 328. The user information may be pre-stored in the controller 480 or a memory of the mobile terminal 300.

The antenna 228 of the remote controller 200 receives the user information from the mobile terminal 300 and provides the user information to the controller 280 through the NFC controller 226. The controller 280 controls transmission of the user information to other electronic devices including the image display apparatus 100 through the wireless communication module 220 of the remote controller 200.

Besides the user information, the remote controller 200 may further receive the device information and/or information about a Web server to which the mobile terminal 300 or other electronic devices are logging in.

The mobile terminal 300 may be a hand-held phone, a smart phone, a laptop computer, a tablet PC, etc.

When two electronic devices are conducting NFC communication through tagging, one of them may act as an NFC initiator and the other may act as an NFC target. The roles of the electronic devices may be assigned in the following rule.

First of all, a portable device operates as an NFC initiator.

If both electronic devices like the mobile terminal 300 and the remote controller 200 are portable devices, an electronic device connected to a network may be an NFC initiator and the other electronic device may be an NFC target. For example, if the mobile terminal 300 is connected to a network, the mobile terminal 300 may act as an NFC initiator.

If both electronic devices, e.g., both the mobile terminal 300 and the remote controller 200, are connected to the network, an active NFC module may act as an NFC initiator and a passive NFC module may act as an NFC target. The passive NFC module can take the form of a tag, including an NFC antenna and a memory, without a controller.

Figure 7:
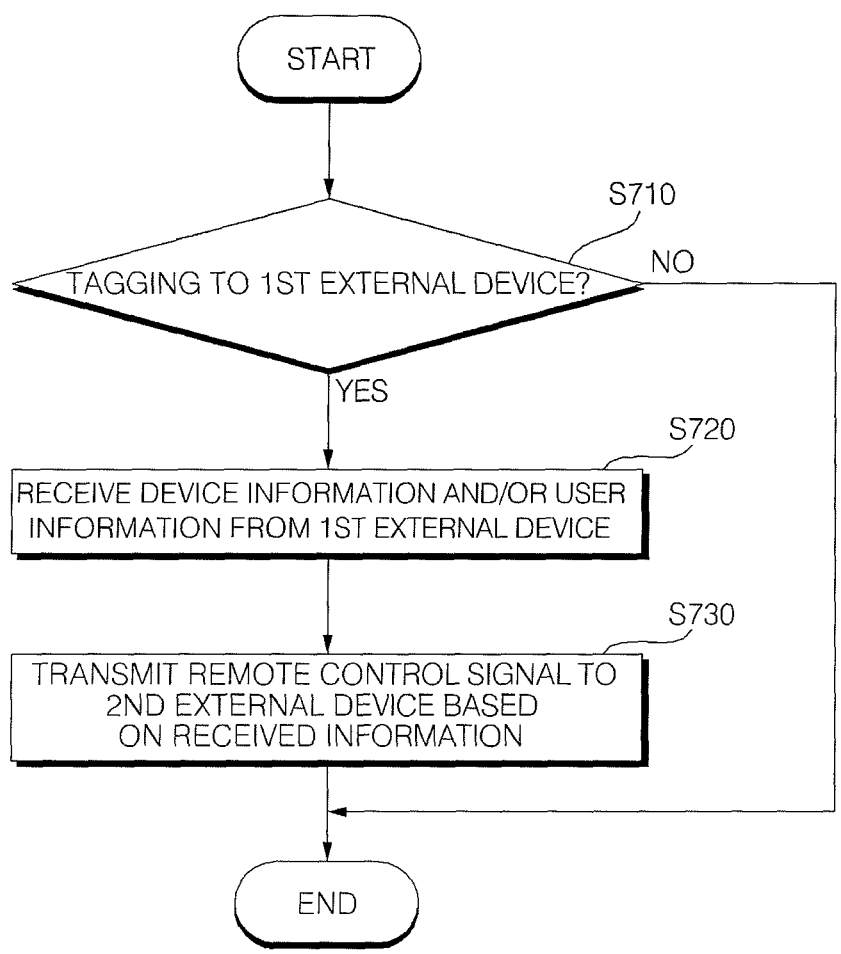
FIG. 7 is a flowchart illustrating a method for operating the remote controller according to an embodiment of the present invention.
Figure 8:
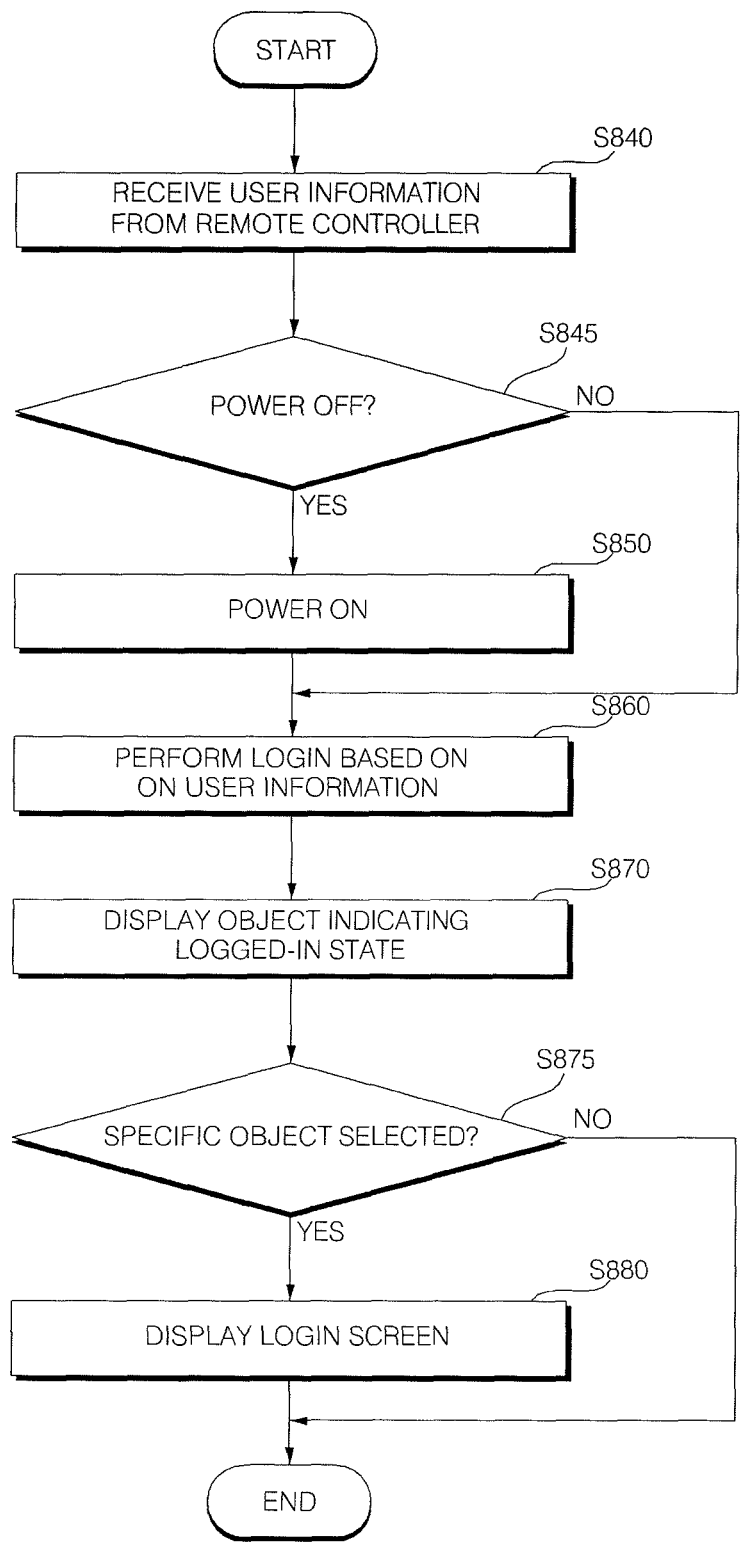
FIG. 8 is flowchart illustrating a method for operating the image display apparatus according to an embodiment of the present invention.

FIG. 7 is a flowchart illustrating a method for operating an electronic device, e.g., the remote controller 200 according to an embodiment of the present invention, FIG. 8 is flowchart illustrating a method for operating the image display apparatus 100 according to an embodiment of the present invention, and FIGS. 9 to 15 are views referred to for describing examples of the method for operating the remote controller 200 illustrated in FIG. 7 and the method for operating the image display apparatus 100 illustrated in FIG. 8 according to embodiments of the present invention.

Referring to FIG. 7, when a first external device is brought within a predetermined distance from the remote controller 200 (i.e., tagging has occurred) (S710), the remote controller 200 receives device information and/or user information from the first external device (S720). The remote controller 200 here is an example of the electronic device.

In one example, FIG. 10(a) illustrates the remote controller 200 as the electronic device and the mobile terminal 300 as the first external device, by way of example. When the remote controller 200 is brought within a predetermined distance of the mobile terminal 300, the mobile terminal 300 transmits its stored user information Sa to the remote controller 200 by NFC communication. For instance, the user of the mobile terminal 300 can position the mobile terminal 300 near the remote controller 200, which in turn automatically causes at least one of the user information and device information stored in the mobile terminal 300 to be sent to the remote controller 200 via the NFC communication.

Subsequently, the remote controller 200 transmits a remote control signal to a second external device based on the received device information and/or user information (S730). The remote controller 200 may transmit the received user information to the second external device, for example, the image display apparatus 100. This can occur via a short range communication such as IR or RF communication. If the image display apparatus 100 is in a power-off state, it may be powered on so that the user information and/or device information from the remote controller 200 can be sent to the image display apparatus 100. Preferably, the user and/or device information is for accessing the second external device(s), and is related to the second external device(s).

The user information may also be transmitted to at least one other second external device that can be remotely controlled. For instance, the remote controller 200 may transmit the user information and/or device information received from the mobile terminal 300 to one or more of the NAS 400, the refrigerator 500, the washing machine 600, and the air conditioner 700, as illustrated in FIG. 1.

If the remote controller 200 has prior knowledge of different communication schemes that enable communication between the remote controller 200 and each specific second external device, the remote controller 200 may transmit the user information to the second external devices in the set different communication schemes at one time or sequentially.

FIG. 10(b) illustrates an exemplary case where the remote controller 200 transmits the same user information received from the first external device to the image display apparatus 100 in a first communication scheme Sb1, to the NAS 400 in a second communication scheme Sb2, to the refrigerator 500 in a third communication scheme Sb3, to the washing machine 600 in a fourth communication scheme Sb4, and to the air conditioner 700 in a fifth communication scheme Sb5.

The first to fifth communication schemes Sb1 to Sb5 may be different from NFC communication, and may be, for example, IR communication, RF communication, etc. Different channels, frequencies or codes may be assigned for the transmission of the user information in the first to fifth communication schemes Sb1 to Sb5. The first to fifth communications can occur simultaneously, sequentially, or in some preferred order.

If the remote controller 200 has already received or has pre-stored device information about the second external devices 400 to 700, it may assign channels, frequencies, or codes to the second external devices 400 to 700 based on such device information. Accordingly, the remote controller 200 may readily communicate with one or more of the second external devices 400 to 700.

As a variation, the remote controller 200 may receive the device information about the second external devices 400 to 700 from the mobile terminal 300 and assign channels, frequencies, or codes to the second external devices 400 to 700 based on the device information. Accordingly, the remote controller 200 may readily communicate with other second external devices 400 to 700.

It may be further contemplated that the remote controller 200 transmits the user information only to a powered-on second external device. Therefore, only the powered-on second external device may receive the user information from the remote controller 200 and thus may perform login based on the user information.

When a specific key of the remote controller 200 is manipulated, the user information may be transmitted from the remote controller 200 to the second external device(s). Accordingly, the user information transmission may take place only when a user wants to.

After receiving the user information, one or more of the NAS 400, the refrigerator 500, the washing machine 600, and the air conditioner 700 may operate according to the received user information. Using the received user information, each of the devices 100, 400, 500, 600, 700, etc. may perform the user-specific or user-preferred operations.

For example, a preset operation may be performed according to the user information. Specifically, the NAS 400 may perform a login using the received user information and thus may display or provide a menu, file, etc. available to the specific user of the user information.

In another example, the refrigerator 500 may display a list of food items that the user is refrigerating, a list of grocery to buy, or recipes that suit the user's tastes or preferences, based on the user information.

In another example, the washing machine 600 may change a washing course, a washing mode, etc. according to the user information. For instance, the number of rinsing operations, the duration of a washing operation, the number of dehydration operations, or the duration of dehydration may be changed according to the received user information. This implies that the operation of the washing machine 600 may be customized to the specific user according to the user information of that specific user.

In a further example, the air conditioner 700 may change its operation mode according to the user information. For example, the air conditioner 700 may operate in a dehumidification mode. When operating in a cooling mode, the air conditioner 700 may change the duration of cooling, the number of cooling operations, or a target temperature. That is, the air conditioner 700 may operate in a customized manner for each user associated with the received user information.

FIG. 8 is a flowchart illustrating a method for operating the image display apparatus 100 according to an embodiment of the present invention. Other second external devices may operate in the same manner as or in a similar manner to the image display apparatus 100. The second external devices include the devices 100, 400, 500, 600, 700, etc.

Referring to FIG. 8, the image display apparatus 100 receives user information from the remote controller 200 (S840). Specifically, the user input interface 150 of the image display apparatus 100 receives the user information from the remote controller 200. As mentioned above, preferably the user information sent from the remote controller 200 is the user information that the remote controller 200 received from the mobile terminal 300 via the NFC communication or other means. Thus using the short-range communications, information and data can be easily transferred from one device to another.

As discussed above, the user information may include at least one of information about a user ID, password, and e-mail address needed to use the first external device, e.g., the mobile terminal 300, information about a user ID, password, and e-mail address needed to use the image display apparatus 100 and/or other external devices such as the devices 400, 500, 600, 700, etc., information about a common user ID or password for a plurality of electronic devices including the mobile terminal 300, information about a user ID and password that are pre-stored in the mobile terminal 300 to access a specific Web server, information about a user ID and password needed to access a specific Web server in the mobile terminal 300 and the image display apparatus 100, and information about a user ID and password required to access a server connected to the image display apparatus 100.

After receiving the user information, the controller 170 determines whether the image display apparatus 100 is in a power-off state, specifically in an idle mode (S845). If the image display apparatus 100 is in the power-off state, the controller 170 controls power-on of the image display apparatus 100 (S850). For this purpose, the controller 170 controls the power supply. Preferably, the user input interface 150 configured to receive the user information is active even in the idle mode so that the image display apparatus 100 can still receive the user information from the remote controller 200 even in the idle/sleep mode.

The image display apparatus 100 performs a login operation in according to the received user information (S860). For example, the controller 170 may control a login to the image display apparatus 100, a login to a server connected to the image display apparatus 100, and/or a login to a Web server connected to the mobile terminal 300, according to the received user information.

In this manner, the mobile terminal 300 transmits its user information to the remote controller 200 by NFC communication and thus the image display apparatus 100 automatically performs the login operation using the user information received from the remote controller 200 without any additional input from the user. Therefore, user convenience can be increased.

Other second external devices may perform a login in the same manner. For instance, transmission of the user information received from the single remote controller 300 can trigger simultaneous automatic login operations in the other second external devices, thereby further increasing user convenience. As a variation, different user information (e.g., different login information) for different second external devices may be received by the remote controller 200 from the mobile terminal 300. In that case, the remote controller 200 may send only specific user information for the corresponding second external device for each of the second external devices so that a proper login to the corresponding second external device can occur using the correct user information. Still as another variation, the same user information may be used to login to all second external devices.

When the login has been performed based on the user information, an object indicating the login is displayed on the display 180 (S870). For instance, whenever the login to any of the second external devices has been completed, such may be indicated to the user on the display 180 so that the user can know which devices are logged in and which devices are not.

In an example, a plurality of different objects corresponding respectively to the different second external devices may be displayed on the display 180. Such objects may also indicate that the login is completed. If the user desires a more detailed or a specific information, then one specific object among the displayed objects corresponding to the desired second external device can be selected by the user using the remote controller 200. Upon the selection of the specific object (S875), a login screen set for the specific object is displayed on the display 180 (S880). This login screen can provide more detailed information regarding the login operation performed for the corresponding second external device.

As the controller 170 controls the displaying of the object indicating the logged-in information on the display 180 after the login operation is completed, the user can readily identify the logged-in state for one or more of the second external devices.

If logins to a plurality of Web servers are performed (e.g., because the user information includes login information for accessing such Web servers/sites), icons or item corresponding to these Web servers/sites may be indicated to the user on the display 180. As a variation, information on the already-logged-in Web servers by the mobile terminal 300 may be sent from the mobile terminal 300 to the remote controller 200. When the user selects one of the logged-in Web servers displayed on the display 180, a Web page received from the selected Web server may be displayed on the display 180. Therefore, the user can readily view the Web page of the intended Web server.

Figure 9:
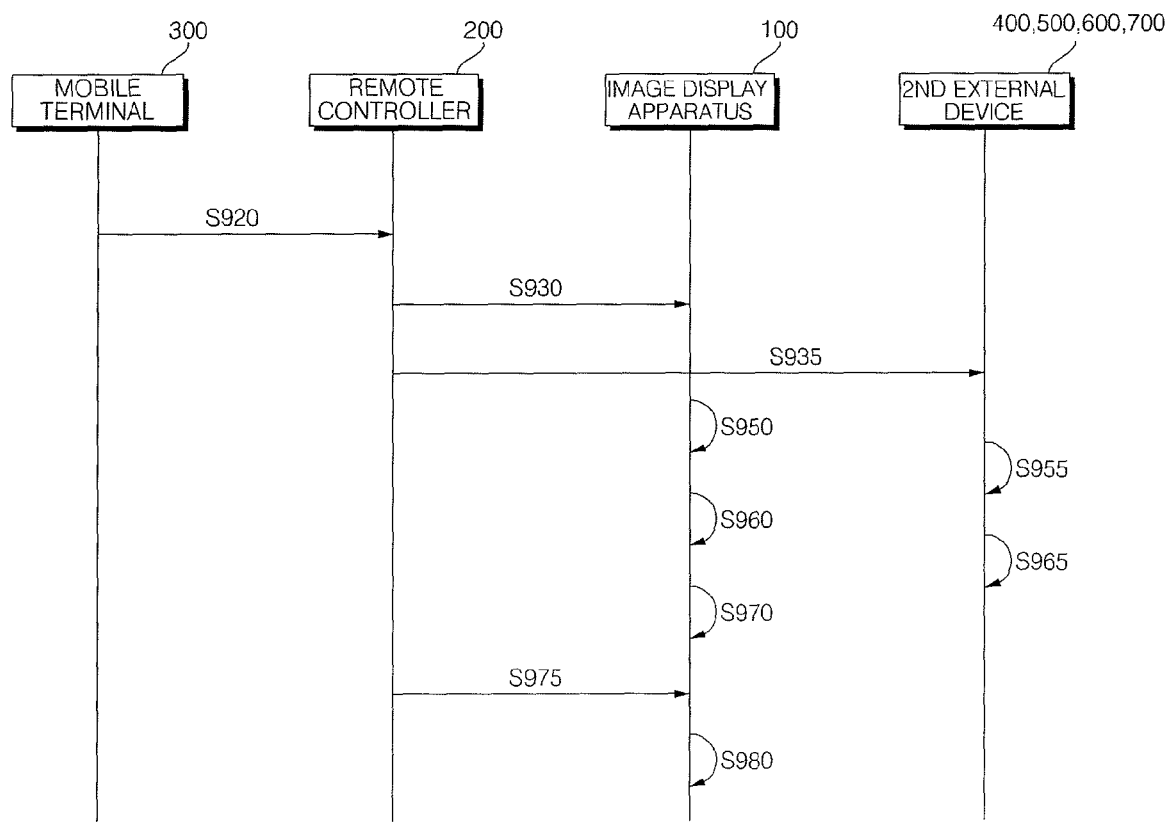

FIG. 9 is a diagram referred to for describing the method for operating the remote controller illustrated in FIG. 7 and the method for operating the image display apparatus illustrated in FIG. 8, in conjunction with each other.

Referring to FIG. 9, the mobile terminal 300 transmits the user information to the remote controller 200 (S920 corresponding to S720 of FIG. 7). The user information may be transmitted by the NFC communication.

The remote controller 200 transmits the user information to the image display apparatus 100 (second external device) (S930 corresponding to S730 of FIG. 7). Herein, the user information may be transmitted by RF communication. The remote controller 200 also transmits the user information to other second electronic devices 400 to 700 (S935 similar to S730 of FIG. 7). In this case, the user information may be transmitted by IR communication.

If the image display apparatus 100 receives the user information in a power-off state or an idle/sleep mode, it may be powered on (S950 corresponding to S850 of FIG. 8). If the other second external devices 400 to 700 receive the user information in a power-off state or an idle/sleep mode, they may also be powered on (S955 similar to S850 of FIG. 8).

The image display apparatus 100 may perform a login operation automatically based on the received user information (S960 corresponding to S860 of FIG. 8). The other second external devices 400 to 700 may each also perform a login operation automatically using the received user information (S965 similar to S860 of FIG. 8). As a result, by merely placing the mobile terminal 300 near the remote controller 200, the user can automatically be logged-into one or more devices 100, 400, 500, 600, 700, etc. and thereby control such devices.

The image display apparatus 100 displays an object indicating the logged-in state on the display 180 (S970 corresponding to S870 of FIG. 8).

Upon selection of a specific object from among the displayed objects by the remote controller 200 (S975 corresponding to S875 of FIG. 8), the image display apparatus 100 displays a login screen corresponding to the selected object (S980 corresponding to S880 of FIG. 8).

FIGS. 10(a) to 15 are views referred to for describing examples of the method for operating the remote controller illustrated in FIG. 7 and the method for operating the image display apparatus illustrated in FIG. 8, according to an embodiment of the present invention.

Referring to FIG. 10(a), when the remote controller 200 and the mobile terminal 300 are brought together within a predetermined distance of each other or are touching each other (i.e., tagging has occurred), the mobile terminal 300 transmits the user information Sa and/or the device information to the remote controller 200. In addition, the mobile terminal 300 may transmit information about one or more Web servers/sites to the remote controller 200.

While NFC communication is being conducted between the mobile terminal 300 as a first external device and the remote controller 200 as an electronic device in FIG. 10(a), this is purely exemplary. Thus, the remote controller 200 may communicate with a second external device such as the device 100, 400, 500, 600, 700, etc. by NFC.

In this case, the remote controller 200 may transmit to the second external device, at least one of the user information, the device information (e.g., specifying a device type and a remote-controllable channel, frequency or code), and the information about Web server(s)/site(s). Such information is provided to the remote controller 200 by the mobile terminal 300.

Referring to FIG. 10(b), the remote controller 200 transmits the user information and/or device information to at least one of the image display apparatus 100 in the first communication scheme Sb1, to the NAS 400 in the second communication scheme Sb2, to the refrigerator 500 in the third communication scheme Sb3, to the washing machine 600 in the fourth communication scheme Sb4, and to the air conditioner 700 in the fifth communication scheme Sb5. In this manner, the remote controller 200 may transmit the user information to various types of electronic devices at one time, thereby increasing user convenience. And based on the user information and/or other information, the second external device(s) can be automatically logged-in. Further, the remote controller 200 may receive information on certain Web sites/servers from the mobile terminal 300, and may send such information to the image display apparatus 100 (or other external device) which in turn can use the received information in order for the image display apparatus 100 to be logged-in to the same Web sites/servers as the mobile terminal 300.

Figure 11A:
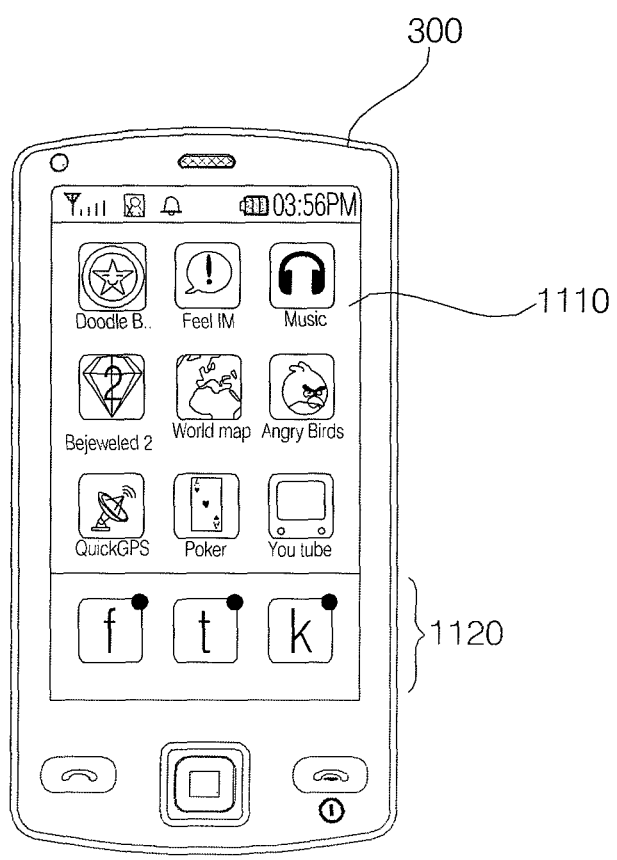

In an example, referring to FIG. 11A, a screen 1110 is displayed on the mobile terminal 300. Especially, objects 1120 indicating the logged-in Web servers/sites are displayed in a lower part of the screen 1110. And this information may be sent to the image display apparatus 100 via the remote controller 200 using the short-range communications, so that the objects 1120 may be displayed on the display 180 of the image display apparatus 100 for the user's manipulation.

For instance, referring to FIG. 11B, while a broadcast image 1105 (e.g., a movie being broadcast by a station) is being displayed on the display 180 of the image display apparatus 100, the mobile terminal 300 transmits the user information Sa to the remote controller 200 by NFC communication when the user places the mobile terminal 300 and the remote controller 200 within a predetermined distance of each other.

Figure 11C:
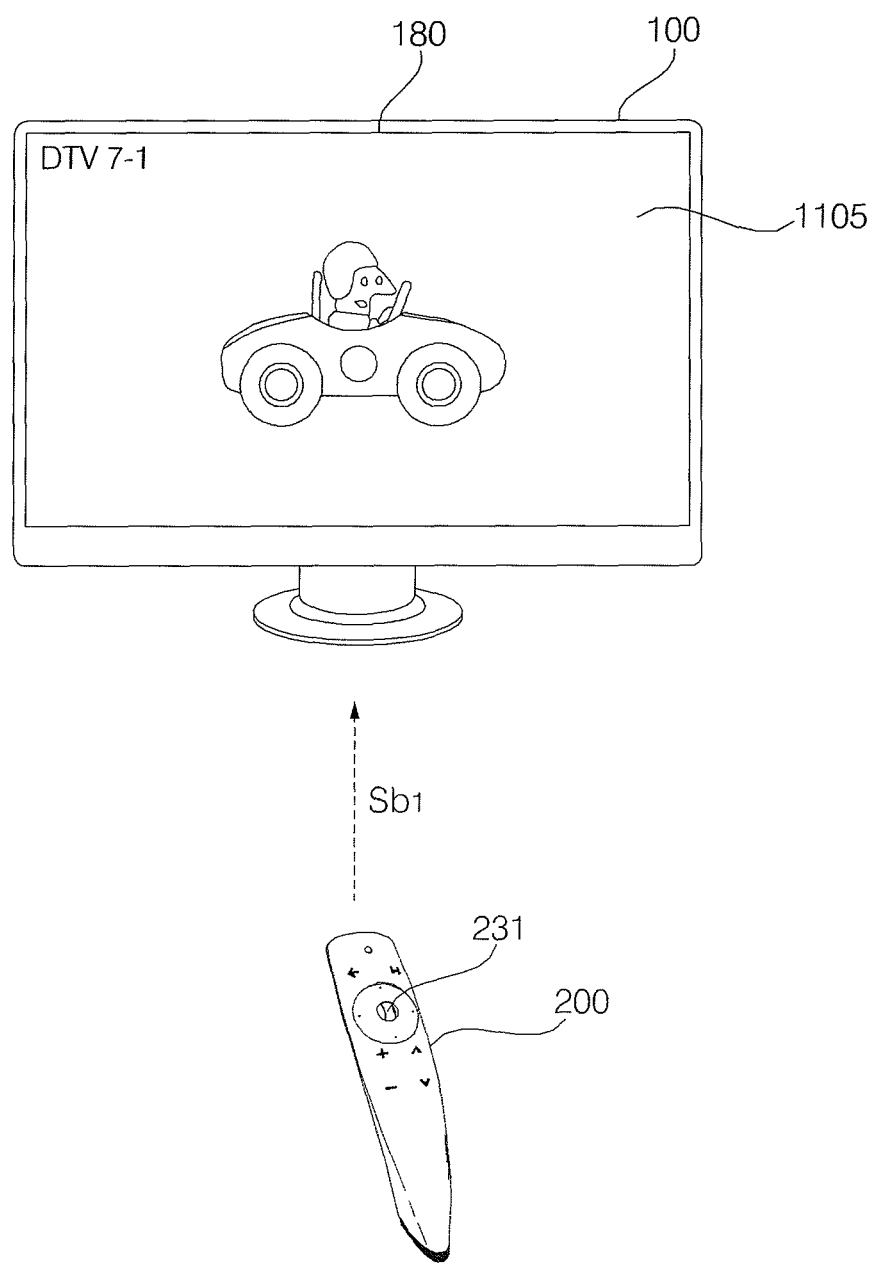

Then referring to FIG. 11C, the remote controller 200 automatically transmits the received user information to the image display apparatus 100 in the first communication scheme Sb1, for example, RF communication through a manipulation of an OK key.

Figure 11D:
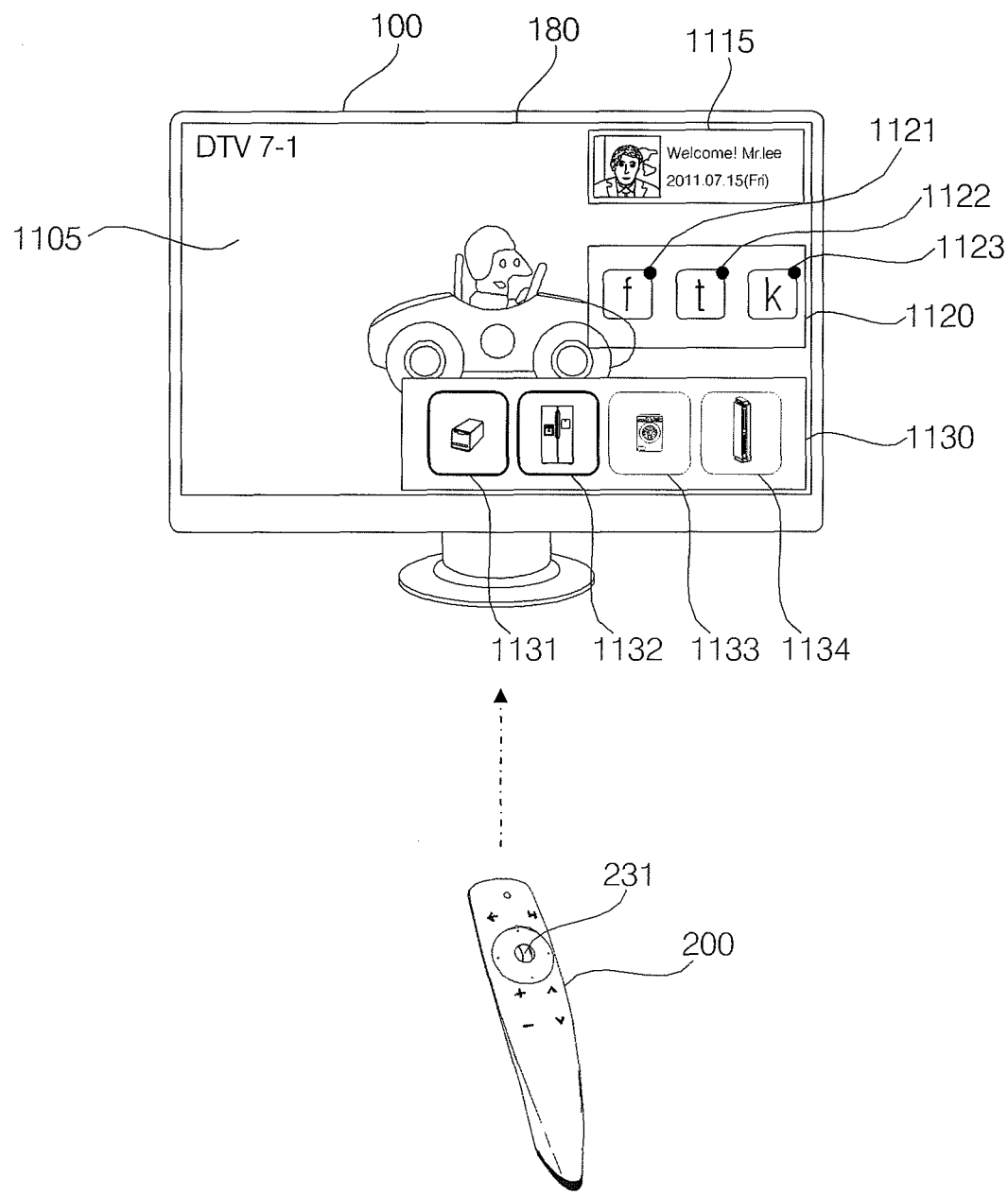

Then referring to FIG. 11D, an automatic login operation is performed based on the received user information. For instance, the objects 1120 indicating the logged-in Web servers (which can also be currently displayed on the mobile terminal as shown in FIG. 11A) are displayed to indicate that the image display apparatus 100 are also logging in to the same Web servers as the mobile terminal 300. Herein, the objects 1120 are first, second and third objects 1121, 1122, and 1123.

Upon a user's selection of the first object 1121, a Web page received from the Web server indicated by the first object 1121 may be displayed in full screen or in a part of the screen on the image display apparatus 100. Therefore, the user can readily receive a Web service from the Web server.

An object 1115 indicating the user according to the user information may further be displayed on the display 180.

In the case where other electronic devices as well as the image display apparatus 100 receive the user information and thus perform a login for such electronic devices based on the user information, objects 1130 indicating the logged-in states of the other electronic devices may be displayed as well. For instance, the objects 1130 may specifically include an object 1131 indicating the NAS, an object 1132 indicating the refrigerator, an object 1133 indicating the washing machine, and an object 1134 indicating the air conditioner. Herein, the objects 1131 and 1132 are marked to indicate the logged-in state of the NAS and the refrigerator. To accomplish this, each of the refrigerator and the image display apparatus can have a short range communication module such as a WiFi module and can directly communicate the logged-in stage of the refrigerator to the image display apparatus, or can communicate the same information via the NAS.

Instead of the logged-in state, a power-on/off state may be indicated on the display 180. For instance, the user can identify the power-on states of the NAS and the refrigerator and the power-off states of the washing machine and the air conditioner, which can be displayed on the display 180.

While the objects 1120 and 1130 are shown in FIG. 11D as overlapping with the broadcast image 1105, it is also possible that only the objects 1120 and 1130 are displayed in place of the broadcast image 1105, or that they are both displayed without being overlapped. Other display configurations are possible.

Unlike the cases illustrated in FIGS. 11A to 11D, the image display apparatus 100 may perform logging-in to Web servers that the mobile terminal 300 is not logging into, using the user information received from the mobile terminal via the remote controller 200 according to the present invention.

Figure 12A:
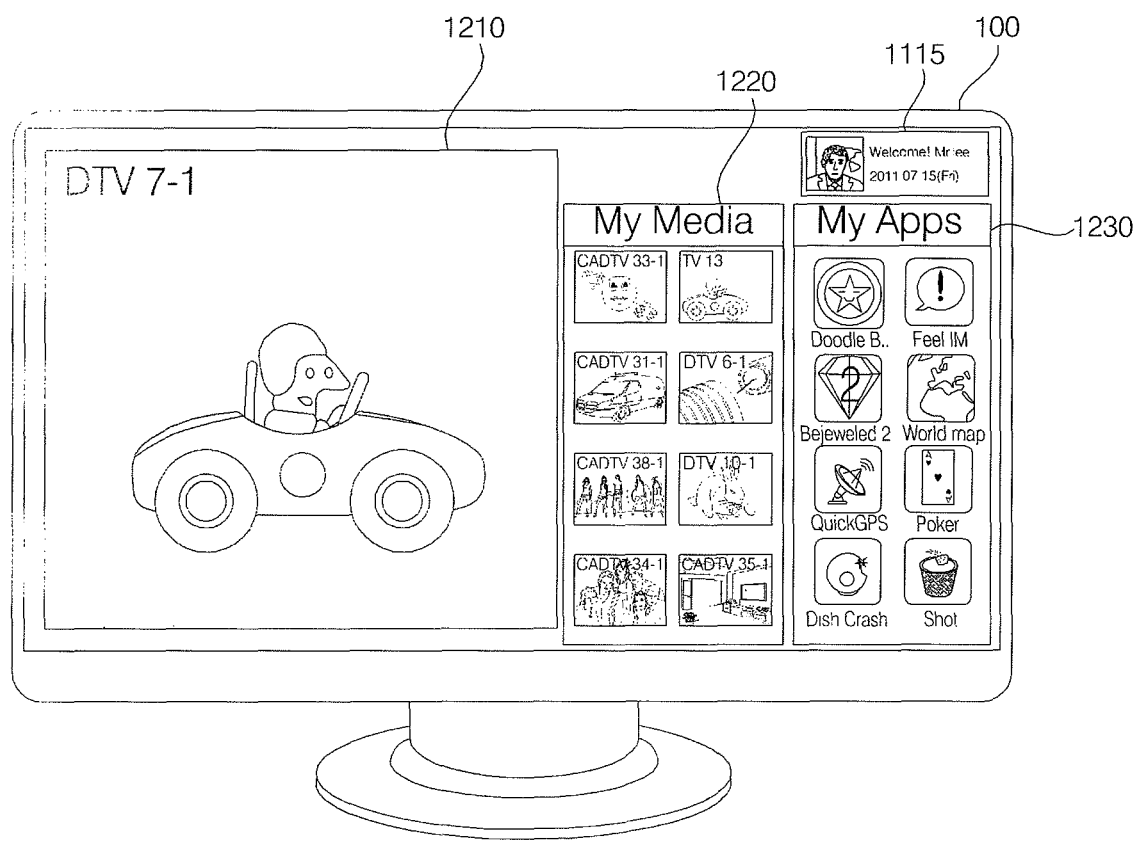
Figure 12B:
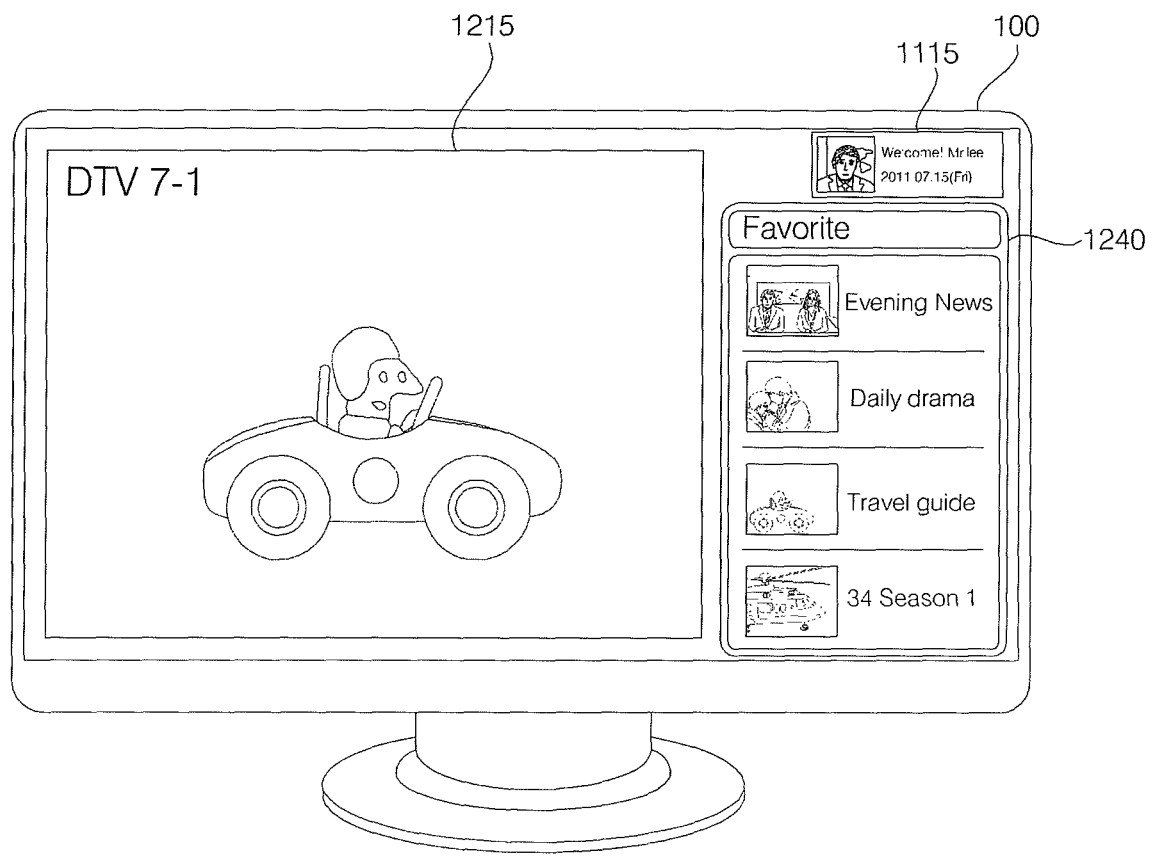
Figure 12C:
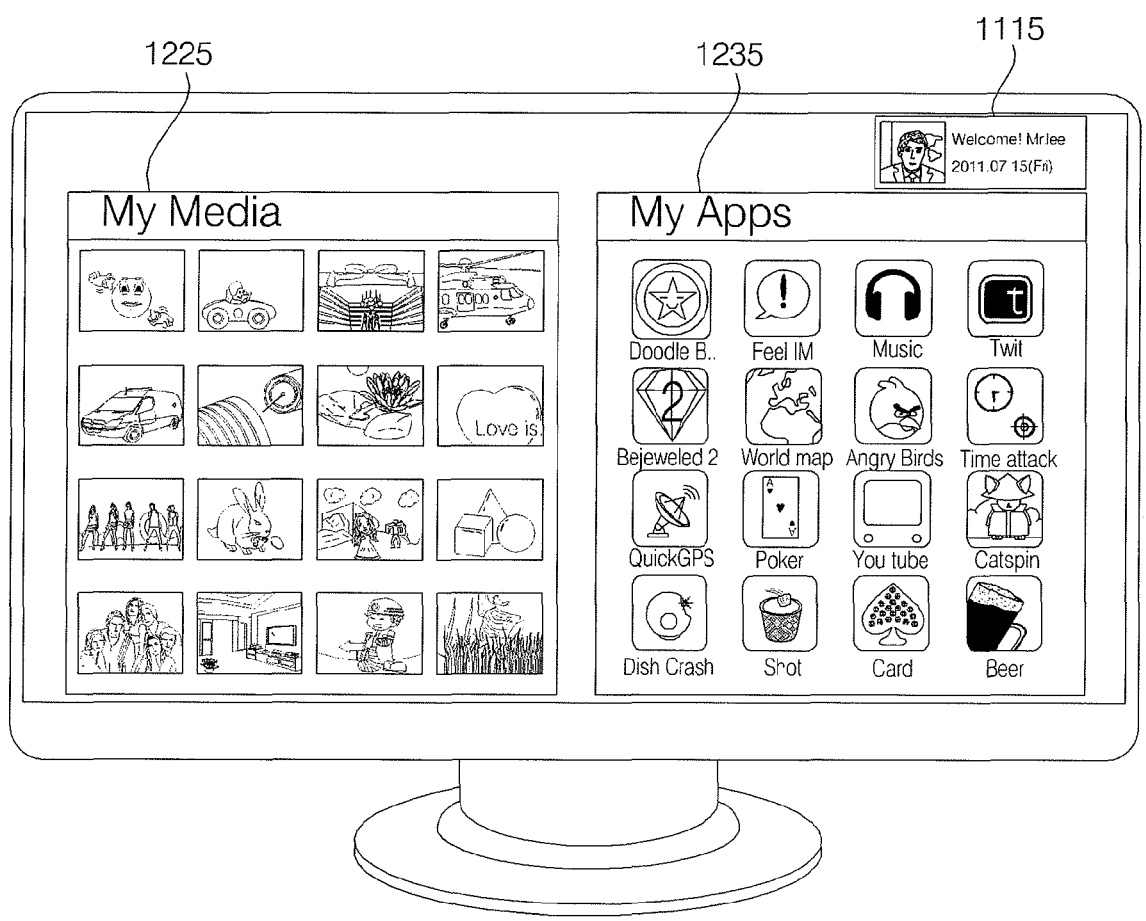

FIGS. 12A, 12B and 12C illustrate exemplary login screens displayed on the image display apparatus 100, after the login to one or more Web servers/sites are made by the image display apparatus 100 based on the user information according to an embodiment of the present invention.

Referring to FIG. 12A, a login screen may be displayed on the display of the image display apparatus 100 upon the logins to Web sites/servers or other devices are made based on the user information. The login screen may include a broadcast image 1210, a media list 1220, and an application list 1230. The media list 1220 and the application list 1230 may be preset items to be displayed on the login screen.

While the broadcast image 1210 is shown in FIG. 12A as scaled down from the broadcast image 1105 illustrated in FIG. 11B, this is purely exemplary. Thus, the broadcast image 1210 may be displayed without a change in size, and overlaid with the media list 1220 and the application list 1230.

The object 1115 indicating the user according to the user information may also be displayed on the display of the image display apparatus 100.

In addition to the media list 1220 and the application list 1230, many other lists including a schedule list may be displayed according to user settings.

In another example, referring to FIG. 12B, a login screen displayed upon the log-in(s) based on the user information may include a broadcast image 1215 and a favorite channel list 1240. The favorite channel list 1240 may be a preset item to be displayed on the login screen. The object 1115 indicating the user according to the user information may also be displayed.

In another example, referring to FIG. 12C, a login screen displayed upon the log-in(s) based on the user information may include a media list 1225 and an application list 1235 without a broadcast image. That is, a broadcast image screen may be switched to a user-set screen. The object 1115 indicating the user according to the user information may also be displayed.

FIGS. 13A to 13D illustrate an example of logging-in to a server connected to the image display apparatus, using user information according to an embodiment of the present invention.

Referring to FIG. 13A, the mobile terminal 300 transmits the user information Sa to the remote controller 200 by NFC communication as discussed above, while the image display apparatus 100 is displaying the broadcast image 1105 on the display 180 as illustrated in FIG. 11B.

Figure 13B:
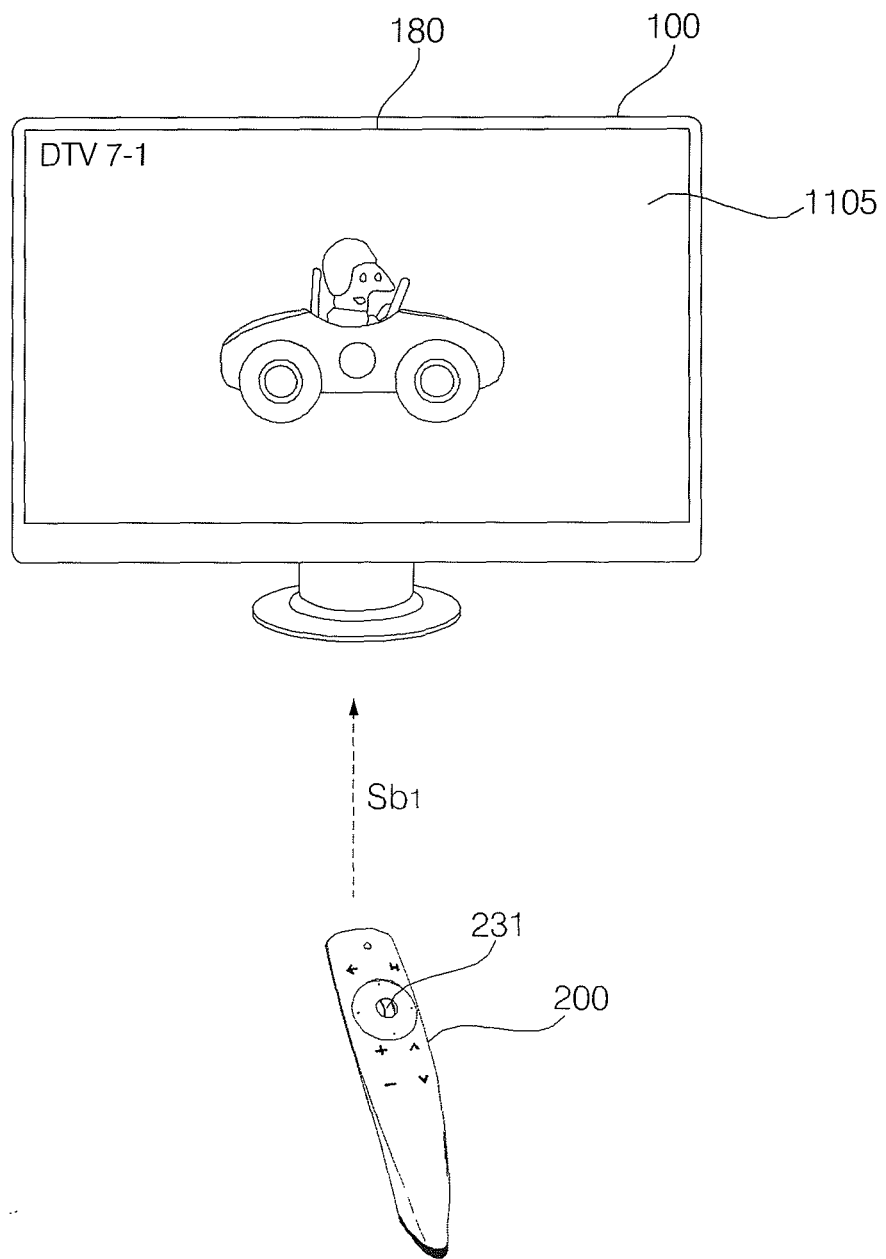

Referring to FIG. 13B, the remote controller 200 then transmits the user information received from the mobile terminal 300 to the image display apparatus 100 via a first communication scheme Sb1, for example, RF communication through a manipulation of the specific key 231 such as an OK key, as illustrated in FIG. 11C.

Figure 13C:
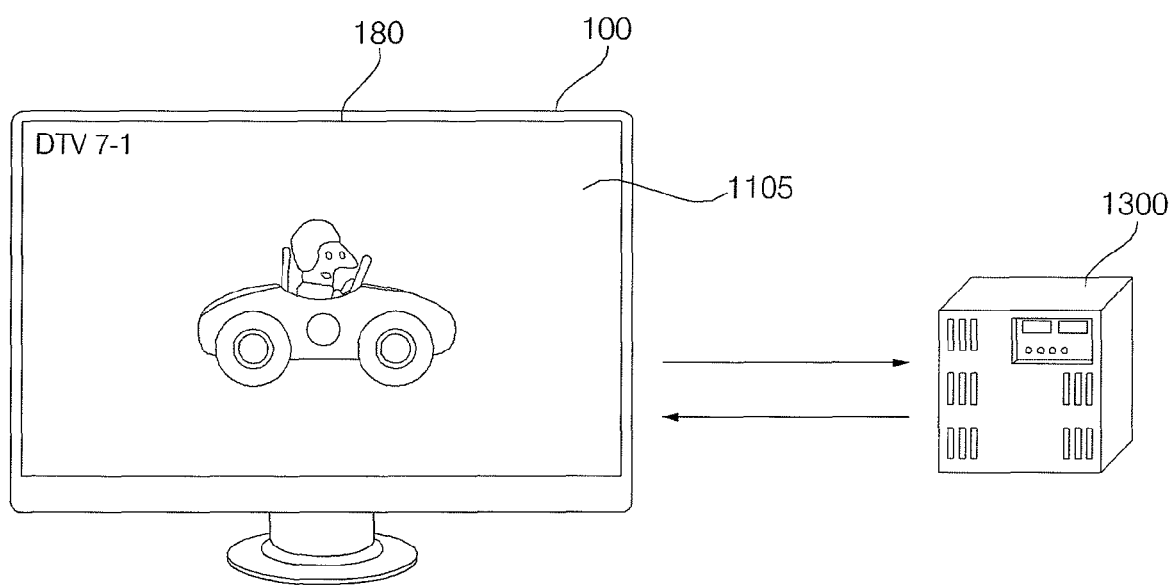

Referring to FIG. 13C, the image display apparatus 100 then logs-in to a connected server 1300 by transmitting the received user information to the server 1300 and then receives a login screen from the server 1300. The communication between the image display apparatus 100 and the server 1300 can be accomplished using a known technique such as a wireless communication.

Figure 13D:
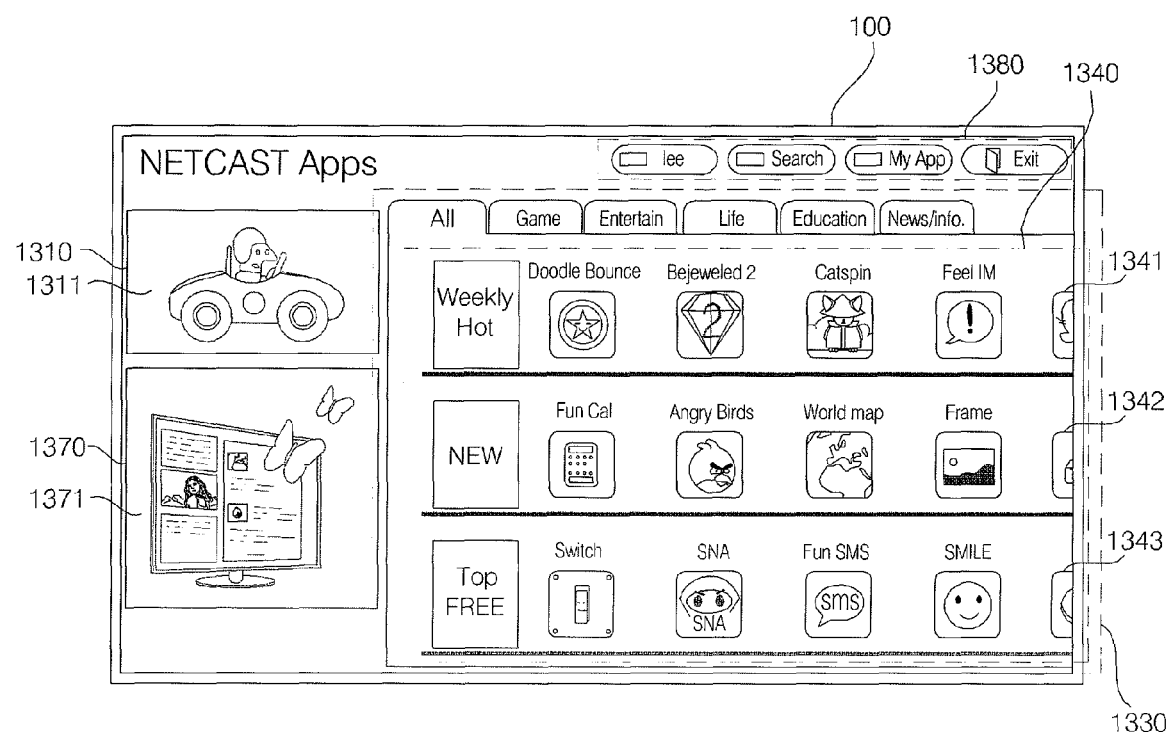

Then referring to FIG. 13D, an example of the login screen received from the server 1300 is displayed on the display 180 of the image display apparatus 100. The on-going broadcast image may be scaled down to a broadcast image 1311 and displayed in a first area 1310. An image 1340 received from the server may be displayed in a second area 1330.

The image 1340 is an app store image in FIG. 13D, by way of example. The app store image 1340 may include a plurality of applications. Some 1341, 1342 and 1343 of the applications are displayed only partially so that the user may intuitively be aware of the existence of additional applications.

An advertisement image 1371 received from a network or a connected external device or the server 1300 may be displayed in a third area 1370 and user information may be displayed in a fourth area 1380.

The server 1300 may be connected commonly to the image display apparatus 100 and the afore-described electronic devices. That is, the server may be a common network server. Alternatively or additionally, the server may be a network server provided by an image display apparatus's manufacturer. All electronic devices may commonly manage applications, content, etc. through this network server.

Figure 14A:
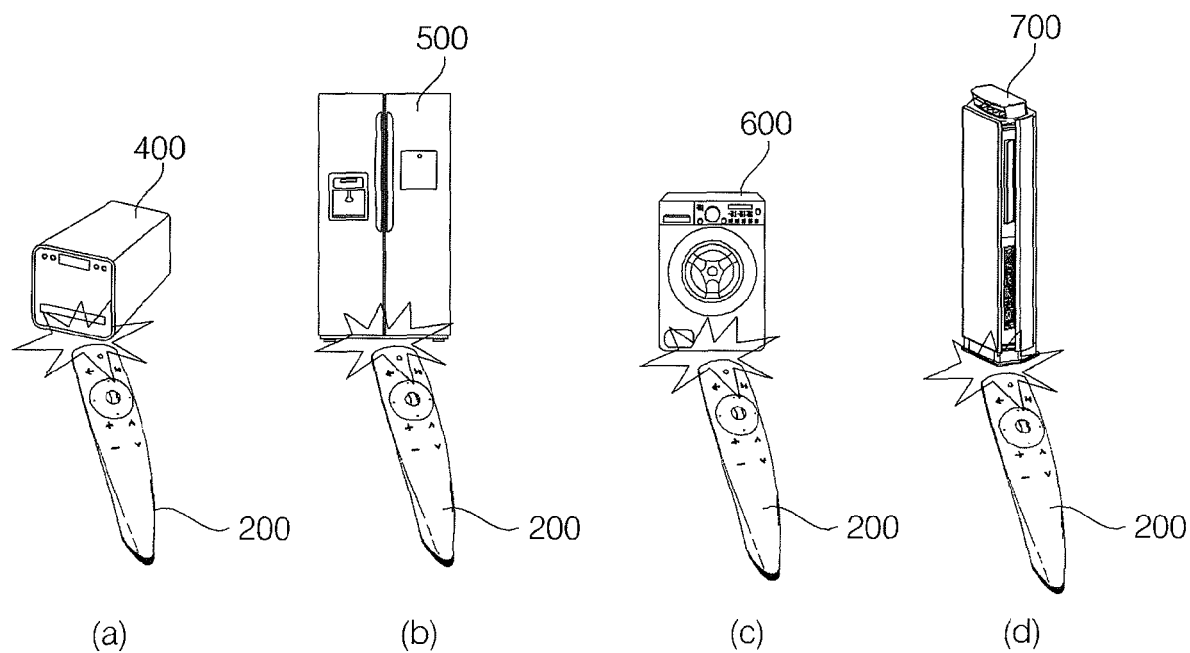
Figure 14B:
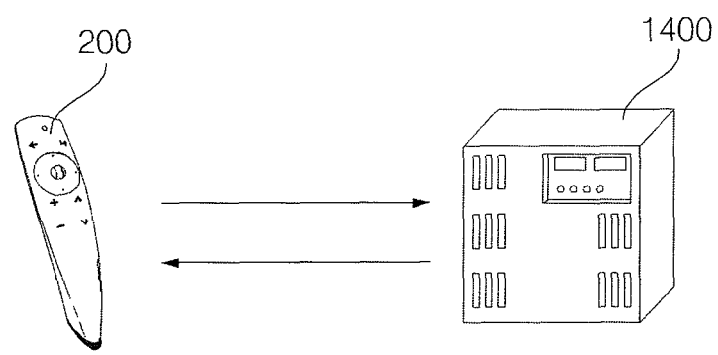
Figure 14C:
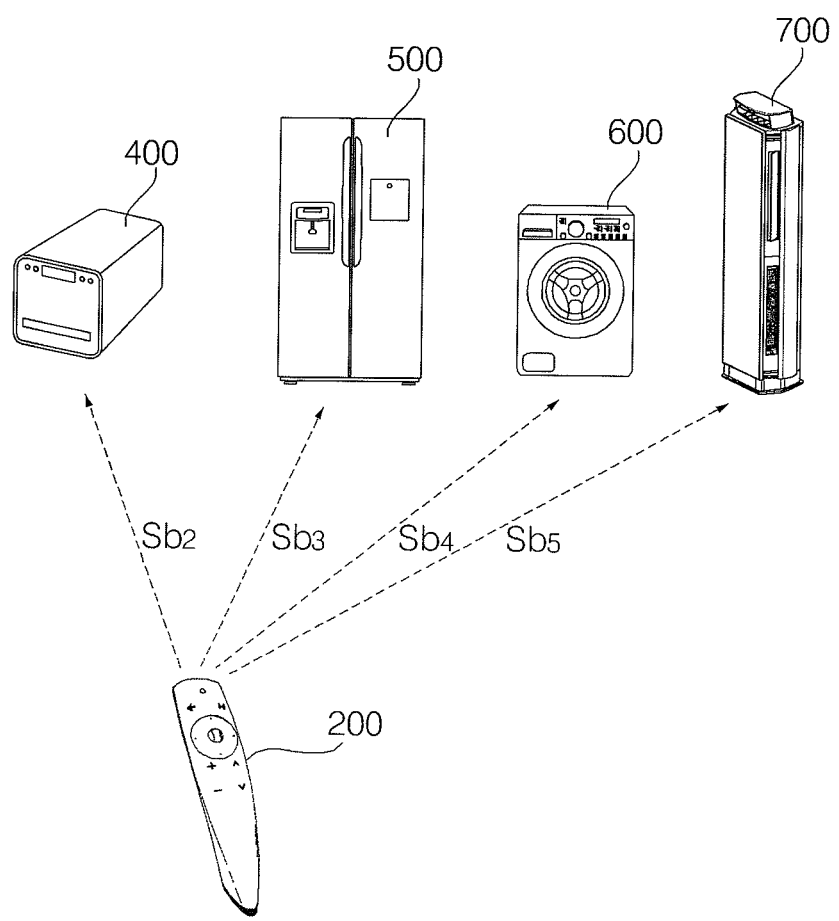

FIGS. 14A, 14B and 14C illustrate another example of one or more external devices capable of short-range communication with an electronic device according to an embodiment of the present invention.

Particularly, FIGS. 14A, 14B and 14C show an example of channel information acquisition to enable the remote controller 200 to remotely control the external device(s).

Referring to FIGS. 14A(*a*)-14(*d*), the remote controller 200 communicates with each of the external devices by NFC. The external devices are the NAS 400, the refrigerator 500, the washing machine 600, and the air conditioner 700. The remote controller 200 may receive device information about the external device with which the remote controller 200 is communicating, for example, information about a device type, a product name, etc. through NFC communication. For instance, in the example of FIG. 14A(*a*), the remote controller 200 receives device information about the NAS 400 via its NFC with the NAS 400. And using the received information, the remote controller 200 can independently control each of the external devices.

Referring to FIG. 14B, after acquiring the device information, the remote controller 200 communicates directly with a server 1400. This communication can occur via a known wireless communication technique.

If the remote controller 200 has not stored remote controllable frequency, channel or code information about each external device, the remote controller 200 preferably receives this information from each external device.

For this purpose, the remote controller 200 may transmit device information about an external device to the server 1400 and in return receive remote-controllable frequency, channel or code information about that external device from the server 1400.

Unlike the direct communication with the server 1400 illustrated in FIG. 14B, the remote controller 200 may communicate with the server 1400 through the image display apparatus 100.

Referring to FIG. 14C, the remote controller 200 controls each external device. For instance, in the case where the NAS 400 and the remote controller 200 communicate with each other by NFC as illustrated in (a) of FIG. 14A, the remote controller 200 may remotely control the NAS 400 using the frequency, channel, or code information about the NAS 400 received from the server 1400.

In another example, if the remote controller 200 communicates with the refrigerator 500 by NFC as illustrated in (b) of FIG. 14A, the remote controller 200 discontinues the remote controlling of the NAS 400, switches a current remote control mode to control the refrigerator, and then remotely controls the refrigerator 500 as illustrated in FIG. 14C.

Similarly, if the remote controller 200 communicates with the washing machine 600 by NFC as illustrated in (c) of FIG. 14A, the remote controller 200 remotely control the washing machine 600 as illustrated in FIG. 14C. If the remote controller 200 communicates with the air conditioner 700 by NFC as illustrated in (d) of FIG. 14A, the remote controller 200 remotely controls the air conditioner 700 as illustrated in FIG. 14C.

Meanwhile, the remote controller 200 may remotely control the NAS 400, the refrigerator 500, the washing machine 600, and the air conditioner 700 simultaneously based on their frequency, channel or code information received from the server 1400, rather than the remote controller 200 remotely controls them individually as illustrated in FIG. 14C. Different keys of the remote controller 200 may be used to remotely control different external devices.

FIG. 15 illustrates another exemplary external device capable of short-range communication with an electronic device according to an embodiment of the present invention.

In FIG. 15, the remote controller 200 is the electronic device and a remote controller 750 of an air conditioner (hereinafter, referred to as an A/C remote controller 750) is a first external device.

Referring to FIG. 15(a), when the remote controller 200 is brought within a predetermined distance of the A/C remote controller 750 (i.e., tagging has occurred), the A/C remote controller 750 automatically transmits device information to the remote controller 200.

Here the device information may be device information about the air conditioner 700 or about the A/C remote controller 750. Specifically, the device information here may include at least one of a device type, a product name, and a manufacturer of the air conditioner 700 and a channel, frequency, or code for remote control of the air conditioner 700. As a result, by the tagging operation, the remote controller 200 now have information needed to remotely control the aid conditioner 700.

FIG. 15(b) illustrates transmission of a remote control signal from the remote controller 200 to the air conditioner 700 in a communication scheme other than NFC communication, for example, by IR communication.

The remote controller 200 may now be used for remote controlling the air conditioner 700 (not for remote controlling the image display apparatus) by NFC communication with the A/C remote controller 750. Therefore, + and − channel keys or volume keys on the remote controller 200 may be used to increase or decrease a target temperature in the air conditioner 700. In addition, the channel keys of the remote controller 200 may operate as a power key to power on or off the air conditioner 700.

Since the remote controller 200 functionally substitutes for the A/C remote controller 750 through NFC communication with the A/C remote controller 750 as described above, the user may use the remote controller 200 of the image display apparatus as the A/C remote controller 750. Accordingly, the user can easily remotely control another electronic device using the remote controller 200 designed for a specific electronic device.

Besides, if the remote controller 200 performs tagging to a home theater remote controller whereby the remote controller 200 obtains information needed to remotely control the home theater, the remote controller 200 of the image display apparatus 100 may function as the home theater remote controller.

FIG. 16 illustrates an exemplary external device capable of short-range communication with an electronic device according to an embodiment of the present invention.

Referring to FIG. 16, the electronic device according to this embodiment of the present invention may be the mobile terminal 300. The mobile terminal 300 may transmit data to or receive data from other electronic devices by short-range communication such as NFC.

To implement NFC, the mobile terminal 300 includes an NFC module according to the embodiment of the present invention. The NFC module will be described later with reference to FIG. 18.

In FIG. 16, the remote controller 200 and the image display apparatus 100 serve as first and second external devices, respectively, by way of example.

To enable NFC communication with the mobile terminal 300, the remote controller 200 includes an NFC tag or an NFC module. For example, if the mobile terminal 300 is brought within a predetermined distance of the remote controller 200 or vice versa, the mobile terminal 300 or the remote controller 200 may create a magnetic field towards the remote controller 200 or the mobile terminal 300 and thus the mobile terminal 300 may receive device information from the remote controller 200 according to a variation in the magnetic field.

Once the mobile terminal 300 receives the device information from the remote controller via the NFC, the mobile terminal 300 may transmit a remote control signal to the second external device, e.g., the image display apparatus 100 based on the received device information in a transmission scheme other than NFC, for example, IR communication, RF communication, etc.

The device information here is written in the NFC tag or the NFC module of the remote controller 200 and transmitted to the mobile terminal 300. Alternatively or additionally, information preserved in the remote controller 200 may be converted by the NFC module and then transmitted to the mobile terminal 300.

Figure 17:
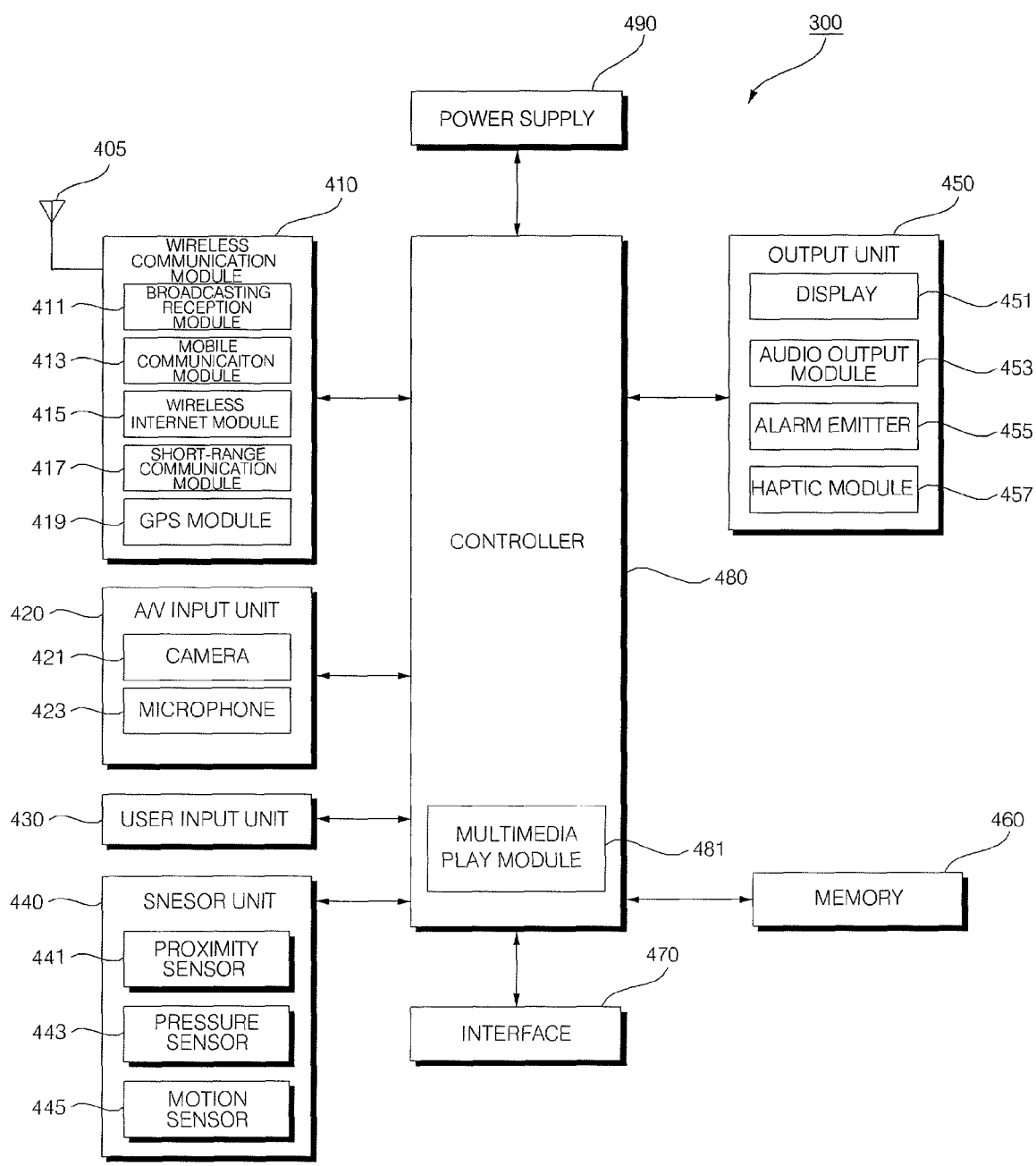
FIG. 17 is a block diagram of the mobile terminal illustrated in FIG. 16.

FIG. 17 is a block diagram of an example of the mobile terminal illustrated in FIG. 16.

Referring to FIG. 17, the mobile terminal 300 may include a wireless communication module 410, an A/V input unit 420, a user input unit 430, a sensor unit 440, an output unit 450, a memory 460, an interface 470, a controller 480, and a power supply 490. Two or more components of the mobile terminal 300 may be combined into a single component or a single component thereof may be separated into two or more components in alternative embodiments. All components of the mobile terminal 300 are operatively coupled and configured.

The wireless communication module 410 may include a broadcasting reception module 411, a mobile communication module 413, a wireless Internet module 415, a short-range communication module 417, and a Global Positioning System (GPS) module 419.

The broadcasting reception module 411 receives at least one of a broadcast signal or broadcasting-related information on a broadcast channel from an external broadcasting management server. The broadcast channel may be any of a satellite channel, a terrestrial channel, etc. The broadcasting management server may refer to a server for generating and transmitting at least one of a broadcast signal or broadcasting-related information or a server for receiving at least one of an already generated broadcast signal or already generated broadcasting-related information and providing the received at least one of the broadcast signal or the broadcasting-related information to terminals.

The broadcasting reception module 411 may receive a digital broadcast signal through a digital broadcasting system. The broadcasting reception module 411 may be adapted to all other broadcasting systems that provide broadcast signals as well as the digital broadcasting system. The broadcast signal and/or broadcasting-related information received at the broadcasting reception module 411 may be stored in the memory 460.

The mobile communication module 413 transmits and receives a radio signal to and from at least one of a Base Station (BS), an external terminal, or a server over a mobile communication network. The radio signal may include a voice call signal, a video call signal, or text/other various types of data involved in multimedia message transmission and reception.

The wireless Internet module 415 is a built-in or external module for providing wireless Internet connectivity to the mobile terminal 300.

The short-range communication module 417 is used for short-range communication. For short-range communication, the short-range communication module 417 may conform to Bluetooth, RFID, IrDA, UWB, ZigBee, NFC, etc.

In accordance with the embodiment of the present invention, the short-range communication module 417 includes the NFC module 327 to receive device information from other electronic devices. An operation of the NFC module will be described later in great detail with reference to FIG. 18.

The GPS module 419 receives location information from a plurality of GPS satellites.

The A/V input unit 420 is used to receive an audio signal and/or a video signal and may include a camera 421 and a microphone 423. The camera 421 processes video frames including a still image or a video acquired from an image sensor in video call mode or camera mode. The processed video frames may be displayed on a display 451.

The video frames processed by the camera 421 may be stored in the memory 460 or transmitted externally through the wireless communication module 410. Two or more cameras 421 may be provided to the mobile terminal 300 depending on the configuration specification of the mobile terminal 300.

The microphone 423 receives an external audio signal and processes the audio signal to electrical voice data in call mode, recording mode, or voice recognition mode. In the call mode, the processed voice data may be converted to a format transmittable to a BS and output through the mobile communication module 413.

The user input unit 430 generates key input data that the user inputs to control the operation of the mobile terminal 300. The user input unit 430 may include a keypad, a keyboard, a mouse, a stylus, a dome switch, a (resistive/capacitive) touch pad, etc. to receive a command or information through the user's push or touch manipulation. Especially when a touch pad is layered with the display 451, the resulting structure may be referred to as a touch screen.

The sensor unit 440 senses the current state of the mobile terminal 300, such as the open or closed state, position, or user touch of the mobile terminal 300 and generates a sensing signal to control the operation of the mobile terminal 300 according to the sensed state. For example, if the mobile terminal 300 is a sliding phone, the sensor unit 440 may sense whether the sliding phone is opened or closed. In addition, the sensor unit 440 may sense whether the power supply 490 is supplying power or whether the interface 470 is coupled with an external device.

The sensor unit 440 may include a proximity sensor 441, a pressure sensor 443, and a motion sensor 445. The proximity sensor 441 may detect an object approaching the mobile terminal 300 or the existence or absence of an object in the vicinity of the mobile terminal 300 without mechanical contact.

The pressure sensor 443 may determine whether pressure is applied to the mobile terminal 300 and how strong the pressure is. The pressure sensor 443 may be installed at a part of the mobile terminal 300 requiring pressure detection according to the environment in which the mobile terminal 300 is used. The motion sensor 445 senses the position or motion of the mobile terminal 300 using an acceleration sensor, a gyro sensor, etc. The gyro sensor measures an angular velocity and thus senses a rotated direction with respect to a reference direction.

The output unit 450 outputs an audio signal, a video signal, and/or an alarm signal. The output unit 450 may include the display 451, an audio output module 453, an alarm emitter 455, and a haptic module 457.

The display 451 displays information processed in the mobile terminal 300. For example, when the mobile terminal 300 is in the call mode, the display 451 displays a UI or Graphical User Interface (GUI) related to a call. In the video call mode or the camera mode, the display 451 may display captured or received images separately or simultaneously and may also display a UI or GUI.

As described before, if a touch screen is configured by layering the display 451 with a touch pad, the display 451 may be used not only as an output device but also as an input device capable of receiving information or input by a user's touch.

The audio output unit 453 outputs audio data received from the wireless communication module 410 or stored in the memory 460 in call termination mode, call mode, recording mode, voice recognition mode, or broadcasting reception mode. The audio output module 453 also outputs an audio signal involved in a function performed by the mobile terminal 300, for example, an audio signal related to a call incoming sound, a message reception sound, etc. The audio output module 453 may include a speaker, a buzzer, etc.

The alarm emitter 455 outputs a signal notifying occurrence of an event to the mobile terminal 300. Events of the mobile terminal 300 include call signal reception, message reception, key signal input, etc. The alarm emitter 455 may output an event notification signal in a form other than an audio signal or a video signal. For example, the event notification signal may be output in the form of vibrations.

The haptic module 457 generates various tactile effects that a user can feel. A major example of the tactile effects is vibrations.

The memory 460 may store programs required for processing and controlling in the controller 480 or temporarily store input or output data (e.g. a phone book, still images, videos, etc.).

The interface 470 interfaces between the mobile terminal 300 and all external devices connected to or communicating with the mobile terminal 300. The external devices may include a wired/wireless headset, an external charger, a wired/wireless data port, a memory card, a card socket such as a Subscriber Identification Module (SIM) card or a User Identity Module (UIM) card, an audio Input/Output (I/O) port, a video I/O port, an earphone, etc. The interface 470 may receive data or power from such an external device and transfer the data or power to each component of the mobile terminal 300. In addition, the interface 470 may transmit data from the mobile terminal 300 to the external device.

When the mobile terminal 300 is connected to an external cradle, the interface 470 may serve as a path in which power from the cradle is supplied to the mobile terminal 300 or a command signal from the cradle is transferred to the mobile terminal 300.

The controller 480 typically provides overall control of the mobile terminal 300 by controlling the operation of each component. For example, the controller 480 controls and processes voice call, data communication, video call, etc. The controller 480 may include a multimedia play module 481 for playing multimedia. The multimedia play module 481 may be configured in hardware inside the controller 480 or in software separately from the controller 480.

In accordance with the embodiment of the present invention, the controller 480 controls display of a remote control screen that enables remote control of a second external device on the display 451 based on device information about the first external device received through the wireless communication module 410, particularly the NFC module.

The remote control screen displayed on the display 451 may be an application execution screen for the second external device(s). If a remote control application is not installed in the mobile terminal 400, the controller 480 may control access to a predetermined server and control download and installation of the remote control application from the server.

Meanwhile, upon receipt of a manipulation input from a user with the remote control screen displayed, the controller 480 may control transmission of a control signal corresponding to the received manipulation input to another electronic device.

The controller 480 may control display of an electronic device list that lists second external devices and other external devices on the display 451. In the displayed electronic device list, an item corresponding to a specific second external device may be displayed distinguishably from the other second external devices.

The controller 480 may control a login to a specific server using account information included in the device information which is stored in the mobile terminal 300 or received by the mobile terminal 300 through another device such as a server or the remote controller 200.

During the playing of a specific content, the controller 480 may control display of content images or content-related information on the display 451. The controller 480 may control display of an object indicating that the mobile terminal 300 is connected to an external device.

The power supply 490 receives external or internal power and supplies the power for operating each component under the control of the controller 480.

The mobile terminal 300 having the above-described structure may be configured so as to operate in a communication system in which data can be transmitted in frames or packets, such as a wired/wireless communication system or a satellite communication system.

Figure 18:
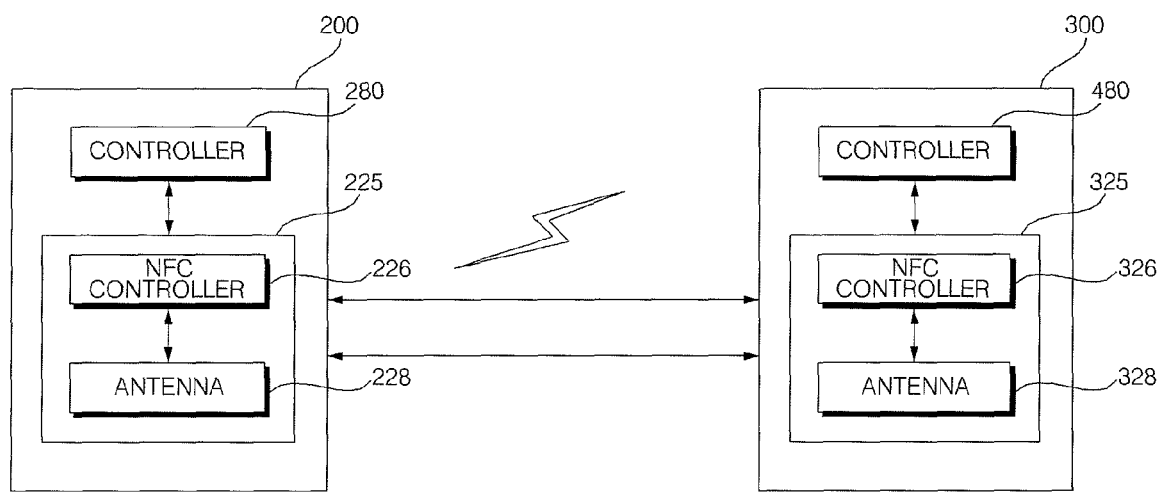
FIG. 18 is a block diagram of the mobile terminal and the remote controller, referred to for describing NFC communication between the mobile terminal and the remote controller according to another embodiment of the present invention.

FIG. 18 is a block diagram of the mobile terminal and the remote controller, referred to for describing an example of NFC communication between them according to another embodiment of the present invention.

Referring to FIG. 18, the mobile terminal 300 and the remote controller 200 may exchange data by NFC. The mobile terminal 300 may be equipped with the NFC module 327 including the NFC controller 326 and the antenna 328 and the remote controller 200 may also be equipped with the NFC module 225 including the NFC controller 226 and the antenna 228.

For example, when the user brings the mobile terminal 300 or the remote controller 200 within a predetermined distance of the remote controller 200 or the mobile terminal 300 (i.e., tagging has occurred), a magnetic field is created and the mobile terminal 300 may receive device information from the remote controller 200 according to a variation in the magnetic field.

The device information here may include information about a product type, product name, manufacturer, or firmware version of the remote controller 200 and/or the image display apparatus 100 that can be controlled remotely with the remote controller 200. The device information may further include account information about a user of the image display apparatus 100. The account information may specify a user ID and a password with which to use the image display apparatus 100 or with which to access a Web server such as an SNS server.

Herein, the device information may be transmitted between the mobile terminal 300 and the remote controller 200 in Reader/Writer mode or peer to peer mode.

To transmit the device information, the controller 280 of the remote controller 200 transmits the device information to the NFC module 225. In the NFC module 225, the NFC controller 226 converts the device information and controls transmission of the converted device information through the antenna 228. The antenna 328 of the mobile terminal 300 receives the device information from the remote controller 200 and provides the device information to the controller 480 through the NFC controller 326. The controller 480 controls display of a remote control screen that enables remote control of the image display apparatus 100 based on the received device information. That is, the mobile terminal 300 may enter a remote control mode for remotely controlling the image display apparatus 100 using the received device information. For the purpose, the mobile terminal 300 may execute a remote control application to remotely control the image display apparatus 100. As a result, the user can now use the mobile terminal 300, functioning as a remote controller of the image display apparatus 100, to remotely control the image display apparatus 100.

Figure 19:
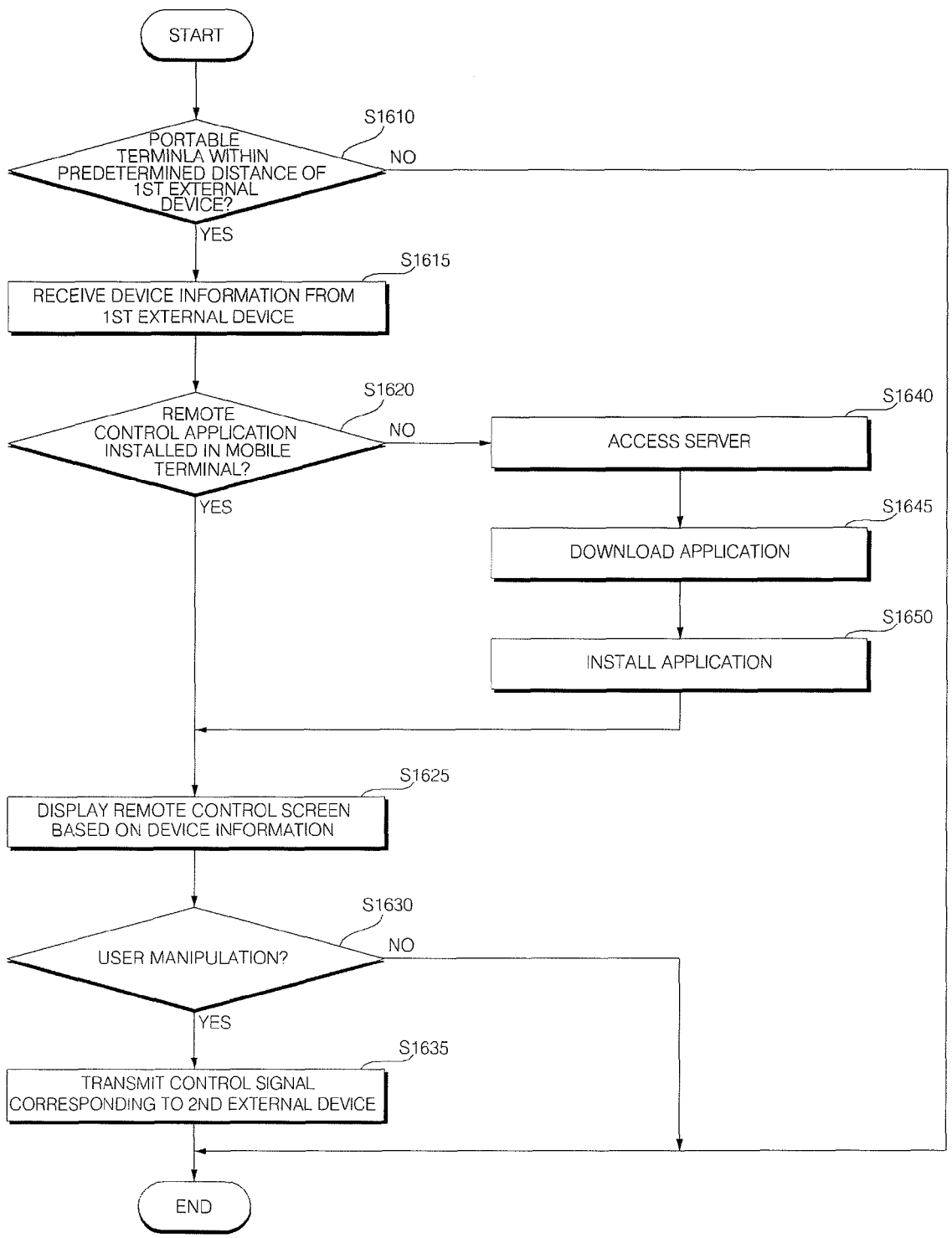
FIG. 19 is a flowchart illustrating a method for operating the mobile terminal according to an embodiment of the present invention.

FIG. 19 is a flowchart illustrating a method for operating the mobile terminal according to an embodiment of the present invention, and FIGS. 20A to 31B are views referred to for describing examples of the method for operating the mobile terminal illustrated in FIG. 19 according to an embodiment of the present invention.

Referring to FIG. 19, when the mobile terminal 300 (portable terminal) being an electronic device is brought within a predetermined distance of a first external device (i.e., tagging has occurred) (S1610), these devices conduct NFC communication with each other. Especially, the mobile terminal 300 receives device information from the first external device (S1615).

In an example of FIG. 20A, when the remote controller 200 serving as the first external device capable of remotely controlling the image display apparatus 100 and the mobile terminal 300 being the electronic device get close to each other within a predetermined distance or contact each other, the remote controller 200 transmits device information to the mobile terminal 300 by NFC, by way of example. Herein, a broadcast image 1710 may be displayed on the display 180 of the image display apparatus 100 being a second external device, while these steps are being performed.

As described before with reference to FIG. 18, the NFC module 327 of the mobile terminal 300 receives the device information and transmits the received device information to the controller 480. The device information may include information about a product type, product name, manufacturer, or firmware version of the image display apparatus 100. The device information may further include account information about the user of the image display apparatus 100. The account information may specify a user ID and a password with which to use the image display apparatus 100 or with which to access a Web server such as an SNS server.

Subsequently, it is determined whether a remote control application that enables remote control of the second external device is installed in the mobile terminal 300 (S1620). If the remote control application has been installed, a remote control screen is displayed on the display 451 of the mobile terminal 300 based on the device information (S1625).

The controller 480 may determine the product type of the second external device based on the received device information. In the illustrated case of FIG. 20A, the controller 480 of the mobile terminal 300 identifies the product type of the second external device as the image display apparatus 100 according to the received device information.

In Step S1625, in the presence of the remote control application, the controller 480 executes the remote control application and controls display of an application execution screen on the display 451. The application execution screen may be a remote control screen that enables remote control of the image display apparatus 100.

Figure 20B:
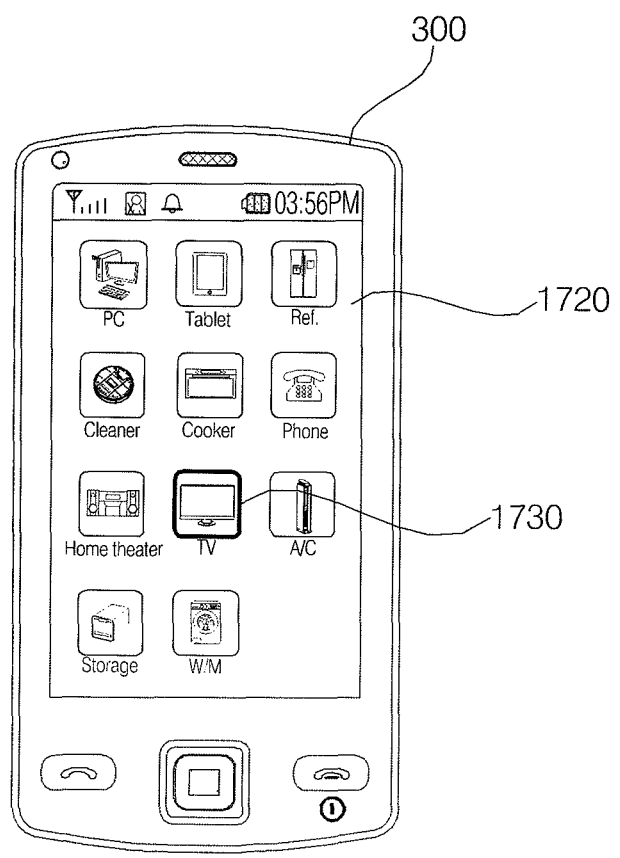

FIG. 20B illustrates exemplary remote control applications installed in the mobile terminal.

Referring to FIG. 20B, remote control applications for remotely controlling a device such as a PC, a tablet PC, a refrigerator, a cleaner, a cooker, a phone, a home theater, a TV, an air conditioner, a NAS, and a washing machine may be installed in the mobile terminal 300. An electronic device application list screen 1720 may be displayed immediately when NFC communication starts between the mobile terminal 300 and the remote controller 200. Especially, an external device item with which the mobile terminal 300 is communicating by NFC may be indicated distinguishably from the other external device items. In this regard, in the example of FIG. 20B, an item representing the image display apparatus 100, that is, a TV item 1730 is highlighted to distinguishably indicate to the user that the TV is the targeted device for remote controlling.

Figure 20C:
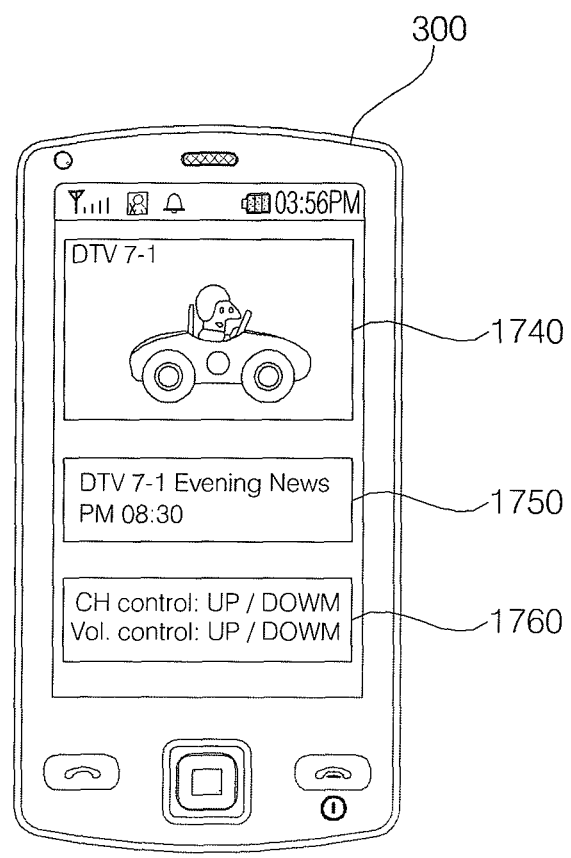

Upon a user selection of the TV item 1730 in FIG. 20B, a remote control screen may be displayed to enable remote control of the image display apparatus 100 by the mobile terminal 300, as illustrated in FIG. 20C.

Meanwhile, it is also possible that when the mobile terminal 300 communicates with the remote controller 200 by NFC in FIG. 20A, the remote control screen illustrated in FIG. 20C may be displayed immediately without displaying the screen of FIG. 20B.

FIG. 20C illustrates an exemplary remote control screen displayed on the mobile terminal 300, for remotely controlling the image display apparatus 100. Referring to FIG. 20C, a channel or volume control object 1760 is displayed, for remote control.

The user may easily select an intended channel or adjust sound volume by selecting a channel up/down item or a volume up/down item. For the channel or volume control, the mobile terminal 300 may transmit a remote control signal corresponding to the user's selection to the image display apparatus 100.

The mobile terminal 300 may display an image currently being displayed on the image display apparatus 100, specifically a broadcast image in synchronization with the image display apparatus 100. In the illustrated case of FIG. 20C, a scaled-down broadcast image 1740 is displayed on the mobile terminal 300. For this purpose, the mobile terminal 300 and the image display apparatus 100 may adopt a communication scheme capable of large-amount data transmission other than NFC, for example, Wireless Fidelity (WiFi), WiFi direct, or Wireless High Definition Digital Interface (WHDI).

That is, a simple data communication such as device information transmission, pairing, etc. may be conducted by NFC between the mobile terminal 300 and the image display apparatus 100, whereas a large-amount data communication such as broadcast image transmission may be conducted between them in a communication scheme other than NFC communication.

The image display apparatus 100 may scale down the broadcast image 1710 and transmit the scaled-down broadcast image 1740 to the mobile terminal 300 in WiFi or WHDI for displaying on the display 451. Broadcasting Information 1750 related to the broadcast image 1740 may be transmitted together with the broadcast image 1740 from the image display apparatus 100 to the mobile terminal 300.

The mobile terminal 300 may display the scaled-down broadcast image 1740 and the broadcasting information 1750 that specifies, for example, the channel, program title, time of the broadcast image 1740. Therefore, the user can readily acquire the information about the currently being broadcast displayed image from the mobile terminal 300, not from the image display apparatus 100.

Figure 20D:
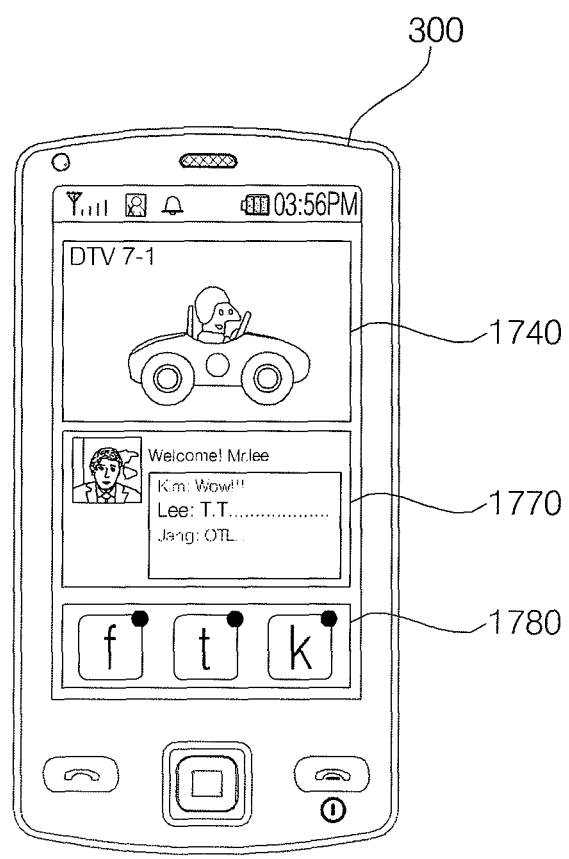

FIG. 20D illustrates another exemplary remote control screen displayed on the mobile terminal 300, for remotely controlling the image display apparatus 100. In FIG. 20D, a Web server list 1780 listing Web servers that the image display apparatus 100 are logged into is displayed on the mobile terminal 300.

In one example, account information about the image display apparatus 100 or information about Web servers logged in based on the account information for the Web servers may be transmitted by NFC communication from the remote controller 200 to the mobile terminal 300, in addition to the device information. Such information may also be subsequently provided from the image display apparatus 100 to the mobile terminal 300. Upon receipt of the logged-in Web server information, the mobile terminal 300 may log in to the Web servers and display the logged-in Web server list 1780. Therefore, the user can easily receive a Web service such as SNS.

In FIG. 20D, the broadcast image 1740 being played on the image display apparatus 100 and a chatting window 1770 related to the broadcast image 1740 are displayed on the mobile terminal 300. User information about the user of the mobile terminal 300 may be displayed in the chatting window 1770. Thus, the user may talk with another user using the broadcast image 1740 as a topic.

Then, referring to FIG. 19, it is determined whether there is any user manipulation (S1630). Upon receipt of a user manipulation input, a control signal corresponding to the user manipulation input is transmitted to the second external device (S1635).

As the user makes a manipulation or user input on the remote control screen displayed on the mobile terminal 300, the controller 480 transmits a control signal corresponding to the user manipulation/input to the second external device, e.g., the image display apparatus 100. The control signal may be transmitted by IR or RF communication that enables remote control of the second external device, instead of NFC communication. And the second external device carries out any needed operation based on the received control signal. As a result, the user can use the mobile terminal 300 to remotely control the operations of the image display apparatus 100 or other external devices.

FIG. 21 illustrates an example of a channel control for the image display apparatus through the mobile terminal according to an embodiment of the present invention.

Referring to FIG. 21(a), a broadcast image of a channel, DTV 7-1 is being displayed on the display 180 of the image display apparatus 100.

The mobile terminal 300 has already received the device information from the remote controller 200 by NFC communication as illustrated in FIG. 20A. Thus, the mobile terminal 300 can display a remote control screen on the display 451. More specifically, the mobile terminal 300 may display the scaled-down broadcast image 1740, the broadcasting information 1750, and the channel or volume control object 1760 as illustrated in FIG. 20C.

When the user selects a channel-up object using the remote control screen, the mobile terminal 300 transmits a corresponding channel-up control signal to the image display apparatus 100 by IR or RF communication.

Thus, the image display apparatus 100 increases the current channel number and displays a broadcast image 1810 of the higher-numbered channel DTV 8-1 on the display 180.

And the same image 1810 may then be displayed on the mobile terminal 300 along with other related information.

On the other hand, if the remote control application is not installed in the mobile terminal in step S1620, steps S1640, S1645 and S1650 may be performed additionally.

To be more specific, in the absence of the remote control application in the mobile terminal, the mobile terminal 300 accesses a specific server (S1640), downloads the application from the accessed server (S1645), and installs the downloaded application (S1650). As a result, the mobile terminal 300 then can carry out step S1625.

FIG. 22A illustrates an example of a NFC communication between the mobile terminal 300 and the remote controller 200. AS shown, when the mobile terminal 300 and the remote controller 200 are positioned within a certain distance of each other, an NFC communication is established and data can be exchanged between these devices.

Figure 22B:
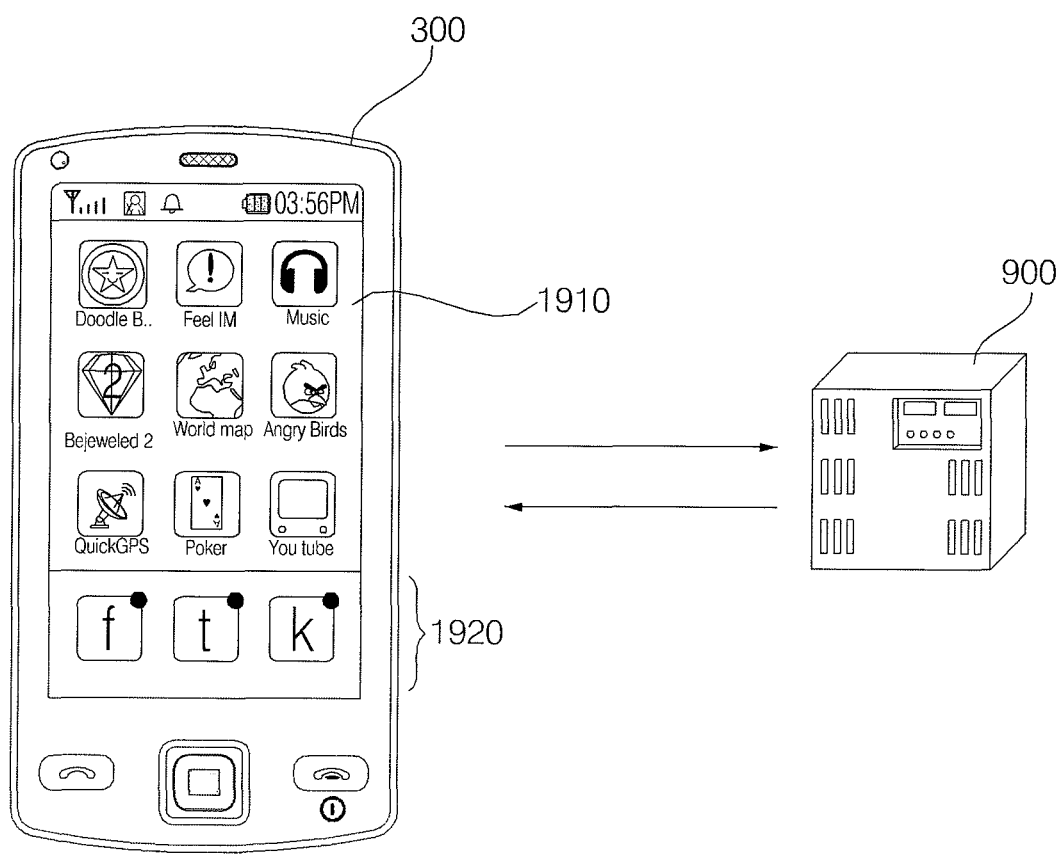

FIG. 22B illustrates an example of an application screen displayed on the mobile terminal 300. Especially, a first application list 1910 may list installed but non-logged-in applications in the mobile terminal 300 and a second application list 1920 may list installed and logged-in applications in the mobile terminal 300. Since a remote control application for remotely controlling the image display apparatus 100 has not been installed in the mobile terminal 300, the mobile terminal 300 may access a specific server 900 based on the device information acquired by the NFC communication from the remote controller 200, download the remote control application from the server 900, and install the downloaded remote control application therein. A communication with the server by the mobile terminal 300 can be done using a known technique such as via a wireless network.

The series of operations, e.g., access to a server, download, and installation may be automatically performed after the NFC communication. Therefore, the remote control application can be easily installed in the mobile terminal 300.

Figure 22C:
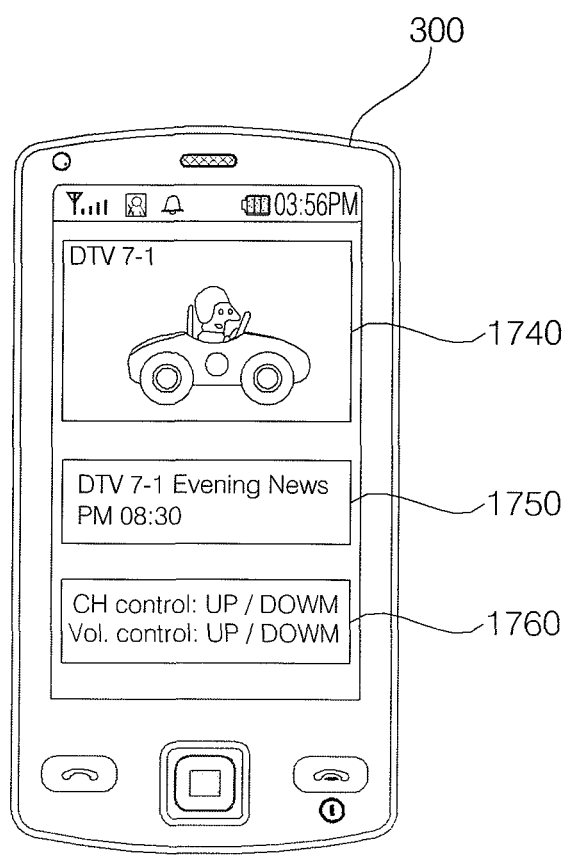

Like FIG. 20C, FIG. 22C illustrates an exemplary remote control screen for remotely controlling the image display apparatus 100 using the mobile terminal 300. The remote control screen may include the scaled-down broadcast image 1740, the broadcasting information 1750, and the channel or volume control object 1760. Especially, the user may switch a channel or adjust sound volume using the object 1760. Meanwhile, the chatting window 1770 may further be displayed as illustrated in FIG. 20C.

Figure 23:
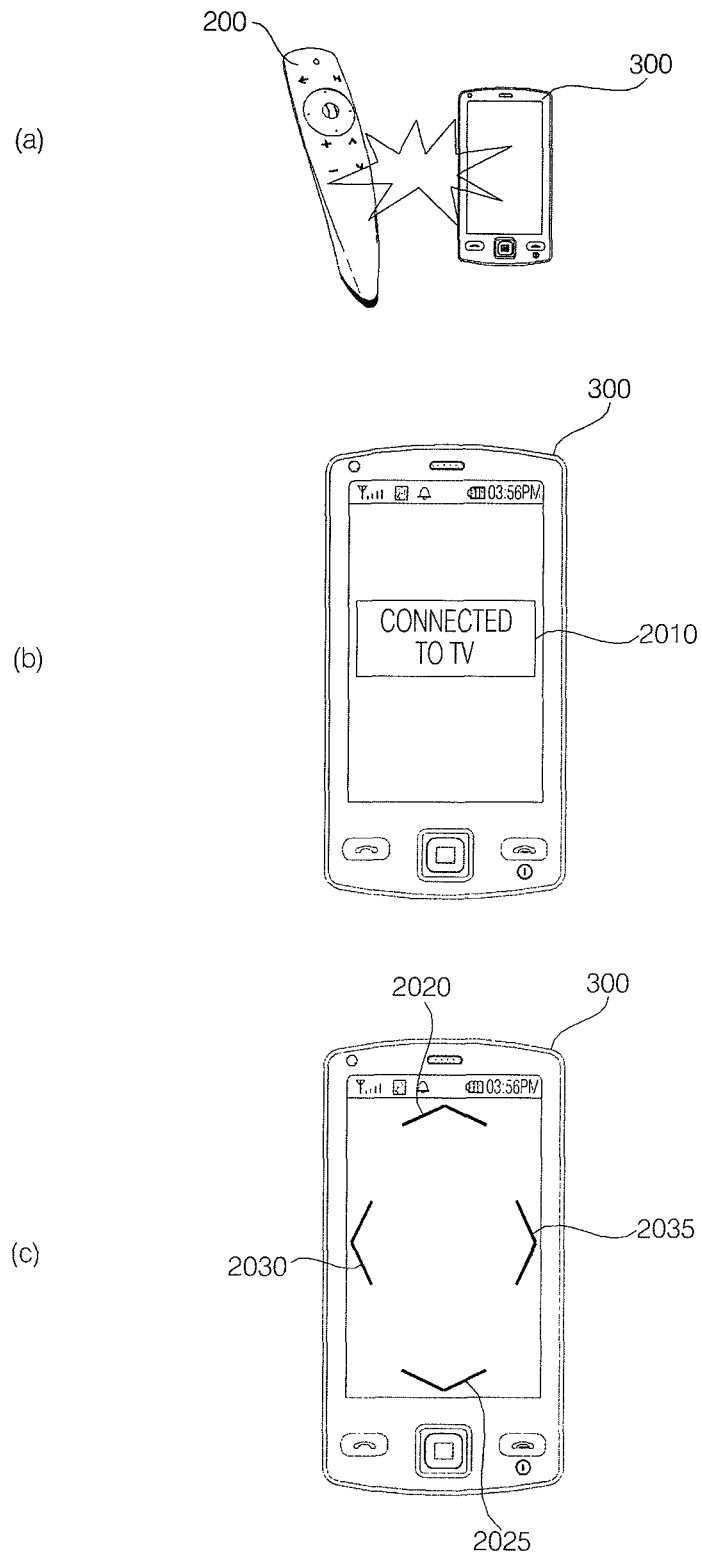

FIG. 23(*a*) illustrates an NFC communication between the mobile terminal 300 and the remote controller 200 according to an embodiment of the present invention. As shown, the mobile terminal 300 and the remote controller 200 exchanges data via the NFC communication as discussed above.

FIG. 23(*b*) illustrates an exemplary object 2010 displayed on the display 451 of the mobile terminal 300 through NFC communication, indicating that the mobile terminal 300 is connected to the image display apparatus 100. This can be accomplished as follows. After receiving device information about the image display apparatus 100 from the remote controller 200 via the NFC, the controller 480 of the mobile terminal 300 may control setup of IR or RF connection to the image display apparatus 100. In addition, the controller 480 controls display of the connection-indicating object 2010 after the connection is completely established.

FIG. 23(*c*) illustrates an exemplary remote control screen displayed on the mobile terminal 300, for remotely controlling the image display apparatus 100. The remote control screen includes volume control objects 2020 and 2025 and channel switching objects 2030 and 2035. For example, upon a selection of the channel-up object 2035, a current channel DTV 7-1 may be switched to a higher-numbered channel DTV 8-1 at the image display apparatus 100 as illustrated in FIG. 21(*b*).

FIGS. 24A to 24D illustrate another example of a remote control screen displayed on the mobile terminal by NFC communication, for remotely controlling the image display apparatus. The remote control screen includes an application list.

Referring to FIG. 24A, the mobile terminal 300 receives device information from the remote controller 200 by NFC communication as discussed above. The device information may include user account information.

Figure 24B:
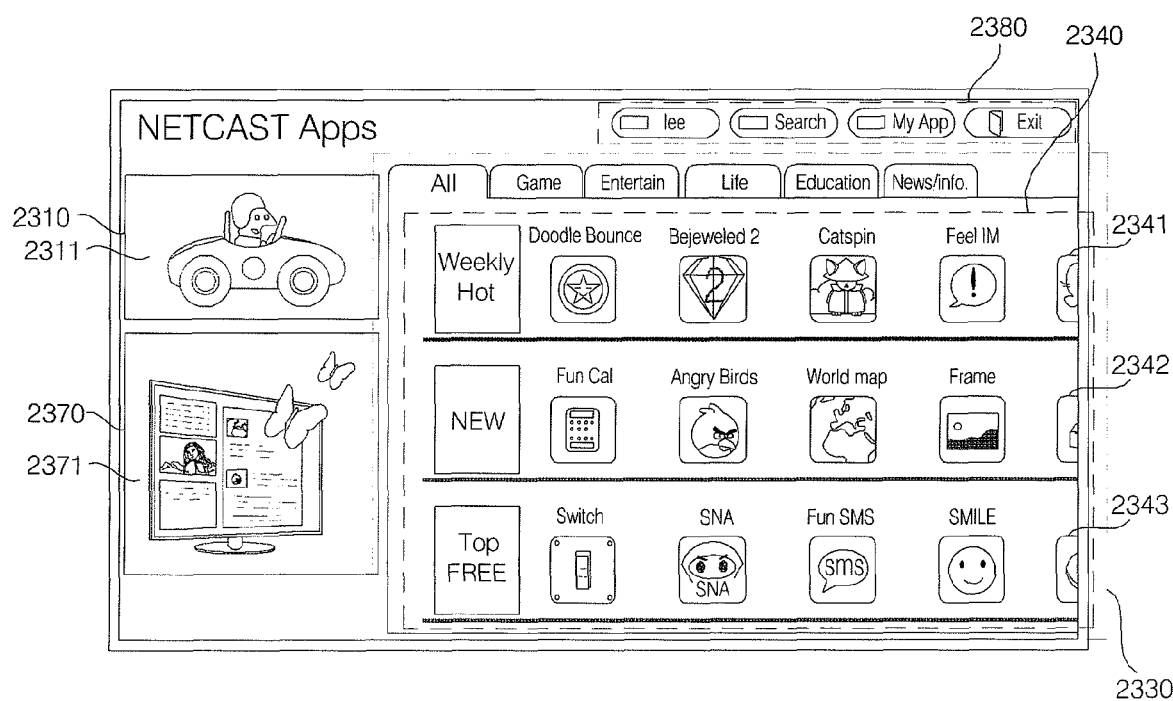

If the image display apparatus 100 is connected to a specific server, a login screen as illustrated in FIG. 24B may be displayed on the image display apparatus 100. FIG. 24B illustrates an exemplary login screen received from a connected server. A scaled-down broadcast image 2311 and an image 2340 received from the server may be displayed respectively in first and second areas 2310 and 2330 of the image display apparatus 100.

The image received from the server is an application store image, by way of example. The application store image may include a plurality of applications. Some 2341, 2342 and 2343 of the applications are shown partially to thereby indicate the existence of other more applications. An advertisement 2371 received from a network or a connected external device may be displayed in a third area 2370 and user information may be displayed in a fourth area 2380.

Figure 24C:
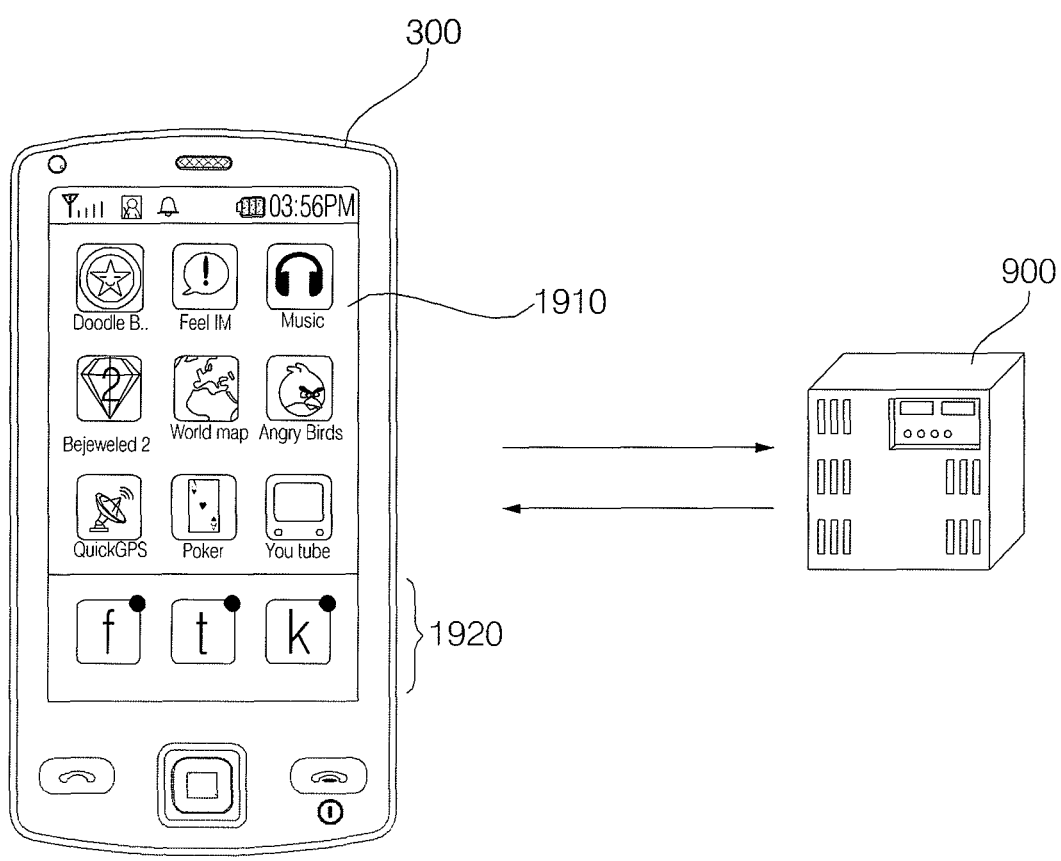

In accordance with an embodiment of the present invention, the mobile terminal 300 may access the server 900 connected to or communicating with the image display apparatus 100 as illustrated in FIG. 24C, for example, an application store server and may transmit or receive data to or from the same server.

Figure 24D:
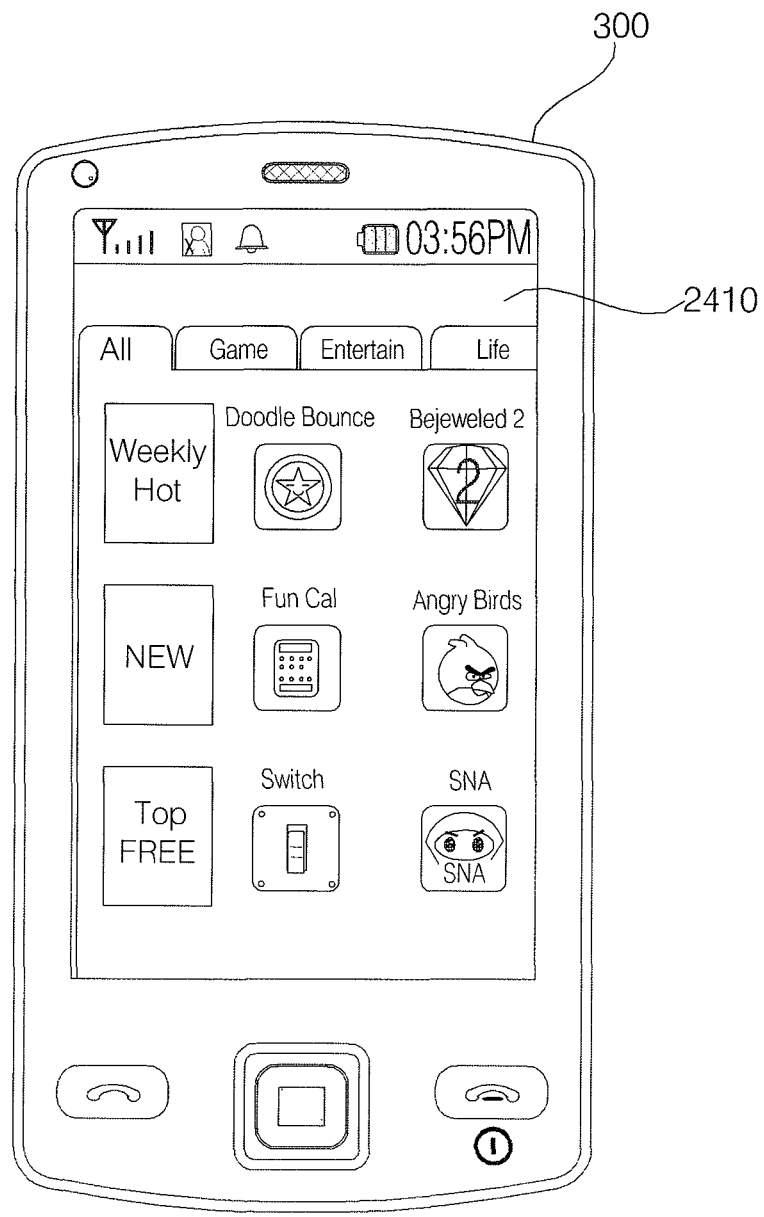

Accordingly, an application store image 2410 received from the server may be displayed on the mobile terminal 300 in FIG. 24D.

Compared to the application store image 2340 displayed on the image display apparatus as illustrated in FIG. 24B, the application store image 2410 illustrated in FIG. 24D may include a smaller number of applications due to a smaller display screen of the mobile terminal 300.

In this manner, the user can easily access an app (application) store of the image display apparatus 100 through the mobile terminal 300 and then can purchase an application from the app store. The purchased application may be downloaded to and installed in the image display apparatus 100 and/or the mobile terminal 300.

It is also possible for the mobile terminal 300 to transmit its device information and/or user information to the image display apparatus 100 by communicating with the remote controller 200 by NFC.

Figure 25B:
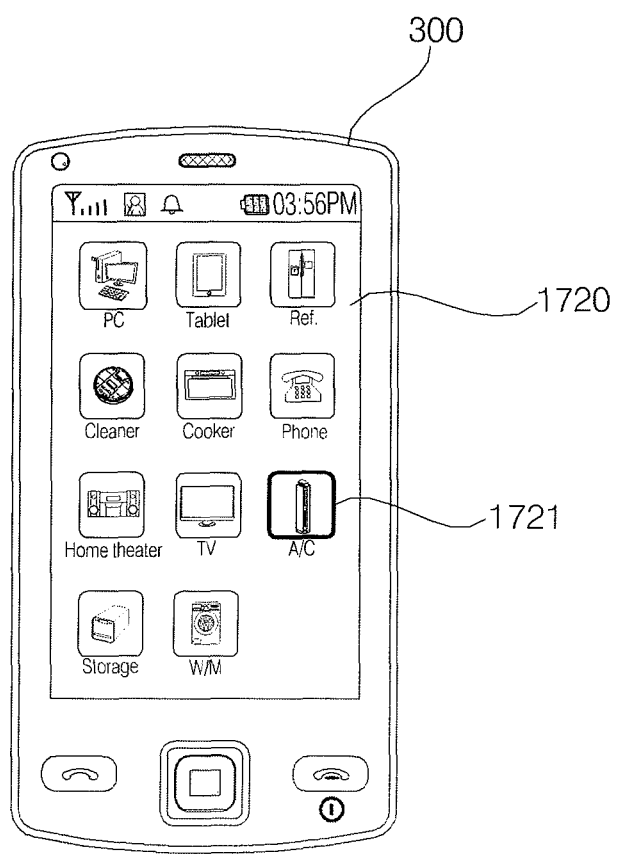

FIGS. 25A and 25B illustrate an exemplary case where the mobile terminal enters a remote control mode for remotely controlling an air conditioner by communicating with an A/C remote controller by NFC according to an embodiment of the present invention.

Referring to FIG. 25A, when the mobile terminal 300 is brought within a predetermined distance of the A/C remote controller 750 (i.e., tagging has occurred), the A/C remote controller 750 transmits device information to the mobile terminal 300 by NFC communication.

The device information here may include device information about the air conditioner 700 and/or device information about the A/C remote controller 750. Specifically, the device information may include information about at least one of the product type, product name, manufacturer, or remote controllable channel, frequency or code of the air conditioner 700, or any information related to the air conditioner 700 for remotely control the air conditioner 700.

FIG. 25B illustrates the electronic device application list screen 1720 in which an air conditioner item 1721 related to the A/C remote controller 750 with which the mobile terminal 300 has communicated by NFC, is displayed distinguishably from other electronic device items on the mobile terminal 300.

Figure 25C:
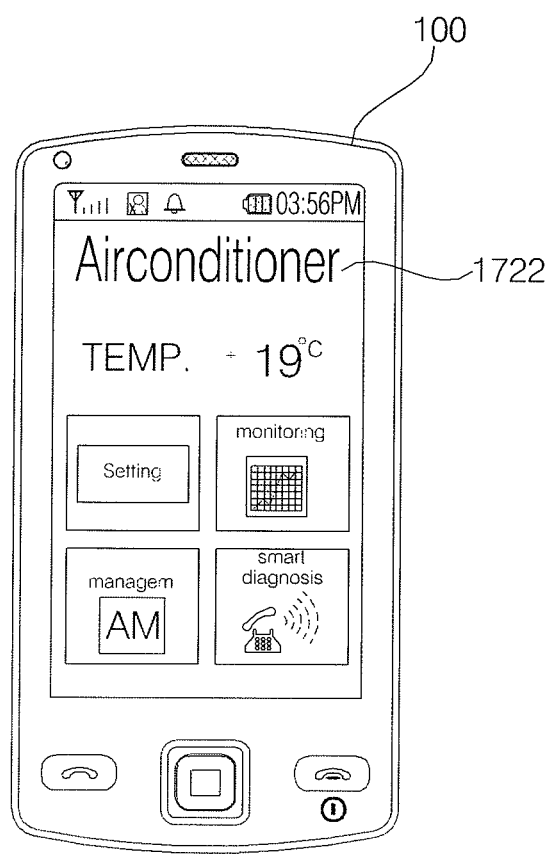

Meanwhile, a remote control screen for the air conditioner as shown in FIG. 25C may be displayed immediately without displaying the electronic application list screen 1720 of FIG. 25B.

FIG. 25C illustrates an exemplary remote control screen displayed on the mobile terminal 300, for remotely controlling the air conditioner.

Referring to FIG. 25C, a remote control screen 1722 includes air conditioner state information (a current temperature, a target temperature, etc.) and air conditioner remote control items such as a monitoring item, a setting item, and a smart diagnosis item.

The monitoring item is used to monitor the temperature, etc. of the air conditioner. The user may set a target temperature, etc. with the setting item. The smart diagnosis item may be used to diagnose or analyze an abnormal state of the air conditioner.

Since the mobile terminal 300 can function as the A/C remote controller 750, the user may use the mobile terminal 300 instead of the A/C remote controller 750 to remotely control the air conditioner 300. Accordingly, the user can easily remotely control other electronic devices using the mobile terminal 300. For instance, if the mobile terminal 300 performs tagging to a home theater remote controller, the mobile terminal 300 may function as the home theater remote controller.

Figure 26A:
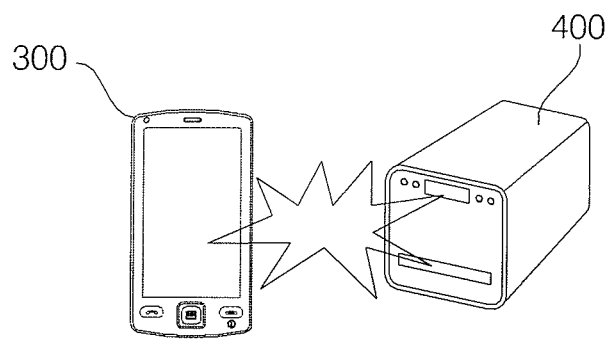
Figure 26B:
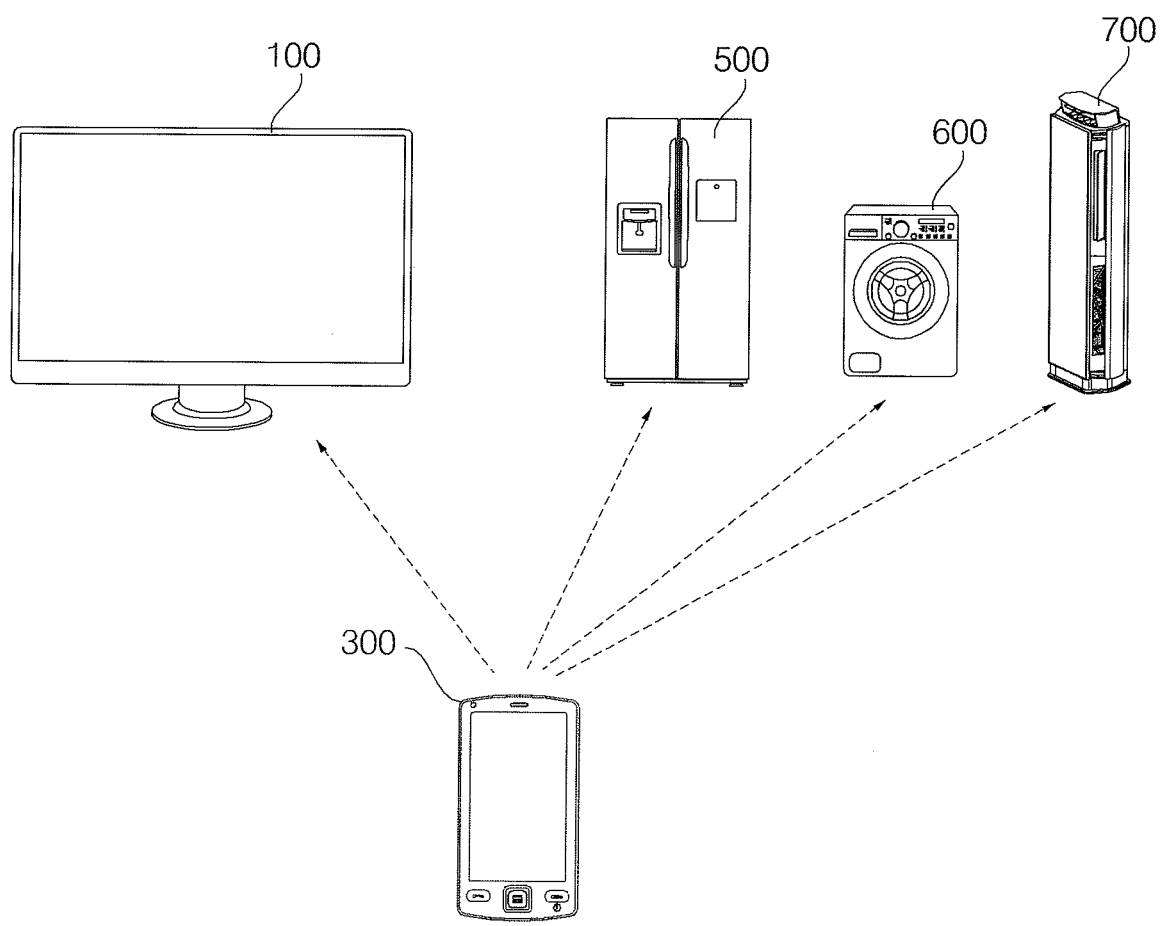

FIGS. 26A and 26B illustrate an exemplary electronic device capable of short-range communication with the electronic device(s) according to an embodiment of the present invention.

Referring to FIG. 26A, when the mobile terminal 300 being the electronic device is brought within a predetermined distance of the NAS 400 (i.e., tagging has occurred), the mobile terminal 300 receives device information from the NAS 400. The device information may include network information. The network information is Access Point (AP) information that may specify a network address, a network ID (e.g. a Service Set Identifier (SSID)), network encryption information (e.g. Wireless Encryption (WEP)-KEY), etc.

In accordance with the embodiment of the present invention, the mobile terminal 300 may receive the device information from the NAS 400 by NFC communication. For this purpose, the mobile terminal 300 and the NAS 400 each are equipped with an NFC module.

Then, referring to FIG. 26B, the mobile terminal 300 transmits a remote control signal including the received network information to one or more second external devices such as the image display apparatus 100, the refrigerator 500, the washing machine 600, and the air conditioner 700. Additionally, the remote control signal including the network information may be transmitted to other devices such as a cooker, a home theater, a camera, a game console, etc.

Herein, the mobile terminal 300 may transmit the remote control signal to the second external devices by a communication scheme other than NFC, for example, RF communication.

Upon receipt of the network information, the second external devices, for example, the image display apparatus 200, the refrigerator 500, the washing machine 600, and the air conditioner 700 may access a network provided by the NAS 400 using the received network information, thereby increasing user convenience.

Unlike the illustrated case of FIG. 26A, when the remote controller 200 serving as the electronic device is brought within a predetermined distance of the NAS 400 serving as the first external device (i.e., tagging has occurred), the remote controller 200 may receive the device information from the NAS 400. Then the remote controller 200 may transmit a remote control signal including the network information to the second external devices, for example, the image display apparatus 200, the refrigerator 500, the washing machine 600, and the air conditioner 700, unlike the illustrated case of FIG. 26B.

Figure 27:
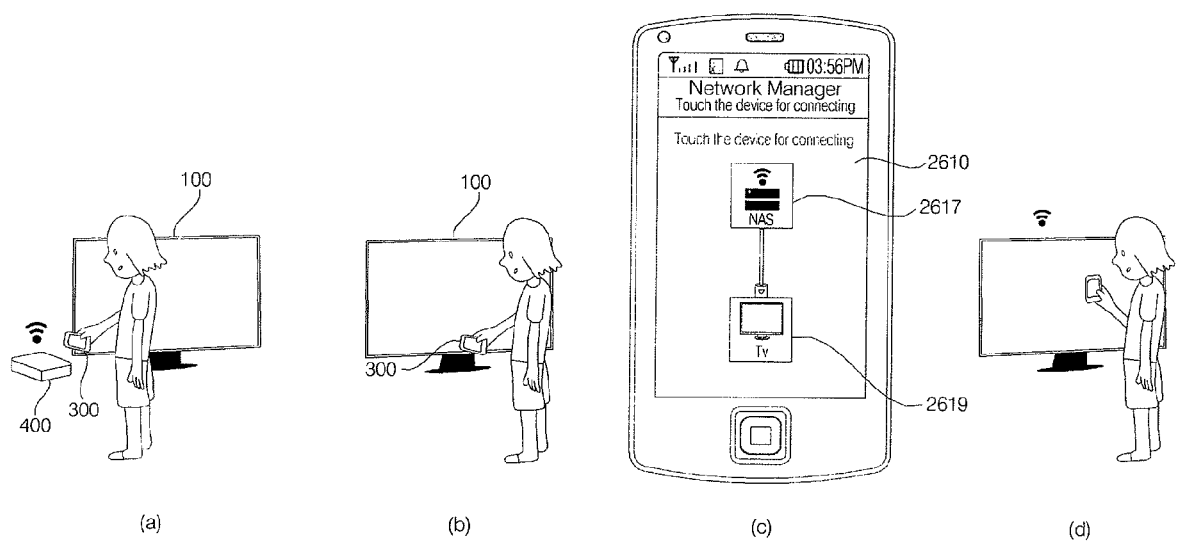

FIG. 27 illustrates an exemplary case in which the mobile terminal receives network information from the NAS and the image display apparatus accesses the network using the network information received from the mobile terminal.

Referring to FIG. 27(*a*), the mobile terminal 300 performs tagging to an external device connected to the Internet, such as the NAS 400. Thus, the mobile terminal 300 receives network information, for example, AP information from the NAS 400. The NAS 400 may be connected to the network and include one or more storage media.

Referring to FIG. 27(*b*), then the mobile terminal 300 performs tagging to a second external device not connected to the network. The image display apparatus 100 is an example of the second external device. Thus, the image display apparatus 100 receives the network information from the mobile terminal 300.

Referring to FIG. 27(*c*), an object 2619 representing the image display apparatus and an object 2617 representing the NAS are shown as connected to each other on a screen 2610 of the mobile terminal 300. That is, the image display apparatus 100 may automatically connect to the NAS 400 using the received network information. As described before, the image display apparatus 100 may access the NAS 400, particularly the network provided by the NAS 400, using the network address, network ID, network encryption information, etc.

Then referring to FIG. 27(*d*), the image display apparatus 100 may access the network provided by the NAS 400 and conduct data communication over the network. As a result, using the mobile terminal and tagging operations, the user can now easily configure the image display apparatus 100 (previously not connected to a network of the NAS 400) to be connected to the network of the NAS 400 using the present invention.

On the other hand, the image display apparatus 100 may receive the network information from the mobile terminal 300 by RF communication, unlike FIG. 27(*b*).

Figure 28:
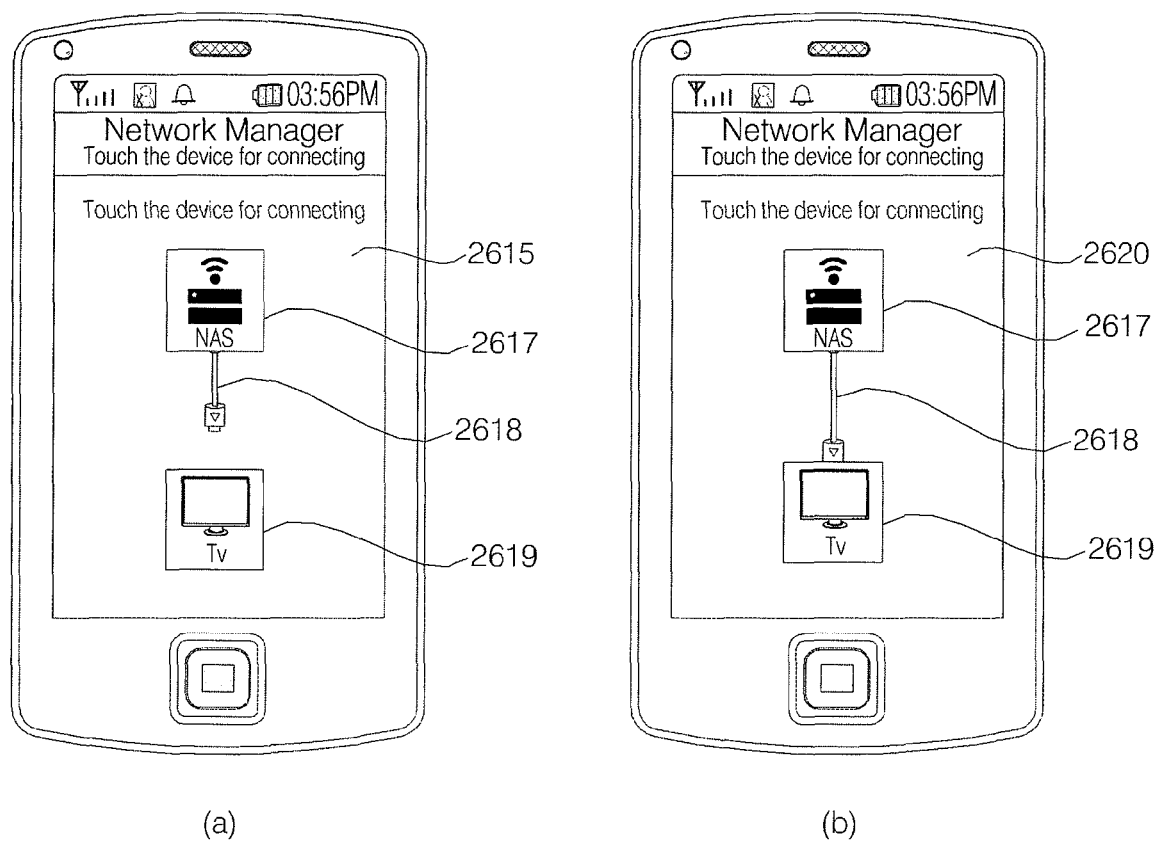

FIG. 28 illustrates another exemplary method for connecting the image display apparatus to the NAS according to an embodiment of the present invention.

Upon receipt of the network information of the NAS 400 from the mobile terminal 300 as illustrated in FIGS. 27(*a*) and 27(*b*), the image display apparatus 100 may be connected manually to the network provided by the NAS 400, compared to the case illustrated in FIG. 27. For instance, FIG. 28(*a*) illustrates a screen 2615 on which an object 2619 representing the image display apparatus and an object 2617 representing the NAS are displayed on the mobile terminal 300. Then if desired, the user can touch the object 2619 to initiate connecting the image display apparatus 300 to the NAS 400.

Then upon receipt of the user's input requesting a connection between the two objects 2619 and 2617, then a corresponding signal may be sent from the mobile terminal to the NAS 400 and/or the image display apparatus 100 so that the devices 400 and 100 can be connected to each other.

Then the mobile terminal 300 may display a screen 2620 on which the two objects 2617, 2619 are shown as connected as illustrated in FIG. 28(*b*). Thus, the image display apparatus 100 may access the network provided by the NAS 400 and thus can access the Internet or other websites. For example, when the user connects the two objects 2617, 2619 by touching and dragging a line 2618 given as a UI, the image display apparatus 100 may be connected to the network of the NAS 400.

Figure 29A:
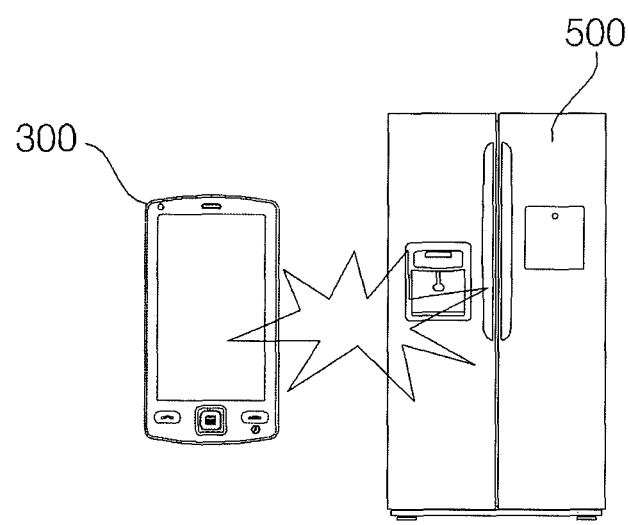
Figure 29B:
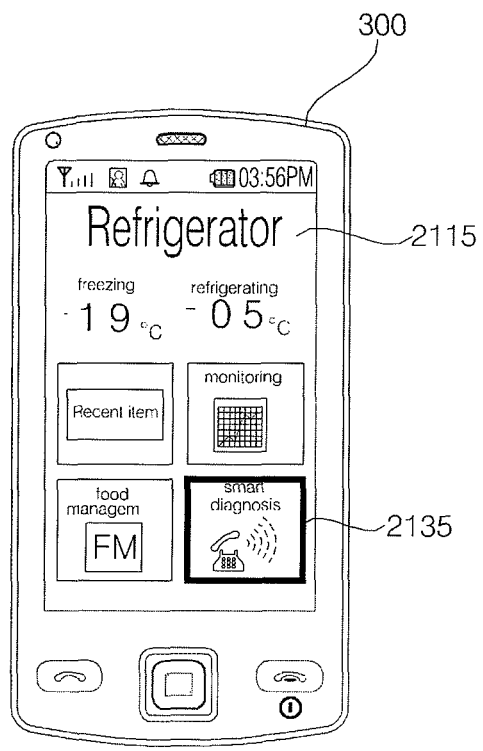
Figure 29C:
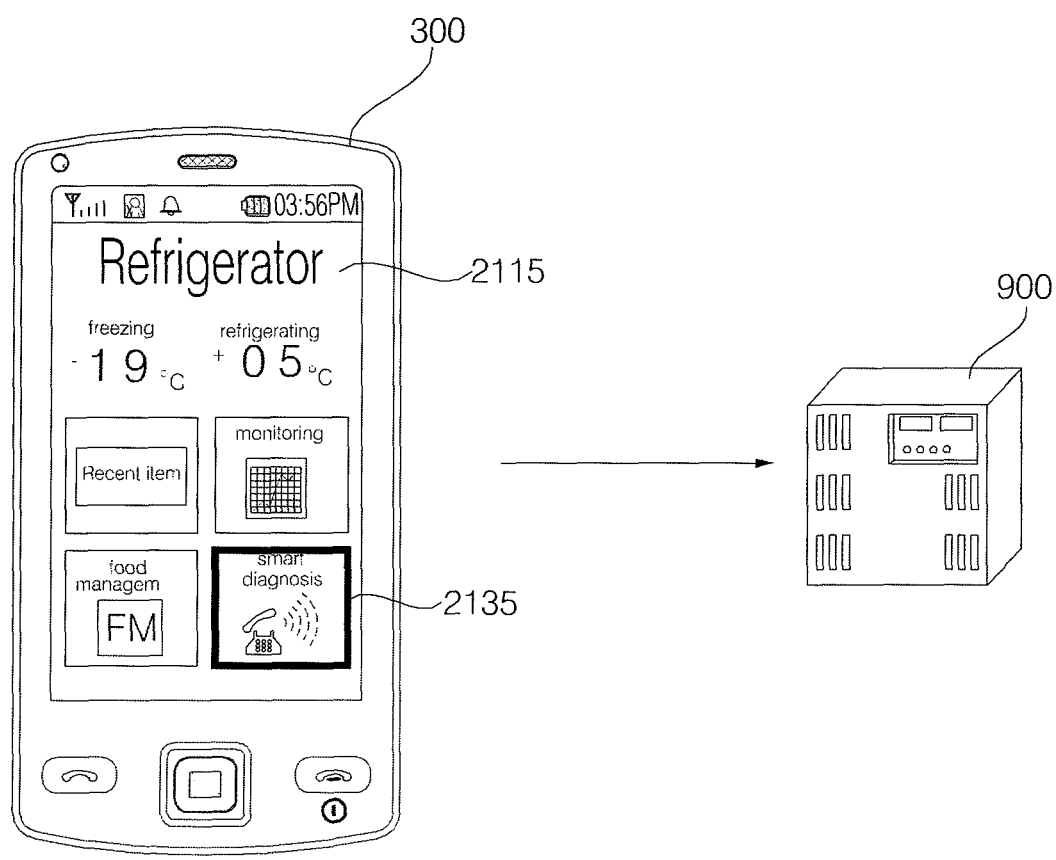

FIGS. 29A to 29C illustrate an exemplary case where the mobile terminal receives state information about a refrigerator by communicating with the refrigerator by NFC and transmits the state information to a server according to an embodiment of the present invention.

Referring to FIG. 29A, tagging is performed between the mobile terminal 300 and the refrigerator 500. Thus the mobile terminal 300 may receive device information from the refrigerator 500 by NFC communication. The device information may include device information about the product type, product name, manufacturer, or firmware version of the refrigerator 500. The device information may further include information about items kept in the refrigerator 500, information about the purchase of the items, information about dates on which the items are kept in the refrigerator 500, etc.

FIG. 29B illustrates an exemplary remote control screen displayed on the mobile terminal 300, for remotely controlling the refrigerator.

Referring to FIG. 29B, once the mobile terminal 300 receives the information from the refrigerator 500 via the NFC, a remote control screen 2115 is displayed on the mobile terminal 300. The remote control screen 2115 includes information about a refrigerating temperature and a freezing temperature as refrigerator state information. In addition, refrigerator remote control items 2130 such as a recent purchase item, a monitoring item, a food management item, and a smart diagnosis item 2135 can be displayed. The recent purchase item may list recently purchased items from among items kept in the refrigerator. The monitoring item is used to monitor the temperatures of the refrigerator, items in the refrigerator, etc. The food management item is used to manage the items within the refrigerator 500. The smart diagnosis item 2135 may be used to diagnose or analyze an abnormal state of the refrigerator 500. Any information which may be useful to the user regarding the operation of the refrigerator 500 can be provided from the refrigerator 500 to the mobile terminal 300 and displayed on the mobile terminal 300.

Upon a selection of the smart diagnosis item 2135 on the remote control screen 2115, the mobile terminal 300 may transmit the state information about the refrigerator to the server 900 via a network or other means. Accordingly, the server 900 may diagnose or analyze any abnormal state of the refrigerator based on the state information of the refrigerator and notify the user of the result on the display of the mobile terminal 300.

Meanwhile, when tagging is performed between the mobile terminal 300 and the refrigerator 500, the mobile terminal 300 may receive the state information about the refrigerator 500 and transmit the state information about the refrigerator 500 to the server 900 immediately without displaying a remote control screen. Thus, the server 900 may diagnose or analyze any abnormal state of the refrigerator based on the state information about the refrigerator.

Figure 30A:
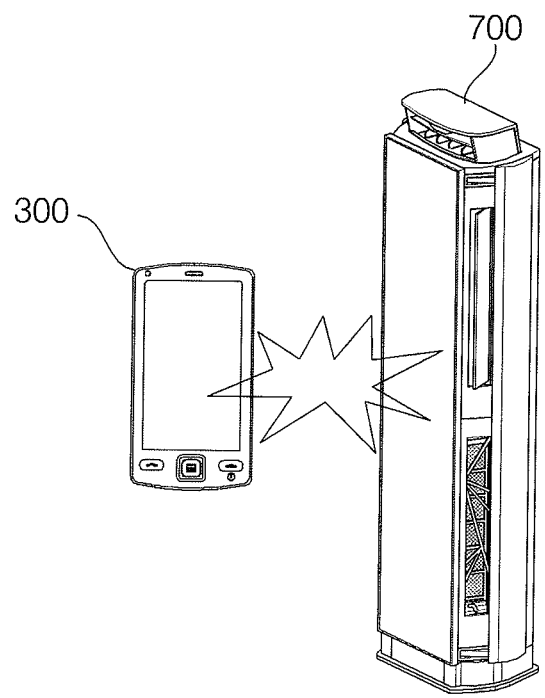
Figure 30B:
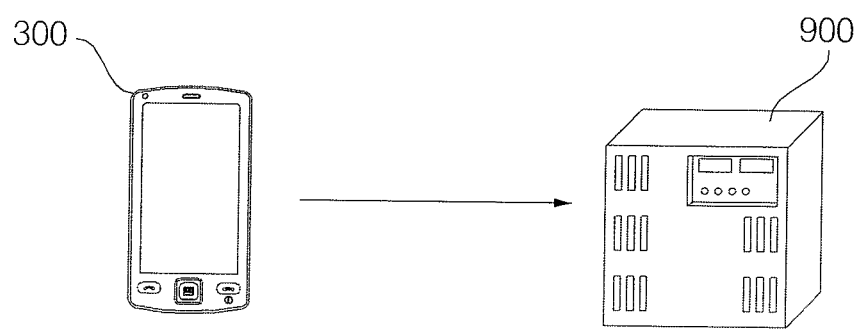

FIGS. 30A and 30B illustrate an exemplary case where the mobile terminal receives state information about the air conditioner by communicating with the air conditioner by NFC and transmits the state information about the air conditioner to the server according to an embodiment of the present invention.

Referring to FIG. 30A, tagging is performed between the mobile terminal 300 and the air conditioner 700. Thus, the mobile terminal 300 may receive device information about the air conditioner 700. The device information may specify the product type, product name, manufacturer, or firmware version of the air conditioner 700.

After receiving the device information, the mobile terminal 300 may display a remote control screen for remotely controlling the air conditioner 700. The remote control screen may include a monitoring item, a setting item, and a smart diagnosis item. This remote control screen for the air conditioner 700 may be similar to that for the refrigerator as shown in FIG. 29B, albeit modified for the air conditioner 700.

Referring to FIG. 30B, the mobile terminal 300 transmits state information about the air conditioner 700 to the server 900. Thus, the server 900 may diagnose or analyze an abnormal state of the air conditioner 700 based on the state information about the air conditioner 700, and the diagnosis result can be viewed on the mobile terminal 300. The operations of FIGS. 30A and 30B can be the same or similar to those of FIGS. 29A-29C, except the targeted device is the air conditioner 700.

Figure 31A:
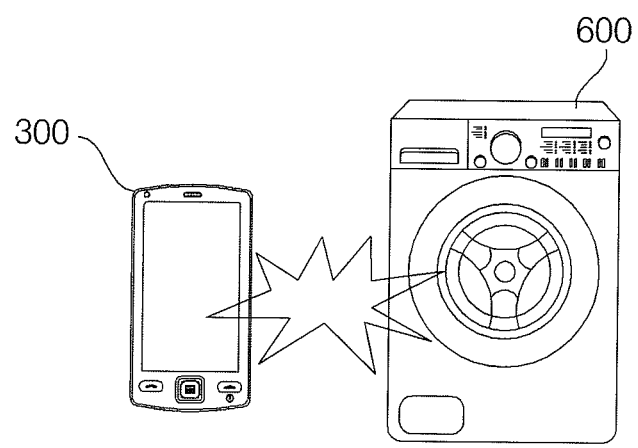
Figure 31B:
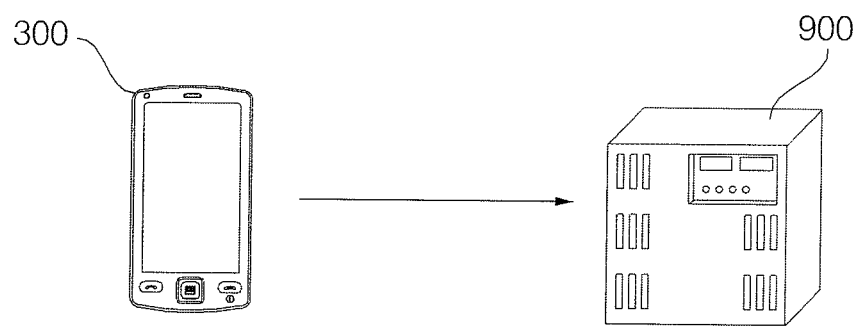

FIGS. 31A and 31B illustrate an exemplary case where the mobile terminal receives state information about the washing machine by communicating with the washing machine by NFC and transmits the state information about the washing machine to the server according to an embodiment of the present invention.

Referring to FIG. 31A, tagging is performed between the mobile terminal 300 and the washing machine 600. Thus, the mobile terminal 300 may receive device information from the washing machine 600. The device information may specify the product type, product name, manufacturer, or firmware version of the washing machine 600.

After receiving the device information, the mobile terminal 300 may display a remote control screen for remotely controlling the washing machine 600. The remote control screen may include a monitoring item, a setting item, and a smart diagnosis item. This remote control screen for the washing machine 600 may be similar to that for the refrigerator as shown in FIG. 29B, albeit modified for the washing machine 600.

Referring to FIG. 31B, the mobile terminal 300 transmits state information about the washing machine 600 to the server 900. Thus, the server 900 may diagnose or analyze an abnormal state of the washing machine 600 based on the state information about the washing machine 600, and the diagnosis result can be viewed on the mobile terminal 300. The operations of FIGS. 31A and 31B can be the same or similar to those of FIGS. 29A-29C, except the targeted device is the washing machine 600.

As is apparent from the above description of the embodiments of the present invention, an electronic device can readily control a second external device remotely by transmitting an external control signal to the second external device based on device information and/or user information received from a first external device through tagging. Accordingly, user convenience is increased.

Especially when the remote control signal carries at least one of device information about the first external device, information about a server connected to the first external device, or user information about the first external device, the second external device can easily display the information about the first external device through the electronic device.

In addition, as the second external device performs a login based on the user information received from the electronic device and displays a login screen, the login is automated based on the user information without the need for an additional input operation, thereby increasing user convenience.

If the first external device and the electronic device are brought in close proximity, the electronic device receives the user information from the first external device by NFC and transmits the received user information to the second external device by a communication scheme other than NFC. Therefore, a user can log in automatically.

If the second external device logs in to a Web server connected to the first external device using the received user information, the second external device can also receive a Web service from the Web server, in synchronization with the first external device.

When another second external device is logged in based on the user information, an object indicating the logged-in second external device is displayed so that the user can easily identify the logged-in state of the second external device.

If the second external device receives the user information in a power-off state, the second external device is automatically powered on. Thus user convenience is further increased.

As the electronic device can transmit the user information received from the first external device by NFC to a plurality of remote controllable second external devices, the plurality of second external devices can perform logins based on the user information.

A remote control screen for remotely controlling a second external device is displayed based on the device information received from the first external device by NFC. Therefore, the second external device is easily controlled remotely. Especially the remote control can be performed according to a user's manipulation input.

Since a remote control application screen can be displayed by automatically executing a remote control application for the second external device, the user can easily remotely control the second external device.

In the absence of the remote control application for the second external device, the remote control application is downloaded automatically from a server and installed.

Meanwhile, a specific server can be automatically logged in using account information included in the device information. Therefore, the user can readily receive data from the server.

Further, the electronic device receives device information, particularly network information through tagging to the first external device and transmits the network information to a second external device. As a result, the second external device can easily configure a network.

As a remote control screen for the first external device includes at least one of a state information item, a device diagnosis item, or a device management item, the electronic device can readily identify the state of the first external device.

Upon a selection of the state information item on the remote control screen, the electronic device transmits state information about the first external device to a second external device. Therefore, the second external device can readily identify the state of the first external device.

Furthermore, the electronic device can provide a variety of UIs. Consequently, user convenience can be increased. Moreover, every device discussed in the present application may include at least a short-range communication module (e.g., NFC module) for wirelessly communicating with other device(s) and a controller (e.g., a processor or microprocessor) for controlling the operations of the device as well as the other components of the device.

The methods for operating an electronic device according to the foregoing exemplary embodiments may be implemented as codes that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating a Near Field Communication (NFC)-enabled mobile terminal, the method comprising:

performing, by the mobile terminal, tagging with a remote controller to establish communication with the remote controller;

receiving, by the mobile terminal, at least one of device information and user information from the remote controller through the communication;

displaying an electronic device application list screen including a plurality of item corresponding to a plurality of external devices based on the tagging, wherein an item corresponding to the remote controller in the electronic device application list screen is highlighted;

upon a selection of the item in the electronic device application list screen, displaying a remote control screen on a display unit of the mobile terminal based on the device information; and transmitting, by the mobile terminal, a remote control signal corresponding to the user's selection to an external device, based on the at least one of the device information and the user information, wherein the remote control screen includes state information of the external device corresponding to the selected item in the electronic device application list screen, and a remote control item for remotely controlling the external device.

2. The method according to claim 1, wherein the remote control signal includes at least one of:

device information about the remote controller, information about a server connected to the remote controller, user information about the remote controller, device information about the mobile terminal, network information associated with the remote controller, user information about the mobile terminal, and control information about the external device.

3. The method according to claim 1, wherein the transmitting step comprises:
transmitting the remote control signal in a communication scheme other than a communication scheme used to receive the at least one of the device infoitnation and the user information.

4. The method according to claim 1, wherein the transmitting step comprises:
transmitting the remote control signal to a plurality of different external devices.

5. The method according to claim 1, further comprising:
connecting, by the mobile terminal, to a specific server, if a remote control application for remotely controlling the external device is not installed in the mobile terminal;
downloading the remote control application from the specific server; and
installing, in the mobile terminal, the downloaded remote control application.

6. The method according to claim 1, wherein the device information received from the remote controller includes network information, and the remote control signal includes the network information.

7. The method according to claim 1, wherein the remote control screen further includes a device diagnosis item, and a device management item for the external device.

8. The method according to claim 1, further comprising:
transmitting, by the mobile terminal, a request for the state information and diagnosis information about the external device to a server; and
displaying, on the display unit of the mobile terminal, the state information and diagnosis information about the external device received from the server through a wireless communication.

9. The method according to claim 1, further comprising, when the external device displays an image, displaying the scaled-down image corresponding to the image on the display unit in synchronization with the external device.

10. The method according to claim 1, further comprising identifying a product type of the external device based on the received device information.

11. The method according to claim 1, further comprising:
executing a remote control application based on the device information,
wherein the remote control screen includes an application execution screen of the remote control application.

12. The method according to claim 1, further comprising:
displaying the electronic device application list screen based on the device information; and
executing a remote control application in the electronic device application list screen upon a user selection.

13. The method according to claim 12, wherein an item corresponding to the external device in the electronic device application list screen is highlighted to distinguishably indicate that the external device is the targeted device for remote controlling.

14. An image display apparatus capable of being remotely controlled by a Near Field Communication (NFC)-enabled mobile terminal, comprising:
an interface unit configured to receive data from a mobile terminal or transmit data to the mobile terminal;
a display unit configured to display an image; and
a controller configured to control the display unit, and to:
when tagging between the mobile terminal and a remote controller of the image display apparatus is performed, scale down the image;
transmit the scaled-down image to the mobile terminal through the interface unit;
receive a remote control signal from the mobile terminal; and
perform an operation based on the remote control signal,
wherein the controller is further configured to transmit account information about the image display apparatus or information about servers logged in based on the account information for the servers to the mobile terminal.

15. A Near Field Communication (NFC)-enabled mobile terminal, comprising:
a display unit;
a first communication module configured to receive, by way of a remote controller, device information from the remote controller through communication;
a second communication module configured to receive data from an external device or transmit data to the external device; and
a controller configured to control the first and second communication modules and the display unit to:
display an electronic device application list screen including a plurality of item corresponding to a plurality of external devices based on a tagging, wherein an item corresponding to the remote controller in the electronic device application list screen is highlighted;
upon a selection of the item in the electronic device application list screen, display a remote control screen on the display unit based on the device information, and
transmit a remote control signal to the external device, based on the at least one of the device information and the user information,
wherein the remote control screen includes state information of the external device corresponding to the selected item in the electronic device application list screen, and a remote control item for remotely controlling the external device.

16. The mobile terminal according to claim 15, wherein the controller is configured to, when the external device displays an image, display a scaled-down image corresponding to the image on the display unit in synchronization with the external device.

17. The mobile terminal according to claim 16, wherein the controller further executes a remote control application based on the device information, and
wherein the remote control screen includes an application execution screen of the remote control application.

18. The mobile terminal according to claim 17, the controller is further configured to:
connect to a specific server, if the remote control application for remotely controlling the external device is not installed in the mobile terminal,
download the remote control application from the specific server, and
install the downloaded remote control application in the mobile terminal.

19. The mobile terminal according to claim 15, wherein the remote control signal includes at least one of:
device information about the remote controller,
information about a server connected to the remote controller,
user information about the remote controller,
device information about the mobile terminal,
network information associated with the remote controller,
user information about the mobile terminal, and
control information about the external device.

20. The mobile terminal according to claim 15, wherein the controller transmits the remote control signal in a communication scheme other than a communication scheme used to receive the at least one of the device information and the user information.

21. The mobile terminal according to claim 15, wherein the controller transmits the remote control signal to a plurality of different external devices.

22. The mobile terminal according to claim 15, wherein the device information received from the remote controller includes network information, and
wherein the remote control signal includes the network information.

23. The mobile terminal according to claim 15, wherein the controller is configured to:
display the electronic device application list screen based on the device information, and
execute a remote control application in the electronic device application list screen upon a user selection.

24. The mobile terminal according to claim 23, wherein an item corresponding to the external device in the electronic device application list screen is highlighted to distinguishably indicate that the external device is the targeted device for remote controlling.

25. The mobile terminal according to claim 24, wherein the remote control screen further includes a device diagnosis item, and a device management item for the external device.

26. The mobile terminal according to claim 24, wherein the controller is further configured to:
transmit a request for the state information and diagnosis information about the external device to a server; and
display, on the display unit, the state information and diagnosis information about the external device received from the server through a wireless communication.

* * * * *